US011107134B2

(12) United States Patent
Swinson et al.

(10) Patent No.: US 11,107,134 B2
(45) Date of Patent: *Aug. 31, 2021

(54) SYSTEM AND METHOD FOR THE UTILIZATION OF PRICING MODELS IN THE AGGREGATION, ANALYSIS, PRESENTATION AND MONETIZATION OF PRICING DATA FOR VEHICLES AND OTHER COMMODITIES

(71) Applicant: TRUECAR, INC., Santa Monica, CA (US)

(72) Inventors: Michael Swinson, Santa Monica, CA (US); Lin O'Driscoll, Mammoth Lakes, CA (US); Scott Painter, Bel Air, CA (US)

(73) Assignee: Truecar, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,732

(22) Filed: May 5, 2020

(65) Prior Publication Data

US 2020/0265480 A1    Aug. 20, 2020

Related U.S. Application Data

(63) Continuation of application No. 16/272,396, filed on Feb. 11, 2019, now Pat. No. 10,679,263, and a
(Continued)

(51) Int. Cl.
*G06Q 30/00* (2012.01)
*G06Q 30/02* (2012.01)

(52) U.S. Cl.
CPC ......... *G06Q 30/0278* (2013.01); *G06Q 30/02* (2013.01)

(58) Field of Classification Search
CPC .................. G06Q 30/0278; G06Q 30/02
See application file for complete search history.

(56) References Cited

U.S. PATENT DOCUMENTS 5,361,201 A   11/1994  Jost
5,377,095 A   12/1994  Maeda et al.
(Continued)

FOREIGN PATENT DOCUMENTS

CN    1501301 A    6/2004
CN    1734492 A    2/2006
(Continued)

OTHER PUBLICATIONS

Examination Report issued for Canadian Patent Application No. 2,736,477, dated Nov. 3, 2020, 4 pages.
(Continued)

*Primary Examiner* — Kathleen Palavecino
(74) *Attorney, Agent, or Firm* — Sprinkle IP Law Group

(57) ABSTRACT

Embodiments of systems and methods for the aggregation, analysis, display and monetization of pricing data for commodities in general, and which may be particularly useful applied to vehicles are disclosed. In certain embodiments, one or more models may be applied over a set of historical transaction data associated with a vehicle configuration to determine pricing data. Some models may leverage incremental data in various conditions, including cases where fewer than a desired number of historical transactions are present in the bin of a specified vehicle, where fewer than, equal to, or more than a certain number of list prices for the specified vehicle available, and where no historical transaction data for new models is available.

20 Claims, 27 Drawing Sheets

Related U.S. Application Data continuation of application No. 15/674,317, filed on Aug. 10, 2017, now Pat. No. 10,262,344, which is a continuation of application No. 14/068,836, filed on Oct. 31, 2013, now Pat. No. 9,767,491, which is a continuation of application No. 12/896,145, filed on Oct. 1, 2010, now Pat. No. 8,612,314, which is a continuation-in-part of application No. 12/556,109, filed on Sep. 9, 2009, now Pat. No. 9,111,308.

(60) Provisional application No. 61/248,083, filed on Oct. 2, 2009, provisional application No. 61/095,550, filed on Sep. 9, 2008, provisional application No. 61/095,376, filed on Sep. 9, 2008.

(56) References Cited

U.S. PATENT DOCUMENTS

| | | |
|---|---|---|
| 5,774,873 A | 6/1998 | Berent et al. |
| 6,006,201 A | 12/1999 | Berent et al. |
| 6,029,141 A | 2/2000 | Bezos et al. |
| 6,125,356 A | 9/2000 | Brockman et al. |
| 6,282,517 B1 | 8/2001 | Wolfe et al. |
| 6,298,328 B1 | 10/2001 | Healy et al. |
| 6,330,499 B1 | 12/2001 | Chou et al. |
| 6,604,083 B1 | 8/2003 | Bailey |
| 6,609,108 B1 | 8/2003 | Pulliam et al. |
| 6,882,983 B2 | 4/2005 | Furphy et al. |
| 6,892,185 B1 | 5/2005 | Van Etten et al. |
| 6,895,388 B1 | 5/2005 | Smith |
| 6,975,999 B2 | 12/2005 | Moore |
| 7,050,982 B2 | 5/2006 | Sheinson |
| 7,113,090 B1 | 9/2006 | Saylor |
| 7,133,835 B1 | 11/2006 | Fusz et al. |
| 7,184,974 B2 | 2/2007 | Shishido |
| 7,219,080 B1 | 5/2007 | Wagoner et al. |
| 7,287,000 B2 | 10/2007 | Boyd et al. |
| 7,366,679 B2 | 4/2008 | Yuyama et al. |
| 7,392,224 B1 | 6/2008 | Bauer et al. |
| 7,546,243 B2 | 6/2009 | Kapadia et al. |
| 7,596,501 B2 | 9/2009 | Tivey et al. |
| 7,596,512 B1 | 9/2009 | Raines et al. |
| 7,599,842 B2 | 10/2009 | Tivey et al. |
| 7,624,065 B2 | 11/2009 | Schoen et al. |
| 7,747,474 B2 | 6/2010 | Miloslavsky et al. |
| 7,778,841 B1 | 8/2010 | Bayer et al. |
| 7,801,798 B1 | 9/2010 | Huemer et al. |
| 7,818,201 B2 | 10/2010 | Shevlin et al. |
| 7,835,982 B2 | 11/2010 | Schoen et al. |
| 7,921,052 B2 | 4/2011 | Dabney et al. |
| 7,945,483 B2 | 5/2011 | Inghelbrecht et al. |
| 7,970,713 B1 | 6/2011 | Gorelik et al. |
| 8,000,989 B1 | 8/2011 | Kiefhaber et al. |
| 8,005,684 B1 | 8/2011 | Cheng et al. |
| 8,036,952 B2 | 10/2011 | Mohr et al. |
| 8,078,515 B2 | 12/2011 | John |
| 8,095,422 B2 | 1/2012 | Hallowell et al. |
| 8,108,262 B1 | 1/2012 | Thirumalai et al. |
| 8,112,325 B2 | 2/2012 | Foy et al. |
| 8,126,881 B1 | 2/2012 | Sethi et al. |
| 8,219,464 B2 | 7/2012 | Inghelbrecht et al. |
| 8,230,362 B2 | 7/2012 | Couch |
| 8,255,270 B2 | 8/2012 | Rose et al. |
| 8,326,845 B2 | 12/2012 | Sethi et al. |
| 8,375,037 B2 | 2/2013 | Sethi et al. |
| 8,392,264 B2 | 3/2013 | Doll |
| 8,429,220 B2 | 4/2013 | Wilkinson et al. |
| 8,515,817 B2 | 8/2013 | Noy et al. |
| 8,521,615 B2 | 8/2013 | Inghelbrecht et al. |
| 8,521,619 B2 | 8/2013 | Perry, III et al. |
| 8,538,828 B2 | 9/2013 | Skutta |
| 8,589,212 B2 | 11/2013 | Pollak et al. |
| 8,595,082 B2 | 11/2013 | Skutta |
| 8,612,314 B2 | 12/2013 | Swinson |
| 8,645,193 B2 | 2/2014 | Swinson et al. |
| 8,676,799 B1 | 3/2014 | Vaver |
| 8,818,881 B2 | 8/2014 | Himmerick et al. |
| 8,868,572 B2 | 10/2014 | Sethi et al. |
| 9,020,843 B2 | 4/2015 | Taira et al. |
| 9,020,844 B2 | 4/2015 | Taira et al. |
| 9,103,743 B2 | 8/2015 | Couch |
| 9,104,718 B1 | 8/2015 | Levy et al. |
| 9,111,308 B2 | 8/2015 | Taira et al. |
| 9,129,325 B2 | 9/2015 | Taira et al. |
| 9,189,960 B2 | 11/2015 | Couch et al. |
| 9,324,104 B1 | 4/2016 | Levy et al. |
| 9,347,758 B2 | 5/2016 | Berent et al. |
| D765,089 S | 8/2016 | Agee |
| 9,412,203 B1 | 8/2016 | Garcia, III et al. |
| 9,465,873 B1 | 10/2016 | Franke et al. |
| 9,466,079 B2 | 10/2016 | Hygema et al. |
| D774,523 S | 12/2016 | Agee |
| D774,524 S | 12/2016 | Agee |
| 9,600,822 B2 | 3/2017 | Pyle et al. |
| 9,727,904 B2 | 8/2017 | Inghelbrecht et al. |
| 9,754,304 B2 | 9/2017 | Taira et al. |
| 9,767,491 B2 | 9/2017 | Swinson et al. |
| 9,818,140 B2 | 11/2017 | Inghelbrecht et al. |
| 9,904,933 B2 | 2/2018 | Taira et al. |
| 9,904,948 B2 | 2/2018 | Taira et al. |
| 10,108,989 B2 | 10/2018 | Swinson et al. |
| 10,217,123 B2 | 2/2019 | Taira et al. |
| 10,262,344 B2 | 4/2019 | Swinson et al. |
| 10,269,030 B2 | 4/2019 | Taira et al. |
| 10,269,031 B2 | 4/2019 | Inghelbrecht et al. |
| 10,296,939 B2 | 5/2019 | Minnis et al. |
| 10,489,809 B2 | 11/2019 | Inghelbrecht et al. |
| 10,489,810 B2 | 11/2019 | Taira et al. |
| 10,504,159 B2 | 12/2019 | Laughlin et al. |
| 10,515,382 B2 | 12/2019 | Taira et al. |
| 10,679,263 B2 | 6/2020 | Swinson et al. |
| 10,733,639 B2 | 8/2020 | Swinson et al. |
| 10,740,776 B2 | 8/2020 | Swinson et al. |
| 10,810,906 B2 | 10/2020 | Kent |
| 10,846,722 B2 | 11/2020 | Taira et al. |
| 10,853,831 B2 | 12/2020 | Inghelbrecht et al. |
| 2001/0037205 A1 | 11/2001 | Joao |
| 2001/0037265 A1 | 11/2001 | Kleinberg |
| 2002/0007331 A1 | 1/2002 | Lo et al. |
| 2002/0111856 A1 | 8/2002 | Messer et al. |
| 2002/0116348 A1 | 8/2002 | Phillips et al. |
| 2002/0147625 A1 | 10/2002 | Kolke, Jr. |
| 2002/0194051 A1 | 12/2002 | Hall et al. |
| 2003/0028437 A1 | 2/2003 | Grant et al. |
| 2003/0065532 A1 | 4/2003 | Takaoka |
| 2003/0083961 A1 | 5/2003 | Bezos et al. |
| 2003/0105728 A1 | 6/2003 | Yano et al. |
| 2003/0130966 A1 | 7/2003 | Thompson et al. |
| 2003/0200151 A1 | 10/2003 | Ellenson et al. |
| 2003/0220773 A1 | 11/2003 | Haas et al. |
| 2003/0229577 A1 | 12/2003 | Nabel |
| 2004/0014454 A1 | 1/2004 | Burgess |
| 2004/0019516 A1 | 1/2004 | Puskorius et al. |
| 2004/0093284 A1 | 5/2004 | Takaoka |
| 2004/0128224 A1 | 7/2004 | Dabney et al. |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2004/0172266 A1 | 9/2004 | Sheinson et al. |
| 2004/0210485 A1 | 10/2004 | Luo et al. |
| 2004/0254808 A1 | 12/2004 | Bennett et al. |
| 2005/0060271 A1 | 3/2005 | Vig |
| 2005/0071249 A1 | 3/2005 | Nix et al. |
| 2005/0086070 A1 | 4/2005 | Engelman |
| 2005/0108112 A1 | 5/2005 | Ellenson et al. |
| 2005/0125308 A1 | 6/2005 | Puentes et al. |
| 2005/0144061 A1 | 6/2005 | Rarity et al. |
| 2005/0171859 A1 | 8/2005 | Harrington et al. |
| 2005/0171896 A1 | 8/2005 | Seretti et al. |
| 2005/0197941 A1 | 9/2005 | Veit |
| 2005/0209934 A1 | 9/2005 | Irby et al. |
| 2005/0256778 A1 | 11/2005 | Boyd et al. |
| 2005/0256780 A1 | 11/2005 | Eldred |
| 2005/0261951 A1 | 11/2005 | Tighe |

(56) References Cited

U.S. PATENT DOCUMENTS

| | | |
|---|---|---|
| 2005/0266833 A1 | 12/2005 | Walker |
| 2005/0267774 A1 | 12/2005 | Merritt et al. |
| 2006/0080210 A1 | 4/2006 | Mourad et al. |
| 2006/0085209 A1 | 4/2006 | Walker, III |
| 2006/0085283 A1 | 4/2006 | Griffiths |
| 2006/0106668 A1 | 5/2006 | Kim et al. |
| 2006/0129423 A1 | 6/2006 | Sheinson et al. |
| 2006/0178973 A1 | 8/2006 | Chiovari et al. |
| 2006/0212355 A1 | 9/2006 | Teague et al. |
| 2006/0242089 A1 | 10/2006 | Vahidi et al. |
| 2007/0005446 A1 | 1/2007 | Fusz et al. |
| 2007/0038522 A1 | 2/2007 | Bell et al. |
| 2007/0112582 A1 | 5/2007 | Fenlon |
| 2007/0124284 A1 | 5/2007 | Lin et al. |
| 2007/0143132 A1 | 6/2007 | Linne et al. |
| 2007/0143195 A1 | 6/2007 | Bell et al. |
| 2007/0162293 A1 | 7/2007 | Malkon |
| 2007/0185777 A1 | 8/2007 | Pyle et al. |
| 2007/0219851 A1 | 9/2007 | Taddei et al. |
| 2007/0244797 A1 | 10/2007 | Hinson et al. |
| 2007/0250327 A1 | 10/2007 | Hedy |
| 2008/0027882 A1 | 1/2008 | Allen et al. |
| 2008/0046383 A1 | 2/2008 | Hirtenstein et al. |
| 2008/0052216 A1 | 2/2008 | Johnson et al. |
| 2008/0077477 A1 | 3/2008 | McElhiney et al. |
| 2008/0077542 A1 | 3/2008 | McElhiney et al. |
| 2008/0177590 A1 | 7/2008 | Brodsky et al. |
| 2008/0189156 A1 | 8/2008 | Voda et al. |
| 2008/0201163 A1 | 8/2008 | Barker et al. |
| 2008/0201203 A1 | 8/2008 | Rose et al. |
| 2008/0207191 A1 | 8/2008 | Fleenor et al. |
| 2008/0288312 A1 | 11/2008 | Miles et al. |
| 2008/0288361 A1 | 11/2008 | Rego et al. |
| 2008/0300962 A1 | 12/2008 | Cawston et al. |
| 2009/0006118 A1 | 1/2009 | Pollak |
| 2009/0037356 A1 | 2/2009 | Rothstein et al. |
| 2009/0048859 A1 | 2/2009 | McCarthy et al. |
| 2009/0157522 A1 | 6/2009 | Srinivasan et al. |
| 2009/0171761 A1 | 7/2009 | Noy et al. |
| 2009/0187513 A1 | 7/2009 | Noy et al. |
| 2010/0070343 A1 | 3/2010 | Taira et al. |
| 2010/0070344 A1 | 3/2010 | Taira et al. |
| 2010/0070382 A1 | 3/2010 | Inghelbrecht et al. |
| 2010/0088158 A1 | 4/2010 | Pollack |
| 2010/0161376 A1 | 6/2010 | Spagnolo |
| 2010/0161408 A1 | 6/2010 | Karson et al. |
| 2010/0179861 A1 | 7/2010 | Teerilahti et al. |
| 2010/0191659 A1 | 7/2010 | Hebron |
| 2010/0198735 A1 | 8/2010 | Basak et al. |
| 2010/0274571 A1 | 10/2010 | McFall et al. |
| 2010/0274631 A1 | 10/2010 | McFall et al. |
| 2011/0022525 A1 | 1/2011 | Swinson et al. |
| 2011/0040697 A1 | 2/2011 | Constantinou et al. |
| 2011/0082720 A1 | 4/2011 | Swinson et al. |
| 2011/0082759 A1 | 4/2011 | Swinson et al. |
| 2011/0082804 A1 | 4/2011 | Swinson et al. |
| 2011/0131652 A1 | 6/2011 | Robinson et al. |
| 2011/0173227 A1 | 7/2011 | Klein |
| 2011/0202471 A1 | 8/2011 | Scott et al. |
| 2011/0264595 A1 | 10/2011 | Anspach et al. |
| 2012/0005070 A1 | 1/2012 | McFall et al. |
| 2012/0005108 A1 | 1/2012 | Hollenshead et al. |
| 2012/0197699 A1 | 8/2012 | Snell et al. |
| 2012/0233014 A1 | 9/2012 | Banks et al. |
| 2012/0259728 A1 | 10/2012 | Inghelbrecht et al. |
| 2012/0284087 A1 | 11/2012 | Pollak |
| 2012/0284113 A1 | 11/2012 | Pollak |
| 2012/0316997 A1 | 12/2012 | Herbert |
| 2012/0330723 A1 | 12/2012 | Hedy |
| 2013/0006876 A1 | 1/2013 | Swinson et al. |
| 2013/0018752 A1 | 1/2013 | Foster |
| 2013/0030870 A1 | 1/2013 | Swinson et al. |
| 2013/0103457 A1 | 4/2013 | Marshall et al. |
| 2013/0117067 A1 | 5/2013 | Sullivan et al. |
| 2013/0191247 A1 | 7/2013 | Huang et al. |
| 2013/0304571 A1 | 11/2013 | Swinson et al. |
| 2013/0311319 A1 | 11/2013 | Noy et al. |
| 2013/0311341 A1 | 11/2013 | Noy et al. |
| 2013/0339173 A1 | 12/2013 | Skutta |
| 2014/0032352 A1 | 1/2014 | Fraser et al. |
| 2014/0032353 A1 | 1/2014 | Fraser et al. |
| 2014/0058957 A1 | 2/2014 | Swinson et al. |
| 2014/0067615 A1 | 3/2014 | Park et al. |
| 2014/0074553 A1 | 3/2014 | Sullivan et al. |
| 2014/0089208 A1 | 3/2014 | Humble et al. |
| 2014/0114726 A1 | 4/2014 | Swinson et al. |
| 2014/0149183 A1 | 5/2014 | Liu et al. |
| 2014/0214491 A1 | 7/2014 | Semeniuk et al. |
| 2014/0214696 A1 | 7/2014 | Laughlin et al. |
| 2014/0229240 A1 | 8/2014 | Taira et al. |
| 2014/0229241 A1 | 8/2014 | Taira et al. |
| 2014/0229391 A1 | 8/2014 | East, III et al. |
| 2014/0237410 A1 | 8/2014 | Klein |
| 2014/0244424 A1 | 8/2014 | Swinson et al. |
| 2014/0257934 A1 | 9/2014 | Chrzan et al. |
| 2014/0258044 A1 | 9/2014 | Chrzan et al. |
| 2014/0278806 A1 | 9/2014 | Duguid et al. |
| 2014/0279020 A1 | 9/2014 | Duguid et al. |
| 2014/0279171 A1 | 9/2014 | Burgiss et al. |
| 2014/0279229 A1 | 9/2014 | Burgiss et al. |
| 2014/0279263 A1 | 9/2014 | Liu et al. |
| 2014/0279275 A1 | 9/2014 | Burgiss et al. |
| 2014/0279709 A1 | 9/2014 | Lander et al. |
| 2014/0351074 A1 | 11/2014 | Enge et al. |
| 2014/0358719 A1 | 12/2014 | Inghelbrecht et al. |
| 2015/0058152 A1 | 2/2015 | Pollak et al. |
| 2015/0134422 A1 | 5/2015 | Swinson et al. |
| 2015/0193800 A1 | 7/2015 | Taira et al. |
| 2015/0206162 A1 | 7/2015 | Taira et al. |
| 2015/0206206 A1 | 7/2015 | Puente et al. |
| 2015/0220876 A1 | 8/2015 | Sethi et al. |
| 2015/0242926 A1 | 8/2015 | Taira et al. |
| 2015/0310466 A1 | 10/2015 | Lacivita et al. |
| 2015/0324737 A1 | 11/2015 | Chrzan et al. |
| 2015/0324879 A1 | 11/2015 | Lu et al. |
| 2015/0356672 A1 | 12/2015 | Humble et al. |
| 2015/0363838 A1 | 12/2015 | Wu et al. |
| 2015/0363865 A1 | 12/2015 | Ramanuja et al. |
| 2016/0343058 A1 | 11/2016 | Levy et al. |
| 2016/0371323 A1 | 12/2016 | Garcia, III et al. |
| 2017/0109768 A1 | 4/2017 | Swinson et al. |
| 2017/0109769 A1 | 4/2017 | Inghelbrecht et al. |
| 2017/0109799 A1 | 4/2017 | Swinson et al. |
| 2017/0109833 A1 | 4/2017 | Taira et al. |
| 2017/0286983 A1 | 10/2017 | Taira et al. |
| 2017/0372381 A1 | 12/2017 | Swinson et al. |
| 2018/0158086 A1 | 6/2018 | Taira et al. |
| 2019/0034983 A1 | 1/2019 | Swinson et al. |
| 2019/0139065 A1 | 5/2019 | Taira et al. |
| 2019/0172103 A1 | 6/2019 | Swinson et al. |
| 2019/0180305 A1 | 6/2019 | Inghelbrecht et al. |
| 2019/0180306 A1 | 6/2019 | Inghelbrecht et al. |
| 2020/0005344 A1 | 1/2020 | Taira et al. |
| 2020/0034862 A1 | 1/2020 | Inghelbrecht et al. |
| 2020/0051102 A1 | 2/2020 | Taira et al. |
| 2020/0051134 A1 | 2/2020 | Laughlin et al. |
| 2021/0035138 A1 | 2/2021 | Taira et al. |
| 2021/0042774 A1 | 2/2021 | Swinson et al. |
| 2021/0081979 A1 | 3/2021 | Taira et al. |
| 2021/0150555 A1 | 5/2021 | Inghelbrecht et al. |

FOREIGN PATENT DOCUMENTS

| | | |
|---|---|---|
| CN | 1892691 | 1/2007 |
| CN | 101785023 A | 7/2010 |
| EP | 1326176 | 9/2003 |
| JP | 2001-117973 | 4/2001 |
| JP | 2001-155106 | 6/2001 |
| JP | 2001-209674 | 8/2001 |
| JP | 2001-256356 | 9/2001 |
| JP | 2001-306851 | 11/2001 |
| JP | 2002-117275 | 4/2002 |
| JP | 2002-132827 | 5/2002 |
| JP | 2002-329097 | 11/2002 |

(56) References Cited

FOREIGN PATENT DOCUMENTS

| JP | 2002-358478 | 12/2002 |
|---|---|---|
| JP | 2003-024387 | 1/2003 |
| JP | 2003-108811 | 4/2003 |
| JP | 2003-108847 | 4/2003 |
| JP | 2003-173406 | 6/2003 |
| JP | 2004-070534 | 3/2004 |
| JP | 2004-516554 | 6/2004 |
| JP | 2004-213065 | 7/2004 |
| JP | 2006-268635 | 10/2006 |
| JP | 2007-122197 | 5/2007 |
| JP | 2008-058039 | 3/2008 |
| JP | 2008-165764 | 7/2008 |
| WO | WO200140898 A2 | 6/2001 |
| WO | WO 2007002684 | 1/2007 |
| WO | WO2007002754 A2 | 1/2007 |
| WO | WO200140898 A3 | 11/2007 |
| WO | WO 2010030632 | 3/2010 |

OTHER PUBLICATIONS

Examination Report issued for Canadian Patent Application No. 2,837,338, dated Mar. 24, 2021, 3 pages.
International Search Report and Written Opinion for PCT Application No. PCT/US2009/056316, dated Oct. 26, 2009, 7 pages.
International Search Report and Written Opinion for PCT Application No. PCT/US2009/056315, dated Oct. 20, 2009, 7 pages.
International Search Report and Written Opinion for PCT Application No. PCT/US2009/056317, dated Dec. 10, 2009, 8 pages.
Office Action issued for U.S. Appl. No. 12/556,137, dated Sep. 1, 2010, 14 pages.
cars.com, http://cars.com/ Internet Archive Jul. 18, 2007—http://web.archive.org/web/20070718071752/www.car.com/, printed Aug. 27, 2010, 2 pages.
Office Action issued for U.S. Appl. No. 12/556,137, dated Dec. 30, 2010, 15 pages.
edmunds.com http://www.edmunds.com/Internet Archive Jan. 18, 2010—http://web.archive.org/web/20080118210310/http://www.edmunds.com/ printed Dec. 15, 2010, 3 pages.
Office Action issued for U.S. Appl. No. 13/080,832, dated Oct. 12, 2011, 12 pages.
2nd Written Opinion issued for PCT Application No. PCT/US09/56317, dated Dec. 6, 2011, 6 pages.
Office Action issued for U.S. Appl. No. 12/556,076 dated Dec. 27, 2011, 13 pages.
Office Action issued for U.S. Appl. No. 12/556,109 dated Jan. 24, 2012, 16 pages.
"CarPrices.com, Selectica and JATO Dynamics Enter Agreement to Deliver Online Car Configuration Package", Business Wire, Dec. 13, 1999, 5 pages.
Office Action issued for U.S. Appl. No. 12/556,076, dated Mar. 26, 2012, 14 pages.
Office Action issued for U.S. Appl. No. 12/556,109, dated Mar. 26, 2012, 15 pages.
Goldberg, "Job Security through PPC-CRM Integration", paydigest.com, published Aug. 22, 2007.
Sauberlich, et al. "Analytical Lead Management in the Automotive Industry," Data Analysis and Decision Support, Springer Heidelberg Berlin 2005, pp. 290-299.
Office Action issued for U.S. Appl. No. 11/968,137, dated Dec. 23, 2010, 8 pages.
Office Action issued for U.S. Appl. No. 11/968,137, dated Jun. 9, 2011, 9 pages.
Office Action issued for U.S. Appl. No. 11/968,137, dated Dec. 19, 2011, 10 pages.
Gregory M. Collins, "Technology Opens Up Huge CRM Opportunities for Retailers," Jun. 10, 2002. Retrieved from http://www.destinationcrm.com/Articles/PrintArticle.aspx?ArticleID=47419, 3 pages.

Rick Gibbs, "How Google Base Replaces Autos Classifieds", Nov. 27, 2006. Retrieved from http://www.imediaconnection.com/printpage.aspx?id=12548, 4 pages.
No Author, "3 Reasons Why Using Google Pays Off for Automobile Dealers," 2005 Retrieved from http://www.kaistudios.com/PPC/guides/Google-autodealers.htm, 2 pages.
Office Action issued for U.S. Appl. No. 12/179,164, dated Sep. 30, 2009, 19 pages.
"Innovative Website Moves Consumer Auto Purchases Online: Capital One Offers Miami Buyers a One-Stop Resource for Car Purchase, Putting an End to Hassles and Frustration," Business Wire, Jul. 18, 2006, 3 pages.
Office Action issued for U.S. Appl. No. 12/179,164, dated Oct. 27, 2010, 20 pages.
Office Action issued for U.S. Appl. No. 12/179,164, dated Feb. 15, 2011, 20 pages.
Office Action issued for U.S. Appl. No. 12/179,164, dated Sep. 2, 2011, 21 pages.
International Preliminary Report on Patentability (IPRP) issued for PCT Patent Application No. PCT/US2009/056316, dated May 1, 2012, 6 pages.
Extended European Search Report issued for European Patent Application No. 09 813 513.0, dated Feb. 21, 2012, 8 pages.
Extended European Search Report issued for European Patent Application No. 09 813 514.8, dated Apr. 25, 2012, 5 pages.
International Preliminary Report on Patentability (IPRP) issued for PCT Patent Application No. PCT/US2009/056315, dated May 16, 2012, 6 pages.
Office Action issued for U.S. Appl. No. 12/179,164, dated May 25, 2012, 21 pages.
Office Action issued for Chinese Patent Application No. 200980141911.3, dated May 30, 2012, 4 pages.
Office Action (with English translation) for Chinese Patent Application No. 200980142589.6, dated Sep. 5, 2012, 9 pages.
International Preliminary Report on Patentability for International Patent Application No. PCT/US2009/056317, dated Sep. 27, 2012, 8 pages.
Office Action issued for U.S. Appl. No. 12/179,164, dated Oct. 9, 2012, 20 pages.
"Zag Acquires Automotive Invitational Services, Auto-Buying Service for More than 6 Million AAA Members," Business Wire, Jun. 13, 2006, 3 pages.
Office Action issued for U.S. Appl. No. 12/179,164, dated Jan. 29, 2013, 19 pages.
Office Action issued for Chinese Patent Application No. 200980141911.3, dated Feb. 6, 2013, 9 pages.
Examination Report issued for European Patent Application No. 09 813 513.0, dated Mar. 20, 2013, 7 pages.
"Carfax and EDS Announce New On-Line Service," PR Newswire, Oct. 13, 1994, 2 pages.
Office Action issued for U.S. Appl. No. 12/179,164, dated May 8, 2013, 19 pages.
Office Action issued for Chinese Patent Application No. 200980142589.6, dated Apr. 15, 2013, 10 pages.
Office Action (with English Translation) for Japanese Patent Application No. 2011-526297, dated Jul. 22, 2013, 19 pages.
Office Action (with English translation) for Japanese Patent Application No. 2011-526298, dated Jul. 22, 2013, 21 pages.
Office Action (with English translation) for Chinese Patent Application No. 200980141911.3, dated Jul. 26, 2013, 20 pages.
Office Action issued for Chinese Patent Application No. 200980142589.6, dated Oct. 21, 2013, 13 pages.
Office Action issued for U.S. Appl. No. 13/942,375, dated Nov. 20, 2013, 13 pages.
Office Action issued for U.S. Appl. No. 12/179,164, dated Jan. 3, 2014, 23 pages.
Office Action (with English translation) for Chinese Patent Application No. 200980141911.3, dated Feb. 21, 2014, 14 pages.
Notice of Allowance issued for Japanese Patent Application No. 2011-526297, dated Mar. 28, 2014, 3 pages.
Notice of Allowance issued for Japanese Patent Application No. 2011-526298, dated Mar. 28, 2014, 3 pages.

(56) References Cited

OTHER PUBLICATIONS

Office Action issued for U.S. Appl. No. 12/179,164, dated May 6, 2014, 13 pages.
Office Action issued for Chinese Patent Application No. 200980142589.6, dated May 8, 2014, 10 pages.
Office Action issued for U.S. Appl. No. 13/942,375, dated Jun. 12, 2014, 17 pages.
Office Action issued in U.S. Appl. No. 14/256,796, dated Aug. 14, 2014, 12 pages.
Office Action issued in U.S. Appl. No. 14/256,791, dated Aug. 26, 2014, 12 pages.
Office Action issued in U.S. Appl. No. 12/556,076, dated Sep. 2, 2014, 7 pages.
Office Action issued in U.S. Appl. No. 12/556,109, dated Sep. 2, 2014, 7 pages.
Office Action issued in U.S. Appl. No. 12/179,164, dated Sep. 15, 2014, 15 pages.
Office Action issued in U.S. Appl. No. 13/942,375, dated Oct. 6, 2014, 6 pages.
Office Action issued for U.S. Appl. No. 12/179,164, dated Dec. 24, 2014, 14 pages.
International Search Report and Written Opinion issued for PCT Application No. PCT/US2012/047672, dated Oct. 10, 2012, 7 pages.
Office Action issued for U.S. Appl. No. 13/554,743, dated Nov. 8, 2012, 18 pages.
Office Action issued for U.S. Appl. No. 13/554,743, dated May 31, 2013, 35 pages.
Debruine et al. "Capacity Costs with Time-Based and Use-Based Asset Value Attrition," Accounting Horizons, vol. 25, No. 2, 2011, pp. 337-356.
Hartman, "Automobile Replacement Case Studies for Engineering Economy Classes," The Engineering Economist, Spring 1998, vol. 43, No. 3, pp. 278-289.
Ohta et al, "Automobile Prices Revisited: Extensions of the Hedonic Hypothesis," Household Production and Consumption, National Bureau of Economic Research, 1976, vol. ISBN: 0-870-14515-0, pp. 325-398.
Prado, "The European Used-Car Market at a Glance: Hedonic Resale Price Valuation in Automotive Leasing Industry," Aug. 2009, Economics Bulletin, vol. 29 No. 3 pp. 2086-2099.
International Preliminary Report on Patentability issued for PCT Application No. PCT/US2012/047672, dated Apr. 3, 2014, 6 pages.
Office Action issued for U.S. Appl. No. 14/145,252, dated Dec. 3, 2014, 18 pages.
International Search Report and Written Opinion issued for PCT Application No. PCT/US12/44128, dated Sep. 12, 2012, 6 pages.
International Preliminary Report on Patentability issued for PCT Application No. PCT/US12/44128, dated Jan. 16, 2014, 5 pages.
Office Action issued for U.S. Appl. No. 13/173,357, dated Jul. 31, 2013, 19 pages.
Office Action issued for U.S. Appl. No. 13/173,357, dated Feb. 26, 2014, 28 pages.
Office Action issued for U.S. Appl. No. 14/054,390, dated Dec. 3, 2014, 13 pages.
Extended European Search Report issued for European Patent Application No. 12817230.1, dated Dec. 15, 2014, 5 pages.
Decision of Rejection issued for Chinese Patent Application No. 200980142589.6, dated Nov. 13, 2014, 10 pages.
Office Action issued for U.S. Appl. No. 13/173,357, dated Mar. 9, 2015, 26 pages.
Office Action issued for U.S. Appl. No. 14/666,005, dated Apr. 21, 2015, 12 pages.
Extended European Search Report issued for European Patent Application No. 15159912.3, dated May 19, 2015, 8 pages.
Office Action issued for U.S. Appl. No. 14/145,252, dated Jun. 26, 2015, 21 pages.
Office Action issued for U.S. Appl. No. 14/666,005, dated Sep. 11, 2015, 13 pages.
Office Action issued for U.S. Appl. No. 13/173,357, dated Oct. 2, 2015, 30 pages.
Office Action issued for U.S. Appl. No. 14/145,252, dated Oct. 6, 2015, 26 pages.
Office Action issued for Canadian Patent Application No. 2,736,477, dated Nov. 18, 2015, 6 pages.
Office Action issued for U.S. Appl. No. 12/179,164, dated Nov. 23, 2015, 21 pages.
Osler, Brian, "Rip-Off USA: The North American Car Market," Consumer Policy Review, Nov./Dec. 2002, vol. 12, No. 6, pp. 1-7.
Office Action issued for Japanese Patent Application No. 2014-522909, dated Nov. 6, 2015, 13 pages.
Office Action issued for Canadian Patent Application No. 2,837,338, dated Feb. 1, 2016, 4 pages.
Office Action issued for U.S. Appl. No. 14/666,005, dated Apr. 18, 2016, 10 pages.
Office Action issued for European Application No. 12817230.1, dated Mar. 16, 2016, 4 pages.
Office Action issued for European Application No. 15159912.3, dated May 18, 2016, 4 pages.
Notice of Allowance issued for Japanese Patent Application No. 2014-522939, dated May 31, 2016, 3 pages.
Office Action issued for U.S. Appl. No. 14/145,252, dated Jun. 15, 2016, 10 pages.
Office Action issued for U.S. Appl. No. 13/951,292, dated Jun. 20, 2016, 17 pages.
Office Action issued for Chinese Application No. 200980142589.6, dated Jul. 1, 2016, 4 pages.
Office Action issued for U.S. Appl. No. 14/068,836, dated Jul. 20, 2016, 13 pages.
Office Action issued for U.S. Appl. No. 14/666,005, dated Sep. 1, 2016, 7 pages.
Office Action issued for U.S. Appl. No. 14/031,930, dated Oct. 3, 2016, 25 pages.
Office Action issued for U.S. Appl. No. 12/179,164, dated Oct. 6, 2016, 10 pages.
Office Action issued for U.S. Appl. No. 14/026,111, dated Oct. 19, 2016, 24 pages.
Office Action issued for U.S. Appl. No. 14/145,252, dated Oct. 20, 2016, 9 pages.
Youngs, "Three Values Associated with Used-Vehicle Pricing," J.D. Power, «http://www.jdpower.com/cars/articles/tips-advice/three-values-associated-used-vehicle-pricing.», Feb. 24, 2012, 1 page.
Office Action issued for Chinese Application No. 201280035026.9, dated Sep. 29, 2016, 15 pages.
Office Action issued for U.S. Appl. No. 13/951,292, dated Nov. 22, 2016, 9 pages.
Reexamination Decision issued for Chinese Application No. 200980142589.6, dated Nov. 29, 2016, 12 pages.
Office Action issued for U.S. Appl. No. 14/068,836, dated Dec. 22, 2016, 9 pages.
Office Action issued for Canadian Patent Application No. 2,736,477, dated Nov. 28, 2016, 6 pages.
Office Action issued for Canadian Patent Application No. 2,837,338, dated Dec. 28, 2016, 4 pages.
Notice of Allowance issued for Japanese Patent Application No. 2016-021490, dated Feb. 16, 2017, 3 pages.
Office Action issued for U.S. Appl. No. 12/179,164, dated Feb. 28, 2017, 17 pages.
Office Action issued for U.S. Appl. No. 14/145,252, dated Apr. 19, 2017, 11 pages.
Office Action issued for U.S. Appl. No. 15/396,225, dated Apr. 19, 2017, 13 pages.
Office Action issued for U.S. Appl. No. 13/173,357, dated May 3, 2017, 26 pages.
Office Action issued for U.S. Appl. No. 14/026,111, dated May 26, 2017, 33 pages.
Notice of Allowance issued for Chinese Application No. 201280035026.9, dated May 25, 2017, 2 pages.
Office Action issued for U.S. Appl. No. 14/031,930, dated Jun. 15, 2017, 11 pages.
Office Action issued for U.S. Appl. No. 14/145,252, dated Aug. 24, 2017, 18 pages.

(56) References Cited

OTHER PUBLICATIONS

Office Action issued for U.S. Appl. No. 13/173,357, dated Oct. 30, 2017, 28 pages.
Office Action issued for U.S. Appl. No. 15/396,225, dated Oct. 19, 2017, 14 pages.
Office Action issued for U.S. Appl. No. 14/031,930, dated Oct. 4, 2017, 16 pages.
Office Action issued for Canadian Application No. 2,736,477, dated Nov. 3, 2017, 4 pages.
Office Action issued for U.S. Appl. No. 14/145,252, dated Jan. 10, 2018, 12 pages.
Office Action issued for U.S. Appl. No. 15/396,225, dated Jan. 23, 2018, 14 pages.
Office Action issued for Canadian Patent Application No. 2,837,338, dated Feb. 2, 2018, 5 pages.
Summons to Attend Oral Proceedings issued for European Patent Application No. 12817230.1, dated Feb. 9, 2018, 10 pages.
Office Action issued for U.S. Appl. No. 14/026,111, dated Feb. 28, 2018, 41 pages.
Office Action issued for U.S. Appl. No. 13/173,357, dated Apr. 16, 2018, 11 pages.
Office Action issued for U.S. Appl. No. 15/864,855, dated May 29, 2018, 13 pages.
Office Action issued for U.S. Appl. No. 14/031,930, dated Jun. 14, 2018, 16 pages.
Notice of Allowance issued for U.S. Appl. No. 15/864,855, dated Oct. 2, 2018, 6 pages.
Notice of Allowance issued for U.S. Appl. No. 13/173,357, dated Oct. 25, 2018, 12 pages.
Office Action issued for U.S. Appl. No. 14/031,930, dated Oct. 17, 2018, 12 pages.
Office Action issued for Canadian Patent Application No. 2,736,477, dated Oct. 31, 2018, 5 pages.
Office Action issued for Canadian Patent Application No. 2,837,338, dated Feb. 28, 2019, 5 pages.
Office Action issued for U.S. Appl. No. 14/031,930, dated May 30, 2019, 26 pages.
Notice of Allowance issued for U.S. Appl. No. 16/272,396, dated Jul. 15, 2019, 10 pages.
Office Action issued for U.S. Appl. No. 15/391,563, dated Sep. 25, 2019, 19 pages.
Office Action issued for Canadian Patent Application No. 2,736,477, dated Oct. 23, 2019, 5 pages.
Notice of Allowance issued for U.S. Appl. No. 16/272,396, dated Dec. 10, 2019, 8 pages.
Office Action issued for Chinese Application for Invention No. 201710105808.X, dated Jan. 22, 2020, 13 pages.
Examination Report issued for Canadian Patent Application No. 2,837,338, dated Feb. 3, 2020, 6 pages.
Notice of Allowance issued for U.S. Appl. No. 16/272,396, dated Mar. 9, 2020, 8 pages.
Notice of Allowance issued for U.S. Appl. No. 16/148,695, dated Apr. 16, 2020, 20 pages.
Notice of Allowance issued for U.S. Appl. No. 16/564,808, dated Jul. 20, 2020, 11 pages.
Office Action issued for U.S. Appl. No. 16/665,702, dated Sep. 2, 2020, 36 pages.
Diminished Value of Georgia ("Retail vs. Wholesale vs. Trade-Ins vs. Private Party") Jan. 9, 2013, 7 pages.

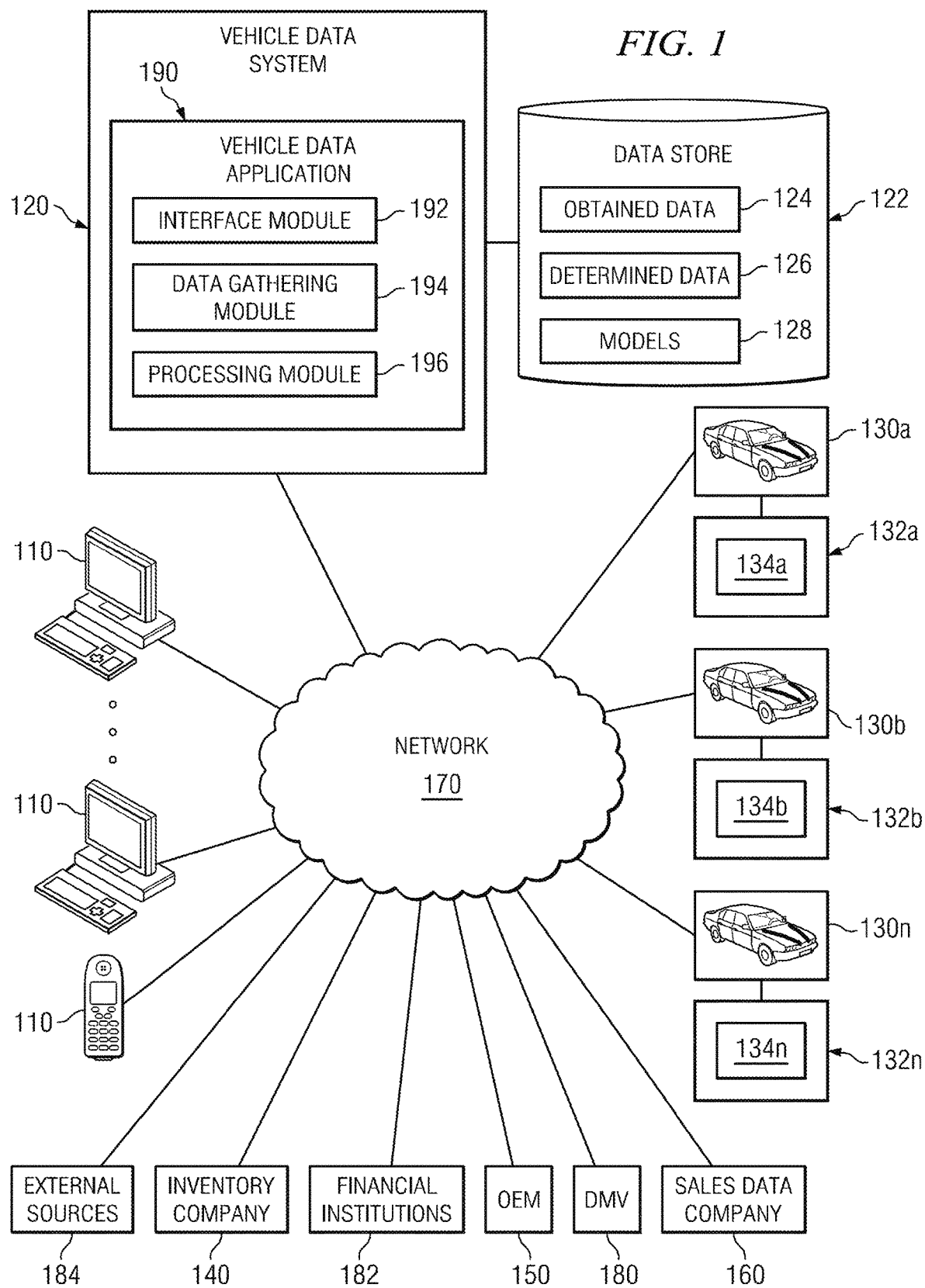

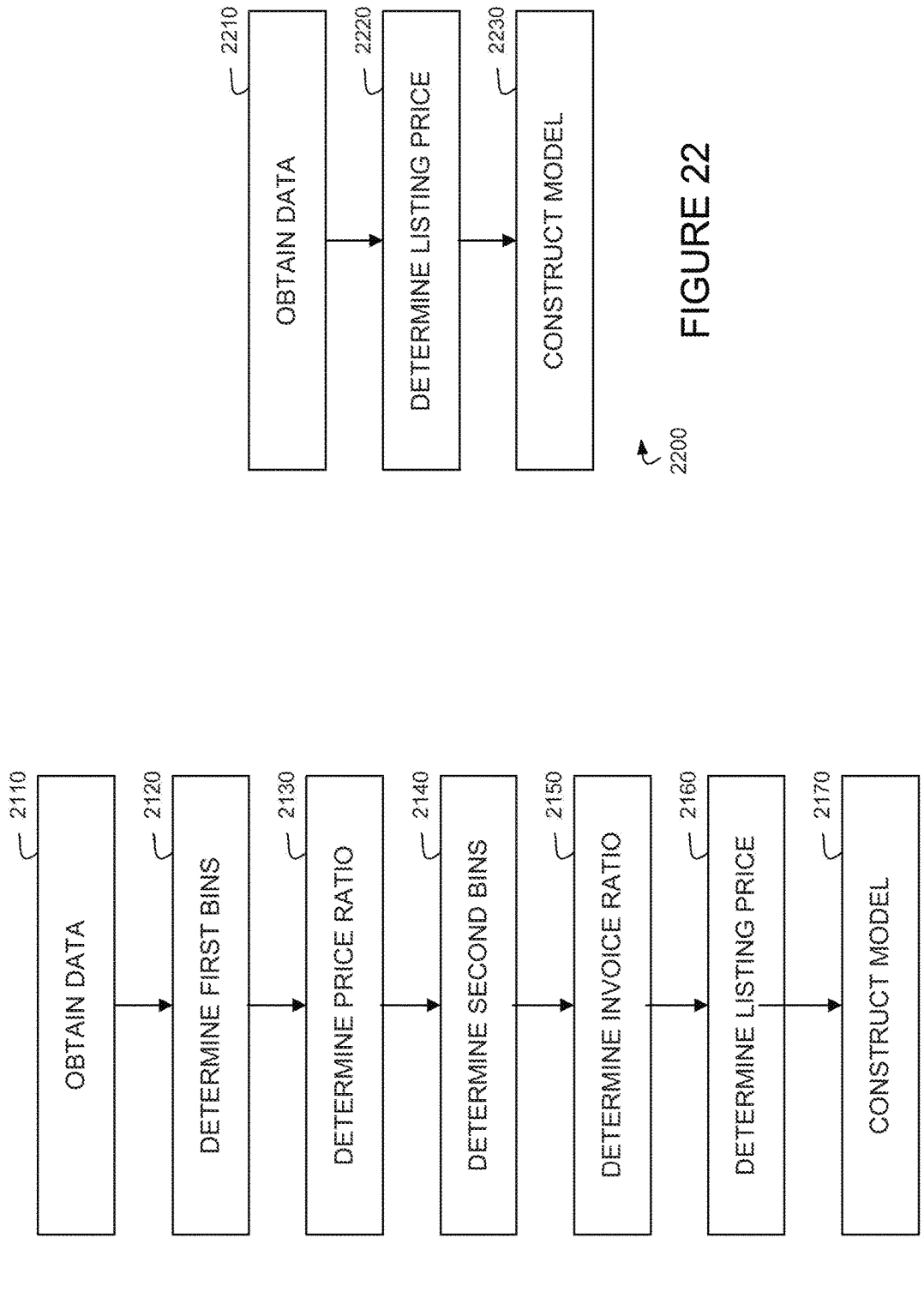

SYSTEM AND METHOD FOR THE UTILIZATION OF PRICING MODELS IN THE AGGREGATION, ANALYSIS, PRESENTATION AND MONETIZATION OF PRICING DATA FOR VEHICLES AND OTHER COMMODITIES

CROSS REFERENCE TO RELATED APPLICATIONS

This application is a continuation of, and claims a benefit of priority from, U.S. patent application Ser. No. 16/272,396, filed Feb. 11, 2019, now U.S. Pat. No. 10,679,263, entitled "SYSTEM AND METHOD FOR THE UTILIZATION OF PRICING MODELS IN THE AGGREGATION, ANALYSIS, PRESENTATION AND MONETIZATION OF PRICING DATA FOR VEHICLES AND OTHER COMMODITIES," which is a continuation of, and claims a benefit of priority from, U.S. patent application Ser. No. 15/674,317, filed Aug. 10, 2017, now U.S. Pat. No. 10,262,344, entitled "SYSTEM AND METHOD FOR THE UTILIZATION OF PRICING MODELS IN THE AGGREGATION, ANALYSIS, PRESENTATION AND MONETIZATION OF PRICING DATA FOR VEHICLES AND OTHER COMMODITIES," which is a continuation of, and claims a benefit of priority from, U.S. patent application Ser. No. 14/068,836, filed Oct. 31, 2013, now U.S. Pat. No. 9,767,491, entitled "SYSTEM AND METHOD FOR THE UTILIZATION OF PRICING MODELS IN THE AGGREGATION, ANALYSIS, PRESENTATION AND MONETIZATION OF PRICING DATA FOR VEHICLES AND OTHER COMMODITIES," which is a continuation of, and claims a benefit of priority from, U.S. patent application Ser. No. 12/896,145, filed Oct. 1, 2010, now U.S. Pat. No. 8,612,314, entitled "SYSTEM AND METHOD FOR THE UTILIZATION OF PRICING MODELS IN THE AGGREGATION, ANALYSIS, PRESENTATION AND MONETIZATION OF PRICING DATA FOR VEHICLES AND OTHER COMMODITIES," which is a continuation-in-part of U.S. patent application Ser. No. 12/556,109, filed Sep. 9, 2009, now U.S. Pat. No. 9,111,308, entitled "SYSTEM AND METHOD FOR CALCULATING AND DISPLAYING PRICE DISTRIBUTIONS BASED ON ANALYSIS OF TRANSACTIONS," which claims a benefit of priority from U.S. Provisional Applications No. 61/095,550, filed Sep. 9, 2008, entitled "SYSTEM AND METHOD FOR AGGREGATION, ANALYSIS, AND MONETIZATION OF PRICING DISTRIBUTION DATA FOR VEHICLES AND OTHER COMMODITIES" and No. 61/095,376, filed Sep. 9, 2008, entitled "SYSTEM AND METHOD FOR CALCULATING AND DISPLAYING COMPLEX PRODUCT PRICE DISTRIBUTIONS BASED ON AGGREGATION AND ANALYSIS OF INDIVIDUAL TRANSACTIONS." U.S. patent application Ser. No. 12/896,145 also claims a benefit of priority from U.S. Provisional Application No. 61/248,083, filed Oct. 2, 2009, entitled "SYSTEM AND METHOD FOR THE UTILIZATION OF PRICING MODELS IN THE AGGREGATION, ANALYSIS, PRESENTATION AND MONETIZATION OF PRICING DATA FOR VEHICLES AND OTHER COMMODITIES." All applications referenced herein are hereby fully incorporated for all purposes.

TECHNICAL FIELD

The present disclosure relates generally to commodity pricing. More particularly, the present disclosure relates to the aggregation, analysis and presentation of data pertaining to a commodity. Even more specifically, the present disclosure relates to the use of embodiments of pricing models in different contexts during the analysis this data.

BACKGROUND

Consumers are at a serious negotiation disadvantage when they do not have information relevant to a specifically desired product or do not understand such information. Exacerbating this problem is the fact that complex, negotiated transactions can be difficult for consumers to understand due to a variety of factors, including interdependence between local demand and availability of products or product features, the point-in-time in the product lifecycle at which a transaction occurs, and the interrelationships of various transactions to one another. For example, a seller may sacrifice margin on one aspect of one transaction and recoup that margin from another transaction with the same (or a different) customer. Furthermore, currently available data for complex transactions is single dimensional. To illustrate with a specific example, a recommended price (e.g., $1,000) may not take into account how sensitive that price is (is $990 a good or bad price)? Recommended prices also become decreasingly accurate as the product, location, and availability of a particular product is defined with greater specificity.

These circumstances can be seen in a variety of contexts. In particular, the automotive transaction process may entail complexity of this type. Specifically, the price a consumer pays may depend on the vehicle, the dealership, historical patterns, anticipated sales patterns, promotion programs, the customer's and dealer's emotions on a particular day, the time of the day, the day of the month, and the dynamics of the negotiation itself, and so on. Often times, neither the consumers nor the dealers can fully understand what a good or great price is for a certain vehicle having a particular combination of make, model, trim combinations or packages, etc. Additionally, even though new vehicles are commodities, transparent pricing information resources for consumers simply do not exist. Some dealers attempt to optimize or maximize pricing from each individual customer through the negotiation process which inevitably occurs with customers in the setting of an automotive vehicle purchase.

There are therefore a number of unmet desires when it comes to obtaining, analyzing and presenting vehicle pricing data.

SUMMARY

Embodiments of systems and methods for the aggregation, analysis, display and monetization of pricing data for commodities in general, and which may be particularly useful applied to vehicles, is disclosed. In particular, in certain embodiments, historical transaction data may be aggregated into data sets and the data sets processed to determine pricing data, where this determined pricing data may be associated with a particular configuration of a vehicle. The pricing data thus determined may include, for example, an average price, a set of transaction prices, and one or more price ranges including a good price range and a great price range.

Using the historical transactions associated with a user-specified vehicle configuration, desired pricing information may be obtained. In many cases, however, there may be fewer historical transactions than is desired to generate reliable or accurate predictions for a specified vehicle. Such data scarcity may occur in the cases of a vehicle model which is relatively new to the market or is an exotic of which few models are sold. To increase the accuracy of determined pricing data, it may be useful to apply different or additional price ratio models that leverage incremental data.

Accordingly, in one embodiment, a method may comprise determining one or more price models to utilize in various conditions based at least in part on whether pricing information associated with historical transactions of a set of vehicles corresponding to the desired vehicle within a certain time period in historical data is sufficient for computing the pricing data.

Embodiments may utilize appropriate price models in the cases where such conditions are extant. As these price models may be applicable in instances where data is scarce, they may be referred to herein as data scarcity models. In one embodiment, one or more price models may be generated for use in cases where fewer than a desired number of historical transactions are present in the bin of a specified vehicle. In one embodiment, one or more price models may be generated for cases where there are fewer than, equal to, or more than a certain number of list prices for the specified vehicle available. In one embodiment, one or more price models may pertain to new vehicle models, where certain of these price models may be determined for cases where there is historical transaction data for a similar make and model from a past year and other price models determined for new models in cases where there is no such historical transaction data. In some embodiments, in addition to the general price model, one or more data scarcity models may be utilized by the vehicle data system to determine and present pricing data for the specified vehicle.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 1 depicts of one embodiment of a topology including a vehicle data system.

FIG. 21 depicts one embodiment of determining a price model.

FIG. 22 depicts one embodiment of determining a price model.

DETAILED DESCRIPTION

Figure 2A:
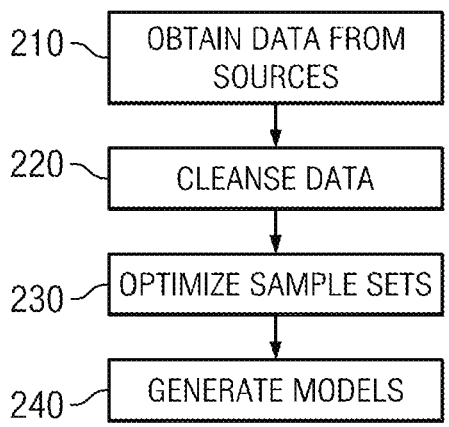
FIGS. 2A and 2B depict one embodiment of a method for determining and presenting pricing data.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

The invention and the various features and advantageous details thereof are explained more fully with reference to the non-limiting embodiments that are illustrated in the accompanying drawings and detailed in the following description. These embodiments may be better understood with reference to U.S. patent application Ser. No. 12/556,076, entitled "SYSTEM AND METHOD FOR AGGREGATION, ANALYSIS, PRESENTATION AND MONETIZATION OF PRICING DATA FOR VEHICLES AND OTHER COMMODITIES," U.S. patent application Ser. No. 12/556,109, entitled "SYSTEM AND METHOD FOR CALCULATING AND DISPLAYING PRICE DISTRIBUTIONS BASED ON ANALYSIS OF TRANSACTIONS," and U.S. patent application Ser. No. 12/556,137, entitled "SYSTEM AND METHOD FOR SALES GENERATION IN CONJUNCTION WITH A VEHICLE DATA SYSTEM," all of which were filed on Sep. 9, 2009 and are fully incorporated by reference herein. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. For example, though embodiments have been presented using the example commodity of vehicles it should be understood that other embodiments may be equally effectively applied to other commodities.

As discussed above, complex, negotiated transactions can be difficult for consumers to understand due to a variety of factors, especially in the context of a vehicle purchases. In particular, the historical lack of transparency around vehicle pricing still exists in the automotive industry, resulting in cases where different consumers can go to the same dealership on the same day and pay substantially different prices for the exact same vehicle sold by the same salesperson.

To remedy this lack of availability of pricing information a variety of solutions have been unsuccessfully attempted. In the mid 1990s, companies such as Autobytel (www.autobytel.com) launched websites focused on enabling consumer's access to manufacturer's new car pricing information. Soon after, Kelley Blue Book (www.KBB.com) launched its own websites that enabled consumers to determine approximate "trade in values" and "retail values" of used cars.

In 1998, CarsDirect developed its own interpretation of what "consumers should pay" for a vehicle by launching its upfront pricing tools. CarsDirect's upfront price is a published figure a consumer could actually purchase a vehicle for through CarsDirect's auto brokering service. This price subsequently became the consumer benchmark for negotiating with dealers in their area.

In 2000, Edmunds (www.edmunds.com) launched a pricing product called True Market Value (TMV), which is marked on their website as "calculating what others are paying for new and used vehicles, based on real sales data from your geographic area." This vague language enables Edmunds to represent their data to their customer as accurate while the data may only by what they believe the typical buyer is paying for a specific vehicle within a pre-determined region. Although not necessarily accurate, TMV has become the most widely recognized new car pricing "average" in the market place.

In 2005, Zag (Zag.com) launched an affinity auto buying program that enabled consumers to purchase upfront pricing from its network of nationwide dealer partners. Partner dealers are required to input low, "fleet" level pricing in Zag's pricing management system. These prices are displayed to the consumer and are measured against Kelley Blue Book's New Car Blue Book Value (which is similar to Edmunds' TMV) and these prices are defined by Zag as "what people are really paying for a vehicle."

Problematically, current consumer vehicle pricing resources, including KBB.com, Edmunds.com and various blogs and research sites, allow for the configuration of a particular vehicle but only present a single recommended price for the vehicle, no matter the specified configuration. Due to a variety of circumstances (including the lack of transparency of how the recommend price was determined, whether and how any actual data was used to determine the recommended price or how such data was obtained) there is no indication of where the recommended price sits relative to prices others paid and whether the recommended price is a good price, a great price, etc. (either relative to other prices, or in an absolute sense). Additionally, many of the existing pricing sites are "lead generation" sites, meaning that they generate revenue by referring consumers to dealers without requiring dealers to commit to a specific price, inherently making these types of sites biased in favor of dealers when presenting pricing to consumers. Moreover, these pricing recommendation sites may not utilize actual sales transaction data, but instead be estimates calculated manually based on aggregated or manipulated data.

Accordingly, a myriad number of problems exist with current approaches to pricing solutions for vehicles and other commodities. One such problem is that a consumer may not have any context with which to interpret a price obtained from a vehicle pricing resource and therefore, a consumer may have little idea what is a good price, a great price, an average price, etc., nor will they know what the dealer's actual cost is for a desired vehicle. This confusion may be exacerbated given the number of variables which may have a bearing on that particular consumer's transaction, including the particular locale where the consumer intends to purchase the vehicle or the specific configuration of vehicle desired by the consumer. Consequently, the consumer may not be convinced that a price provided by a pricing site is particularly relevant to their situation or goals and may therefore only be able to use such a provided price as a baseline.

There are, therefore, a number of unmet desires when it comes to obtaining new or used vehicle pricing. These desires include the ability to use actual sales transaction data in the calculation of prices for particular vehicles and account for variations in the configuration of vehicles and the geography in which the vehicle will be purchased. Furthermore, it may be desired that such pricing data is analyzed and displayed in such a manner that a holistic view of pertinent sales transaction data can be presented to allow the distribution of pertinent sales data and the various ranges of prices to be easily ascertained and a determination of a certain price levels easily made.

To meet those needs among others, attention is now directed to the aggregation, analysis, display and monetization of pricing data for commodities in general, and which may be particularly useful applied to vehicles. In particular, actual sales transaction data may be obtained from a variety of sources. This historical transaction data may be aggregated into data sets and the data sets processed to determine desired pricing data, where this determined pricing data may be associated with a particular configuration (e.g., make, model, power train, options, etc.) of a vehicle. An interface may be presented to a user where a user may provide relevant information such as attributes of a desired vehicle configuration, a geographic area, etc. The user can then be presented with a display pertinent to the provided information utilizing the aggregated data set or the associated determined pricing data where the user can make a variety of determinations such as a mean price, dealer cost or factory invoice for a desired vehicle, pricing distributions, etc. based on the provided display. In one embodiment, this interface may be a website such that the user can go to the website to provide relevant information and the display corresponding to the provided information is presented to the user through the website.

Embodiments of the systems and methods disclosed herein may be better explained with reference to FIG. 1 which depicts one embodiment of a topology which may be used to implement embodiments of the systems and methods. Topology 100 comprises a set of entities including vehicle data system 120 (also referred to herein as the TrueCar system) which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, car dealers 130. Network 170 may be for example, a wireless or wireline communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments disclosed herein. These applications may include a vehicle data application 190 comprising one or more applications (instructions embodied on a computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments disclosed herein or determined during the implementation of those embodiments.

Vehicle data system 120 may provide a wide degree of functionality including utilizing one or more interfaces 192 configured to for example, receive and respond to queries from users at computing devices 110; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122. A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110. More specifically, in one embodiment interfaces 192 may visually present the selected data set to the user in a highly intuitive and useful manner.

In particular, in one embodiment, a visual interface may present at least a portion of the selected data set as a price curve, bar chart, histogram, etc. that reflects quantifiable prices or price ranges (e.g., "average," "good," "great," "overpriced" etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the user's understanding of the presented data, the interface may also present data related to incentives which were utilized to determine the presented data or how such incentives were applied to determine presented data.

Turning to the various other entities in topology 100, dealer 130 may be a retail outlet for vehicles manufactured by one or more of OEMs 150. To track or otherwise manage sales, finance, parts, service, inventory and back office administration needs dealers 130 may employ a dealer management system (DMS) 132. Since many DMS 132 are Active Server Pages (ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" (price with no negotiation) price and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments disclosed herein, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments disclosed herein.

Before delving into the details of various embodiments it may be helpful to give a general overview of an embodiment of the invention with respect to the above described embodiment of a topology, again using the example commodity of vehicles. At certain intervals then, vehicle data system 120 may obtain by gathering (for example, using interface 192 to receive or request) data from one or more of inventory companies 140, manufacturers 150, sales data companies 160, financial institutions 182, DMVs 180, external data sources 184 or dealers 130. This data may include sales or other historical transaction data for a variety of vehicle configurations, inventory data, registration data, finance data, vehicle data, etc. (the various types of data obtained will be discussed in more detail later). It should be noted that differing types of data may be obtained at different time intervals, where the time interval utilized in any particular embodiment for a certain type of data may be based, at least in part, on how often that data is updated at the source, how often new data of that type is generated, an agreement between the source of the data and the providers of the vehicle data system 120 or a wide variety of other factors. Once such data is obtained and stored in data store 122, it may be analyzed and otherwise processed to yield data sets corresponding to particular vehicle configurations (which may include, for example, include vehicle make, model, power train, options, etc.) and geographical areas (national, regional, local, city, state, zip code, county, designated market area (DMA), or any other desired geographical area).

At some point then, a user at a computing device may access vehicle data system 120 using one or more interfaces 192 such as a set of web pages provided by vehicle data system 120. Using this interface 192 a user may specify a vehicle configuration by defining values for a certain set of vehicle attributes (make, model, trim, power train, options, etc.) or other relevant information such as a geographical location or incentives offered in conjunction with a vehicle of the specified configuration. Information associated with the specified vehicle configuration may then be presented to the user through interface 192. Data corresponding to the specified vehicle configuration can be determined using a data set associated with the specified vehicle configuration, where the determined data may include data such as adjusted transaction prices, mean price, dealer cost, standard deviation or a set of quantifiable price points or ranges (e.g., "average," "good," "great," "overpriced," etc. prices). The processing of the data obtained by the vehicle data system 120 and the determined data will be discussed in more detail later in the disclosure.

In particular, pricing data associated with the specified vehicle configuration may be determined and presented to the user in a visual manner. Specifically, in one embodiment, a price curve representing actual transaction data associated with the specified vehicle configuration (which may or may not have been adjusted) may be visually displayed to the user, along with visual references indicating one or more price ranges and one or more reference price points (e.g., invoice price, MSRP, dealer cost, market average, dealer cost, internet average, etc.). In some embodiments, these visual indicators may be displayed such that a user can easily determine what percentage of consumers paid a certain price or the distribution of prices within certain price ranges. Additionally, in some embodiments, the effect, or the application, of incentives may be presented in conjunction with the display. Again, embodiments of these types of interfaces will be discussed in more detail at a later point.

As the information provided by the vehicle data system 120 may prove invaluable for potential consumers, and may thus attract a large number of "visitors," many opportunities to monetize the operation and use of vehicle data system 120 may present themselves. These monetization mechanisms include: advertising on the interfaces 192 encountered by a user of vehicle data system 120; providing the ability of dealers to reach potential consumers through the interfaces 192 or through another channel (including offering upfront pricing from dealers to users or a reverse auction); licensing and distribution of data (obtained or determined); selling analytics toolsets which may utilize data of vehicle data system 120 or any number of other monetization opportunities, embodiments of which will be elaborated on below.

Figure 2B:
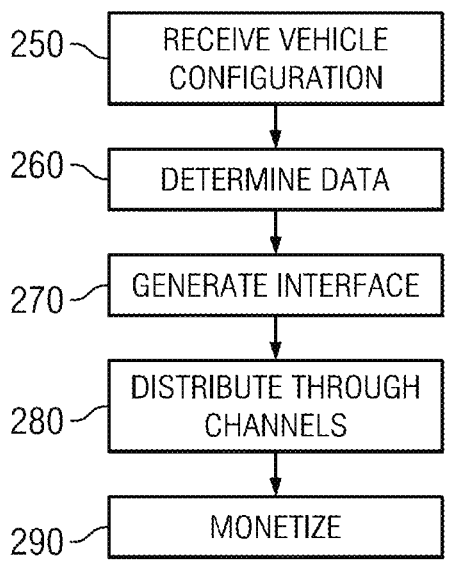

Turning now to FIGS. 2A and 2B, one particular embodiment of a method for the operation of a vehicle data system is depicted. Referring first to the embodiment of FIG. 2A, at step 210 data can be obtained from one or more of the data sources (inventory companies 140, manufacturers 150, sales data companies 160, financial institutions 182, DMVs 180, external data sources 184, dealers 130, etc.) coupled to the vehicle data system 120 and the obtained data can be stored in the associated data store 122. In particular, obtaining data may comprise gathering the data by requesting or receiving the data from a data source. It will be noted with respect to obtaining data from data sources that different data may be obtained from different data sources at different intervals, and that previously obtained data may be archived before new data of the same type is obtained and stored in data store 122.

In certain cases, some of the operators of these data sources may not desire to provide certain types of data, especially when such data includes personal information or certain vehicle information (VIN numbers, license plate numbers, etc.). However, in order to correlate data corresponding to the same person, vehicle, etc. obtained from different data sources it may be desirable to have such information. To address this problem, operators of these data sources may be provided a particular hashing algorithm and key by operators of vehicle data system 120 such that sensitive information in data provided to vehicle data system 120 may be submitted and stored in data store 122 as a hashed value. Because each of the data sources utilizes the same hashing algorithm to hash certain provided data, identical data values will have identical hash values, facilitating matching or correlation between data obtained from different (or the same) data source(s). Thus, the data source operators' concerns can be addressed while simultaneous avoiding adversely impacting the operation of vehicle data system 120.

Once data is obtained and stored in data store 122, the obtained data may be cleansed at step 220. The cleansing of this data may include evaluation of the data to determine if it conforms to known values, falls within certain ranges or is duplicative. When such data is found, it may be removed from the data store 122, the values which are incorrect or fall outside a threshold may be replaced with one or more values (which may be known specifically or be default values), or some other action entirely may be taken.

This cleansed data may then be used to form and optimize sample sets of data at step 230. This formation and optimization process may include grouping data into data sets according to geography (for example, national, regional, local, state, county, zip code, DMA, some other definition of a geographic area such as within 500 miles of a location, etc.) and optimizing these geographic data sets for a particular vehicle configuration. This optimization process may result in one or more data sets corresponding to a particular vehicle or group or type of vehicles, a set of attributes of a vehicle and an associated geography.

Using the data sets resulting from the optimization process, a set of models may be generated at step 240. These models may include a set of dealer cost models corresponding to one or more of the data sets resulting from the optimization process discussed above. An average price ratio (for example, price paid/dealer cost) model for the data set may also be generated using the obtained data. It will be noted that these models may be updated at certain intervals, where the interval at which each of the dealer cost models or average price ratio model is generated may, or may not, be related to the intervals at which data is obtained from the various data sources or the rate at which the other model(s) are generated.

Moving on to the portion of the embodiment depicted in FIG. 2B, at step 250 the vehicle data system may receive a specific vehicle configuration through a provided interface. In one embodiment, for example, a user at a web page provided by vehicle data system 120 may select a particular vehicle configuration using one or more menus or may navigate through a set of web pages to provide the specific vehicle configuration. This specified vehicle configuration may comprise values for a set of attributes of a desired vehicle such as a make, model, trim level, one or more options, etc. The user may also specify a geographic locale where he is located or where he intends to purchase a vehicle of the provided specification.

Other information which a user may provide includes incentive data pertaining to the specified vehicle configuration. In one embodiment, when a user specifies a particular vehicle configuration the vehicle data system 120 will present the user with a set of incentives associated with the specified vehicle configuration if any are available. The user may select zero or more of these incentives to apply.

Pricing data associated with the specified vehicle configuration may then be determined by the vehicle data system 120 at step 260. This data may include adjusted transaction prices, mean, median, and probability distributions for pricing data associated with the specified vehicle configuration within certain geographical areas (including, for example, the geographic locale specified); calculating a set of quantifiable price points or ranges (e.g., "average," "good," "great," "overpriced," etc. prices or price ranges); determining historical price trends or pricing forecasts; or determining any other type of desired data. In one embodiment, the data associated with the specified vehicle configuration may be determined using the price ratio model and historical transaction data associated with the specified vehicle configuration as will be discussed.

An interface for presentation of the determined pricing data associated with the specified vehicle configuration may then be generated at step 270. These interfaces may comprise a visual presentation of such data using, for example, bar charts, histograms, Gaussian curves with indicators of certain price points, graphs with trend lines indicating historical trends or price forecasts, or any other desired format for the visual presentation of data. In particular, in one embodiment, the determined data may be fit and displayed as a Gaussian curve representing actual transaction data associated with the specified vehicle configuration, along with visual indicators on, or under, the curve which indicate determined price points or ranges, such as one or more quantifiable prices or one or more reference price points (for example, invoice price, MSRP, dealer cost, market average, dealer cost, internet average, etc.). The user may also be presented with data pertaining to any incentive data utilized to determine the pricing data. Thus, using such an interface a user can easily determine certain price points, what percentage of consumers paid a certain price or the distribution of prices within certain ranges. It should be noted here that though the interfaces elaborated on with respect to the presentation of data to a user in conjunction with certain embodiments are visual interfaces, other interfaces which employ audio, tactile, some combination, or other methods entirely may be used in other embodiments to present such data.

The interfaces may be distributed through a variety of channels at step 280. The channels may comprise a consumer facing network based application (for example, a set of web pages provided by vehicle data system 120 which a consumer may access over a network at a computing device such as a computer or mobile phone and which are tailored to the desires of, or use by, consumers); a dealer facing network based application (a set of web pages provided by the vehicle data system 120 which are tailored to the desires of, or use by, dealers); text or multimedia messaging services; widgets for use in web sites or in other application setting, such as mobile phone applications; voice applications accessible through a phone; or almost any other channel desired. It should be noted that the channels described here, and elsewhere, within this disclosure in conjunction with the distribution of data may also be used to receive data (for example, a user specified vehicle configuration or the like), and that the same or some combination of different channels may be used both to receive data and distribute data.

The distribution of this data through these various channels may be monetized at step 290. This monetization may be achieved in a number of ways, including by selling display or contextual ads, contextual links, sponsorships, etc. in conjunction with one or more interfaces (such as web pages, etc.) provided by vehicle data system 120; providing the ability of users to purchase vehicles from dealers through one or more provided interfaces and charging dealers, users or both to utilize this service; providing a reverse auction system whereby dealers can present prices for particular vehicles to the user and the dealers are charged for this ability, charging dealers or users for the licensing or provisioning of obtained or determined data to the dealers or user; charging for access to tools for manufacturer's, dealers, financial institutions, leasing groups, and other end user's which may include custom analytics or data; or almost any other way desirable to monetize the applications, capabilities or data associated with vehicle data system 120.

As may be apparent from a review of the above discussion, embodiments of vehicle data system 120 may entail a number of processes occurring substantially simultaneously or at different intervals and that many computing devices 110 may desire to access vehicle data system 120 at any given point. Accordingly, in some embodiments, vehicle data system 120 may be implemented utilizing an architecture or infrastructure that facilitates cost reduction, performance, fault tolerance, efficiency and scalability of the vehicle data system 120.

Figure 3:
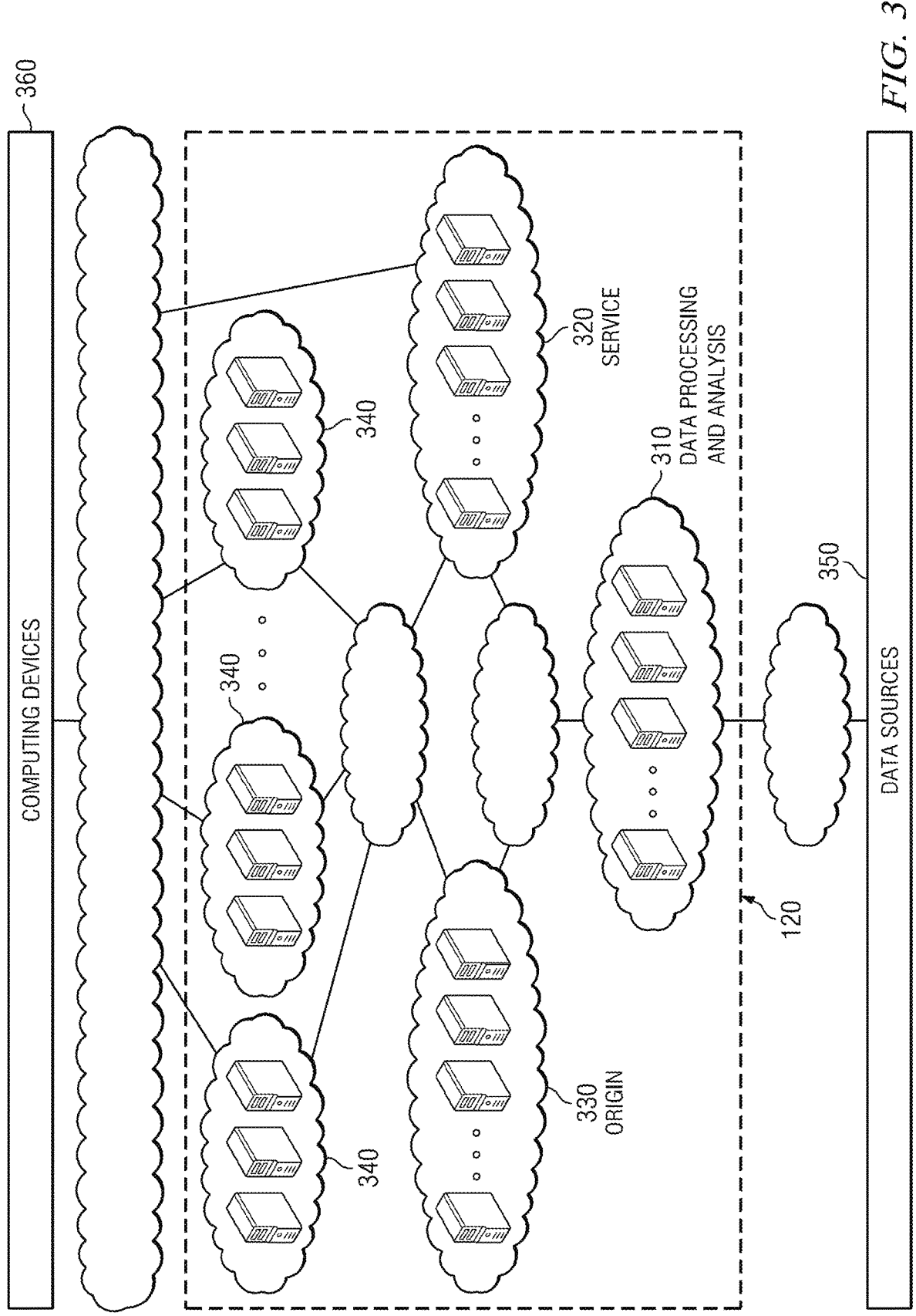
FIG. 3 depicts one embodiment of an architecture for a vehicle data system.

One embodiment of such an architecture is depicted in FIG. 3. Specifically, one embodiment of vehicle data system 120 may be operable to provide a network based interface including a set of web pages accessible over the network, including web pages where a user can specify a desired vehicle configuration and receive pricing data corresponding to the specified vehicle configuration. Such a vehicle data system 120 may be implemented utilizing a content delivery network (CDN) comprising data processing and analysis servers 310, services servers 320, origin servers 330 and server farms 340 distributed across one or more networks, where servers in each of data processing and analysis servers 310, services servers 320, origin servers 330 and server farms 340 may be deployed in multiple locations using multiple network backbones or networks where the servers may be load balanced as is known in the art.

Data processing and analysis servers 320 may interact with one or more data sources 350 (examples of which are discussed above) to obtain data from these data sources 350 at certain time intervals (for example, daily, weekly, hourly, at some ad-hoc variable interval, etc.) and process this obtained data as discussed both above in more detail later herein. This processing includes, for example, the cleansing of the obtained data, determining and optimizing sample sets, the generation of models, etc.

Origin servers 330 may populate a web cache at each of server farms 340 with content for the provisioning of the web pages of the interface to users at computing devices 360 (examples of which are discussed above). Server farms 340 may provide the set of web pages to users at computing devices 110 using web caches at each server farm 340. More specifically, users at computing devices 360 connect over the network to a particular server farm 340 such that the user can interact with the web pages to submit and receive data thorough the provided web pages. In association with a user's use of these web pages, user requests for content may be algorithmically directed to a particular server farm 340. For example, when optimizing for performance locations for serving content to the user may be selected by choosing locations that are the fewest hops, the fewest number of network seconds away from the requesting client or the highest availability in terms of server performance (both current and historical), so as to optimize delivery across the network.

Certain of the web pages or other interfaces provided by vehicle data system 120 may allow a user to request services, interfaces or data which cannot be provided by server farms 340, such as requests for data which is not stored in the web cache of server farms 340 or analytics not implemented in server farms 340. User requests which cannot be serviced by server farm 340 may be routed to one of service servers 330. These requests may include requests for complex services which may be implemented by service servers 330, in some cases utilizing the data obtained or determined using data processing and analysis servers 310.

Figure 4A:
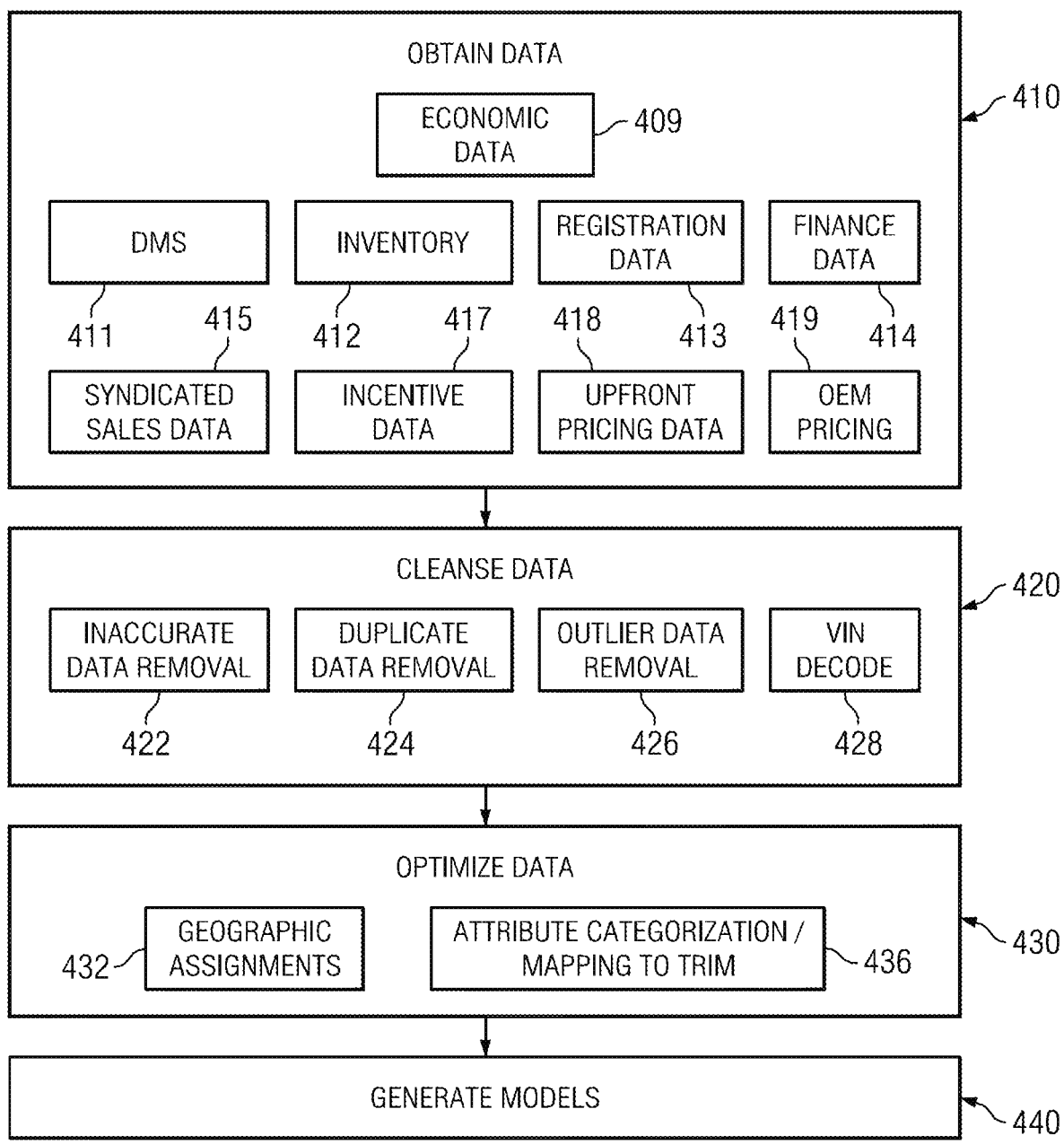
FIGS. 4A and 4B depict one embodiment of a method for determining and presenting pricing data.
Figure 4B:
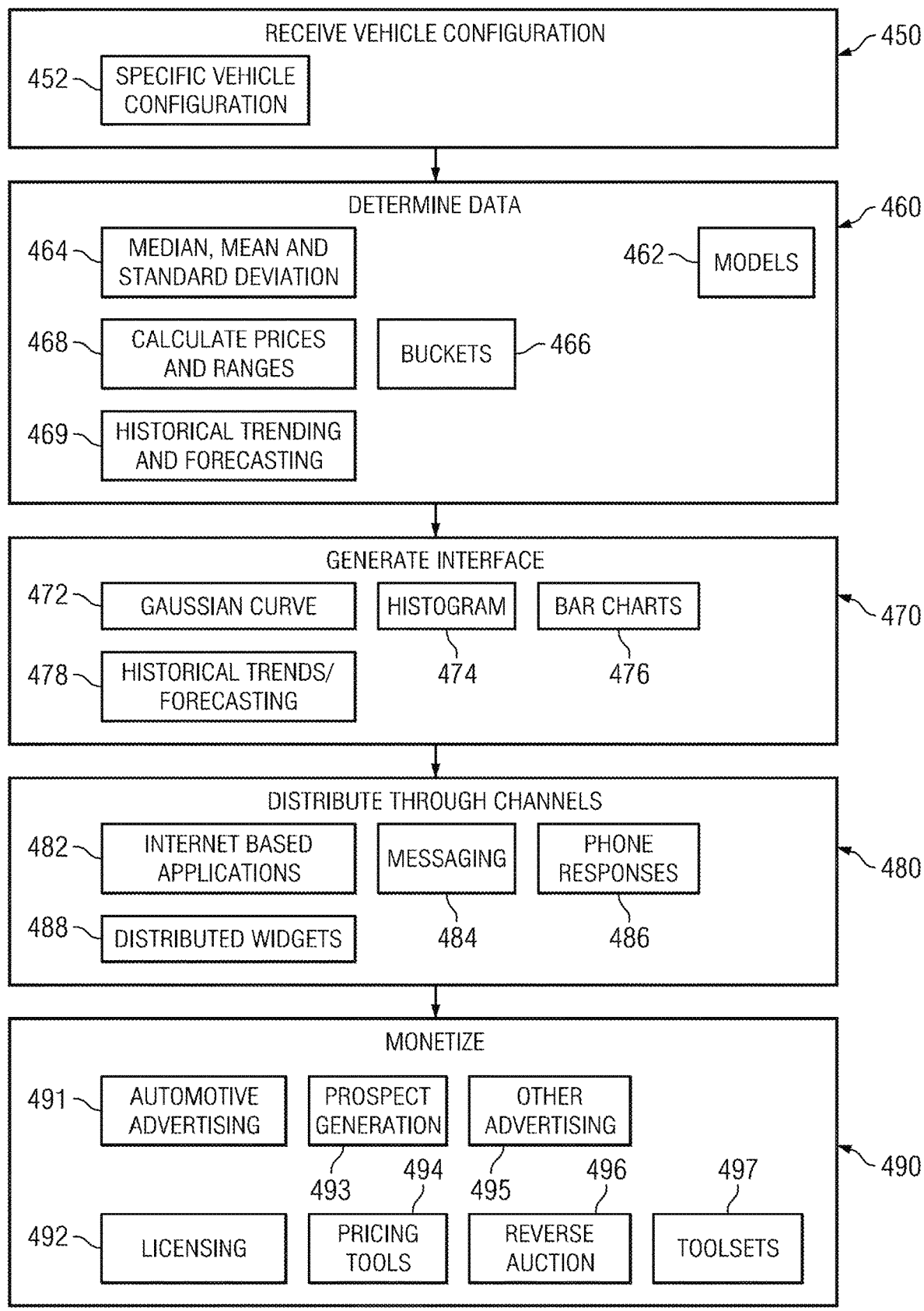

It may now be useful to go over in more detail, embodiments of methods for the operation of a vehicle data system which may be configured according to embodiments above described architecture or another architecture altogether. FIGS. 4A and 4B depict one embodiment of just such a method. Referring first to FIG. 4A, at step 410 data can be obtained from one or more of the data sources coupled to the vehicle data system and the obtained data stored in a data store. The data obtained from these various data sources may be aggregated from the multiple sources and normalized. The various data sources and the respective data obtained from these data sources may include some combination of DMS data 411, inventory data 412, registration or other government (DMV, Sec. of State, etc.) data 413, finance data 414, syndicated sales data 415, incentive data 417, upfront pricing data 418, OEM pricing data 419 or economic data 409.

DMS data 411 may be obtained from a DMS at a dealer. The DMS is a system used by vehicle dealers to manage sales, finance, parts, service, inventory or back office administration needs. Thus, data which tracks all sales transactions for both new and used cars sold at retail or wholesale by the dealer may be stored in the DMS and obtained by the vehicle data system. In particular, this DMS data 411 may comprise data on sales transaction which have been completed by the dealer (referred to as historical sales transactions), including identification of a vehicle make, model, trim, etc. and an associated transaction price at which the vehicle was purchased by a consumer. In some cases, sales transaction data may also have a corresponding dealer cost for that vehicle. As most DMS are ASP-based, in some embodiments the sales transaction or other DMS data 411 can be obtained directly from the DMS or DMS provider utilizing a "key" (for example, an ID and Password with set permissions) that enables the vehicle data system or DMS polling companies to retrieve the DMS data 411, which in one embodiment, may be obtained on a daily or weekly basis.

Inventory data 412 may be detailed data pertaining to vehicles currently within a dealer's inventory, or which will be in the dealer's inventory at some point in the future. Inventory data 412 can be obtained from a DMS, inventory polling companies, inventory management companies or listing aggregators. Inventory polling companies are typically commissioned by a dealer to pull data from the dealer's DMS and format the data for use on web sites and by other systems. Inventory management companies manually upload inventory information (for example, photos, descriptions, specifications, etc. pertaining to a dealer's inventory) to desired locations on behalf of the dealer. Listing aggregators may get data by "scraping" or "spidering" web sites that display a dealer's inventory (for example, photos, descriptions, specifications, etc. pertaining to a dealer's inventory) or receive direct feeds from listing websites (for example, FordVehicles.com).

Registration or other government data 413 may also be obtained at step 410. When a buyer purchases a vehicle it must be registered with the state (for example, DMV, Secretary of State, etc.) for tax, titling or inspection purposes. This registration data 413 may include vehicle description (for example, model year, make, model, mileage, etc.) and a sales transaction price which may be used for tax purposes.

Finance and agreement data 414 may also be obtained. When a buyer purchases a vehicle using a loan or lease product from a financial institution, the loan or lease process usually requires two steps: applying for the loan or lease and contracting the loan or lease. These two steps utilize vehicle and consumer information in order for the financial institution to properly assess and understand the risk profile of the loan or lease. This finance application or agreement data 414 may also be obtained at step 410. In many cases, both the application and agreement include proposed and actual sales prices of the vehicle.

Syndicated sales data 415 can also be obtained by the vehicle data system at step 410. Syndicated sales data companies aggregate new and used sales transaction data from the DMS of dealers with whom they are partners or have a contract. These syndicated sales data companies may have formal agreements with dealers that enable them to retrieve transaction data in order to syndicate the transaction data for the purposes of analysis or purchase by other data companies, dealers or OEMs.

Incentive data 416 can also be obtained by the vehicle data system. OEMs use manufacturer-to-dealer and manufacturer-to-consumer incentives or rebates in order to lower the transaction price of vehicles or allocate additional financial support to the dealer to help stimulate sales. As these rebates are often large (2%-20% of the vehicle price) they can have a dramatic effect on vehicle pricing. These incentives can be distributed to consumers or dealers on a national or regional basis. As incentives may be vehicle or region specific, their interaction with pricing can be complex and an important tool for understanding transaction pricing. This incentive data can be obtained from OEMs, dealers or another source altogether such that it can be used by the vehicle data system to determine accurate transaction, or other, prices for specific vehicles.

As dealers may have the opportunity to pre-determine pricing on their vehicles it may also be useful to obtain this upfront pricing data 418 at step 410. Companies like Zag.com Inc. enable dealers to input pre-determined, or upfront, pricing to consumers. This upfront price is typically the "no haggle" (price with no negotiation) price. Many dealers also present their upfront price on their websites and even build their entire business model around the notion of "no negotiation" pricing. These values may be used for a variety of reasons, including providing a check on the transaction prices associated with obtained historical transaction data.

Additionally, OEM pricing data 419 can be obtained at step 410. This OEM pricing data may provide important reference points for the transaction price relative to vehicle and dealer costs. OEMs usually set two important numbers in the context of vehicle sales, invoice price and MSRP (also referred to as sticker price) to be used as general guidelines for the dealer's cost and price. These are fixed prices set by the manufacturer and may vary slightly by geographic region. The invoice price is what the manufacturer charges the dealer for the vehicle. However, this invoice price does not include discounts, incentives, or holdbacks which usually make the dealer's actual cost lower than the invoice price. According to the American Automobile Association (AAA), the MSRP is, on average, a 13.5% difference from what the dealer actually paid for the vehicle. Therefore, the MSRP is almost always open for negotiation. An OEM may also define what is known as a dealer holdback, or just a holdback. Holdback is a payment from the manufacturer to the dealer to assist with the dealership's financing of the vehicle. Holdback is typically a percentage (2 to 3%) of the MSRP.

Although the MSRP may not equate to an actual transaction price, an invoice price can be used to determine an estimate of a dealer's actual cost as this dealer cost is contingent on the invoice. The actual dealer cost can be defined as invoice price less any applicable manufacturer-to-dealer incentives or holdbacks. The vehicle data system may therefore utilize the invoice price of a vehicle associated with a historical transaction to determine an estimate of the dealer's actual cost which will enable it to determine "front-end" gross margins (which can be defined as the transaction price less dealer cost and may not include any margin obtained on the "back end" including financing, insurance, warranties, accessories and other ancillary products).

Data may also be obtained from a wide variety of other data sources, including economic data 409 related to the current, past or future state of almost any facet of the economy including gas prices, demographic data such as household income, markets, locale(s), consumers, or almost any other type of data desired. The economic data may be specific to, or associated with, a certain geographic area. Additionally, this economic data may comprise an internet index, which may be determined from the average price for a vehicle as reported by certain Internet research sites as the average price for a vehicle. Although these Internet research sites are typically consumer focused, they sell advertising and leads to the automotive dealerships; therefore their paying customers are dealerships and the prices on these sites tend to represent the higher end of the scale, favoring dealerships.

Once the desired data is obtained, the obtained data may be cleansed at step 420. In particular, the data obtained may not be useful if it is inaccurate, duplicative or does not conform to certain parameters. Therefore, the vehicle data system may cleanse obtained data to maintain the overall quality and accuracy of the data presented to end users. This cleansing process may entail the removal or alteration of certain data based on almost any criteria desired, where these criteria may, in turn, depend on other obtained or determined data or the evaluation of the data to determine if it conforms with known values, falls within certain ranges or is duplicative. When such data is found it may be removed from the data store of the vehicle data system, the values which are incorrect or fall outside a threshold may be replaced with one or more values (which may be known specifically or be default values), or some other action entirely may be taken.

In one embodiment, during this cleansing process a VIN decode 428 may take place, where a VIN number associated with data (for example, a historical transaction) may be decoded. Specifically, every vehicle sold must carry a Vehicle Identification Number (VIN), or serial number, to distinguish itself from other vehicles. The VIN consists of 17 characters that contain codes for the manufacturer, year, vehicle attributes, plant, and a unique identity. Vehicle data system may use an external service to determine a vehicle's attributes (for example, make, model year, make, powertrain, trim, etc.) based on each vehicles VIN and associate the determined vehicle information with the sales transaction from which the VIN was obtained. Note that in some cases, this data may be provided with historical transaction data and may not need to occur with respect to one or more of the historical transactions.

Additionally, inaccurate or incomplete data may be removed 422. In one embodiment, the vehicle data system may remove any historical transaction data that does not include one or more key fields that may be utilized in the determination of one or more values associated with that transaction (for example, front end gross, vehicle make, model or trim, etc.). Other high-level quality checks may be performed to remove inaccurate (including poor quality) historical transaction data. Specifically, in one embodiment cost information (for example, dealer cost) associated with a historical transaction may be evaluated to determine if it is congruent with other known, or determined, cost values associated with the make, model or trim of the vehicle to which the historical transaction data pertains. If there is an inconsistency (for example, the cost information deviates from the known or determined values by a certain amount) the cost information may be replaced with a known or determined value or, alternatively, the historical transaction data pertaining to that transaction may be removed from the data store.

In one embodiment, for each historical transaction obtained the following actions may be performed: verifying that the transaction price falls within a certain range of an estimated vehicle MSRP corresponding to the historical transaction (e.g., 60% to 140% of MSRP of the base vehicle); verifying that the dealer cost for the transaction falls within a range of an estimated dealer cost (e.g., 70% to 130% of invoice—holdback of the base vehicle); verifying that a total gross (front end+back end gross) for the historical transaction is within an acceptable range (e.g., −20% to 50% of the vehicle base MSRP); verifying that the type of sale (new/used) aligns to the number of miles of the vehicle (for example, more than 500 miles, the vehicle should not be considered new).

In addition, the new car margin (front-end gross) may be adjusted up or down for transactions that have a high or low back-end gross. This adjustment may be a combination of the magnitude of the back-end gross and a factor based on historical analysis (for example, for a dealership having a sales transaction comprising a trade amount of $5000 and an actual trade value of $7000 and thus made $2000 on the vehicle trade, the front-end gross for this sales transaction vehicle would be increased by this $2000 since this dealer would have accepted a lower transaction price). The front end gross may also be adjusted based on rebates or incentives from the manufacturer that go directly to the dealers, as only a percentage of this rebate gets passed onto the customer. The exact factor to utilize in a given instance may be determined based on historical analysis and current market conditions. For example, if a manufacturer is offering $5000 in marketing support to a dealer, a dealer is not required to pass this money on to the end customer, however, a percentage of this money (e.g., 50%-80%) is usually given to the customer in the form of a lower transaction price). Furthermore, the front-end gross may be adjusted according to a number of minor factors that change the front-end gross based on the accounting practices of an individual dealership. For example, some dealers adjust the front-end gross to affect the salesperson's commission; these adjustments are removed when possible.

Duplicate data may also be removed 424. As there may be many sources for historical transaction data in many cases duplicative historical transaction data may be obtained. As such duplicative data can skew the results of the output of the vehicle data system it may be desired to remove such duplicate data. In cases where uniquely identifiable attributes such as the VIN are available, this process is straight forward (for example, VINs associated with historical transactions may be matched to locate duplicates). In cases where the transaction data does not have a unique attribute (in other words an attribute which could pertain to only one vehicle, such as a VIN, a combination of available attributes may be used to determine if a duplicate exists. For example, a combination of sales date, transaction type, transaction state, whether there was a trade-in on the transaction, the vehicle transaction price or the reported gross may all be used to identify duplicates. In either case, once a duplicate is identified, the transaction data comprising the most attributes source may be kept while the duplicates are discarded. Alternatively, data from the duplicate historical transactions may be combined in some manner into a single historical transaction.

Outlier data can also be removed 426. Outlier data is defined as data that does not appear to properly represent a likely transaction. In one embodiment, historical transaction data pertaining to transactions with a high negative margin (dealer loses too much money) or a high positive margin (dealers appears to earn too much money) may be removed. Removing outlier data may, in one embodiment, be accomplished by removing outlier data with respect to national, regional, local or other geographic groupings of the data, as removing outlier data at different geographic level may remove different sets of transaction data. In addition, relative or absolute trimming may be used such that a particular percentage of the transactions beyond a particular standard deviation may be removed off of the top and bottom of the historical transactions.

After step 420, cleansed data may be stored in a data store associated with the vehicle data system, where the cleansed data includes a set of historical transactions, each historical transaction associated with at least a set of vehicle attributes (for example, make, model, engine type, trim, etc.) and a transaction price or front end gross.

After step 420, cleansed data may be stored in a data store associated with the vehicle data system, where the cleansed data includes a set of historical transactions, each historical transaction associated with at least a set of vehicle attributes (for example, make, model, engine type, trim, etc.) and a transaction price or front end gross.

At step 430, then, the cleansed data may be grouped according to geography into data sets using a binning process and these geographic data sets optimized for a particular vehicle configuration. This optimization process may result in one or more data sets corresponding to a specific vehicle or group or type of vehicles, a trim level or set of attributes of a vehicle, and an associated geography.

In one embodiment, permutations of attributes may be iterated over to determine the attribute that has the most significant impact on margin. The iterations may continue until a stack ranked list of attributes from most to least significant impact on the margin are determined. Then, when grouping transactions for a particular location and vehicle this ranked list can be utilized to produce a data set that is both significant and relevant by ignoring or giving less weight to attributes that will impact margin the least.

In order to make vehicle pricing data more accurate, it may be important to maintain timeliness or relevancy of the data presented or utilized. In one embodiment, then the total number of recent (within a desired time period) and relevant transactions may be optimized with respect to the cleansed data. Relevant data corresponding to a particular geographic region and a particular vehicle may be binned to optimize the quantity of data available for each vehicle within each geographic region. This quantity of data may be optimized to yield bins of historical transaction data corresponding to a trim level (a certain set of attributes corresponding to the vehicle) of a particular model car and an associated geography using geographic assignment of data 432 and attribute categorization and mapping to trim 436.

During geographic assignment of data 432, data is labeled with one or more of national (all data), regional, state, or DMA definition. Attribute categorization and trim mapping 436 may also occur. Vehicle data can be sorted at the trim level (for example, using data regarding the vehicle obtained from a VIN decode or another source). This enables the accurate presentation of relevant pricing based on similar vehicles within a given time frame (optimizing recency). In some cases, a determination may be made that there is not a threshold quantity of data for a specific vehicle at a trim level to determine a statistically significant data corresponding to a time period.

The vehicle data system analyzes vehicles at the model (e.g., Accord, Camry, F-150) level and runs analytics at an attribute level (for example, drivetrain, powertrain, body type, cab type, bed length, etc.) to determine if there is a consistency (correlation between attributes and trims) at the attribute level. Since there are a greater number of transactions when binning at an attribute level, attribute level binning may be used instead of trim level binning in these situations, thereby yielding a larger number of historical transactions in a particular data set (relative to just trim level binning), but still relevant, data set to use for processing.

It will be noted with respect to these data sets that data within a particular data set may correspond to different makes, models, trim levels or attributes based upon a determined correlation between attributes. For example, a particular data set may have data corresponding to different makes or models if it is determined that there is a correlation between the two vehicles. Similarly, a particular data set may have data corresponding to different trims or having different attributes if a correlation exists between those different trim levels or attributes.

Using the historical transaction data a set of models may be generated at step 440. This model generation process may comprise analyzing individual aspects of the historical transaction data in order to understand the margin for the seller based on the attributes, geography or time of sale. Understanding the margin of individual historical transactions allows these historical transactions to be grouped in statistically significant samples that are most relevant to an individual user based on their specifically configured vehicle and location.

Thus, the generated models may include a set of dealer cost models corresponding to each of the one or more data sets. From these dealer cost models and the historical transaction data associated with a data set, an average price ratio (for example, price paid/dealer cost) may be generated for a data set corresponding to a specific vehicle configuration using a price ratio model. These models will be discussed in more detail later in this disclosure.

Moving on to the portion of the embodiment depicted in FIG. 4B, at step 450 the vehicle data system may receive a specific vehicle configuration 452 through a provided interface. In one embodiment, for example, a user at a web page provided by the vehicle data system may select a particular vehicle configuration using one or more menus or may navigate through a set of web pages to provide the specific vehicle configuration 452. The user may also specify a geographic locale where he is located or where he intends to purchase a vehicle of the provided specification, or may select one or more consumer incentives which the user may desire to utilize in conjunction with a potential purchase. The provided interface may also be used to obtain other data including incentive data pertaining to the specified vehicle configuration. In one embodiment, when a user specifies a particular vehicle configuration an interface having a set of incentives associated with the specified vehicle configuration may be presented to a user if any such incentives are available. The user may select zero or more of these incentives to apply.

Data associated with the specified vehicle configuration which provided by the user may then be determined by the vehicle data system at step 460. Specifically, in one embodiment, the vehicle data system may utilize one or more of models 462 (which may have been determined above with respect to step 440) associated with the vehicle configuration specified by the user (for example, associated with the make, model, trim level or one or more attributes of the specified vehicle) to process one or more data sets (for example, historical transaction data grouped by vehicle make, model, trim or attributes, various geographic areas, etc. associated with the specified vehicle configuration) in order to determine certain data corresponding to the user's specified vehicle.

The determined data corresponding to the specified vehicle configuration may include adjusted transaction prices and mean, median or probability distribution 464 associated with the specified vehicle at a national, regional or local geographical level. The data set corresponding to the specified vehicle may also be bucketed 466 (for example, percentile bucketed) in order to create histograms of data at national, regional, and local geographic levels. "Good," "great," or other prices and corresponding price ranges 468 may also be determined based on median, floor pricing (lowest transaction prices of the data set corresponding to the specified vehicle configuration) or algorithmically determined dividers (for example, between the "good," "great," or "overpriced" ranges). Each price or price range may be determined at national, regional, and local geographic levels. These prices or price ranges may be based on statistical information determined from the data set corresponding to the specified vehicle. For example, "good" and "great" prices or price ranges may be based on a number of standard deviations from a mean price associated with the sales transactions of the data set corresponding to the specified vehicle. For example, a "great" price range may be any price which is more than one half a standard deviation below the mean price, while a "good" price range may be any price which is between the mean price and one half standard deviation below the mean. An "overpriced" range may be anything above the average price or the mean or may be any price which is above the "good" price range.

Historical average transaction prices and forecasts 469 corresponding to the specified vehicle configuration may also be determined at national, regional, and local geographic levels where the forecasted pricing can be determined based on historical trends in the data set corresponding to the specified vehicle, as well as forecasted inventory, model year cycles, incentives or other variables.

Based on the determined data, an interface for the presentation of the determined data may then be generated at step 470. The interface generated may be determined in accordance with a user request received at the vehicle data system based on a user's interaction with other interfaces provided by the vehicle data system. In this manner a user may "navigate" through the interfaces provided by the vehicle data system to obtain desired data about a specified vehicle configuration presented in a desired manner.

These interfaces may serve to communicate the determined data in a variety of visual formats, including simplified normal distributions and pricing recommendations based on one or more data sets. In some embodiments, a price distribution for a particular data set associated with a specified vehicle configuration can be presented to users as a Gaussian curve 472. Using the normal distribution of transaction data in a given geographic area, the mean and the variance of pricing can be visually depicted to an end user. Visually, the Gaussian curve 472 may be shown to illustrate a normalized distribution of pricing (for example, a normalized distribution of transaction prices). On the curve's X-axis, the average price paid may be displayed along with the determined dealer cost, invoice or sticker price to show these prices relevancy, and relation, to transaction prices. The determined "good," "great," "overpriced," etc. price ranges are also visually displayed under the displayed curve to enable the user to identify these ranges. Incentive data utilized to determine the presented data may also be displayed to the user.

A histogram 474 may also be created for display to a user. The histogram is a graphical display of tabulated frequencies of the data set or determined data comprising a set of bars, where the height of the bar shows the percentage of frequency, while the width of the bars represents price ranges. On the histogram's X-axis, the average price paid, dealer cost, invoice, and sticker price may be displayed to show their relevancy, and relation, to transaction prices. The determined "good," "great," etc. prices or ranges may also visually displayed with the histogram to enable the user to identify these ranges. Incentive data utilized to determine the presented data may also be displayed to the user.

Interfaces for determined historic trends or forecasts 478 may also be generated. For example, a historical trend chart may be a line chart enabling a user to view how average transaction prices have changed over a given period of time. The Y-axis represents the percentage change over given time periods while the X-axis represents given time periods. The user will also be able to view the average transaction price and average incentives over each given time period. In addition, the user will also be able to see how prices may change in the future based on algorithmic analysis. Other types of interfaces, such as bar charts illustrating specific price points (for example, average price paid, dealer cost, invoice, and sticker price) and ranges (for example, "good," "great," "overpriced," etc.) in either a horizontal or vertical format, may also be utilized.

Using these types of visual interfaces may allow a user to intuitively understand a price distribution based on relevant information for their specific vehicle, which may, in turn, provide these users with strong factual data to understand how much variation there is in pricing and to negotiate, and understand what constitutes, a good deal. Additionally, by displaying the data sets associated with different vehicles in substantially the same format users may be able to easily compare pricing data related to multiple vehicles or vehicle configurations.

The generated interfaces can be distributed through a variety of channels at step 480. It will be apparent that in many cases the channel through which an interface is distributed may be the channel through which a user initially interacted with the vehicle data system (for example, the channel through which the interface which allowed the user to specify a vehicle was distributed). However, it may also be possible to distribute these interfaces through different data channels as well. Thus, interfaces which present data sets and the results of the processing of these data sets may be accessed or displayed using multiple interfaces and will be distributed through multiple channels, enabling users to access desired data in multiple formats through multiple channels utilizing multiple types of devices. These distribution methods may include but are not limited to: consumer and dealer facing Internet-based applications 482. For example, the user may be able access an address on the World Wide Web (for example, www.truecar.com) through a browser and enter specific vehicle and geographic information via its web tools. Data pertaining to the specific vehicle and geographic information may then be displayed to the user by presenting an interface at the user's browser. Data and online tools for the access or manipulation of such data may also be distributed to other automotive related websites and social networking tools throughout the web. These Internet-based applications may also include, for example, widgets which may be embedded in web sites provided by a third party to allow access to some, or all, of the functionality of the vehicle data system through the widget at the third party web site. Other Internet-based applications may include applications that are accessible through one or more social networking or media sites such as Facebook or Twitter, or that are accessible through one or more APIs or Web Services.

A user may also use messaging channels 484 to message a specific vehicle's VIN to the vehicle data system (for example, using a text, picture or voice message). The vehicle data system will respond with a message that includes the specific vehicle's pricing information (for example, a text, picture or voice message). Furthermore, in certain embodiment, the geographical locale used to determine the presented pricing information may be based on the area code of a number used by a user to submit a message or the location of a user's computing device. In certain cases, if no geographical locale can be determined, one may be asked for, or a national average may be presented.

In one embodiment, a user may be able to use phone based applications 486 to call the vehicle data system and use voice commands to provide a specific vehicle configuration. Based on information given, the vehicle data system will be able to verbally present pricing data to the user. Geography may be based on the area code of the user. If an area code cannot be determined, a user may be asked to verify their location by dictating their zip code or other information. It will be noted that such phone based applications 486 may be automated in nature, or may involve a live operator communicating directly with a user, where the live operator may be utilizing interfaces provided by the vehicle data system.

As the vehicle data system may provide access to different types of vehicle data in multiple formats through multiple channels, a large number of opportunities to monetize the vehicle data system may be presented to the operators of such a system. Thus, the vehicle data system may be monetized by its operators at step 490. More specifically, as the aggregated data sets, the results or processing done on the data sets or other data or advantages offered by the vehicle data system may be valuable, the operators of the vehicle data system may monetize its data or advantages through the various access and distribution channels, including utilizing a provided web site, distributed widgets, data, the results of data analysis, etc. For example, monetization may be achieved using automotive (vehicle, finance, insurance, etc.) related advertising 491 where the operators of the vehicle data system may sell display ads, contextual links, sponsorships, etc. to automotive related advertisers, including OEMs, regional marketing groups, dealers, finance companies or insurance providers.

Additionally, the vehicle data system may be monetized by facilitating prospect generation 493 based on upfront, pre-determined pricing. As users view the vehicle data system's interfaces they will also have the option to accept an upfront price (which may, for example, fall into the presented "good" or "great" price ranges). This price will enable a user to purchase a car without negotiating.

Operators of the vehicle data system may also monetize its operation by implementing reverse auctions 496 based on a dealer bidding system or the like. Dealers may have an opportunity through the vehicle data system to bid on presenting upfront pricing to the user. The lower the price a dealer bids, the higher priority they will be in the vehicle data system (for example, priority placement and first price presented to user), or some other prioritization scheme may be utilized. Users will be able to view bidders in a user-selected radius of the user's zip code or other geographic area and select a winning bidder. Embodiments of the implementation of such a reverse auction may be better understood with reference to U.S. patent application Ser. No. 12/556,109, filed Sep. 9, 2009, entitled "SYSTEM AND METHOD FOR SALES GENERATION IN CONJUNCTION WITH A VEHICLE DATA SYSTEM," which is incorporated herein by reference in its entirety for all purposes.

The operators of vehicle data system may also license 492 data, the results of data analysis, or certain applications to application providers or other websites. In particular, the operators of the vehicle data system may license its data or applications for use on or with certain dealer tools, including inventory management tools, DMS, dealer website marketing companies, etc. The operators of the vehicle data system may also license access to its data and use of it tools on consumer facing websites (for example, Yahoo! Autos or the like).

Monetization of the vehicle data system may also be accomplished by enabling OEMs to buy contextual ads 495 on certain applications such as distributed widgets or the like. Users may see such ads as "other vehicles to consider" on the widget. The operators may also develop and sell access to online tools 497 for OEMs, finance companies, leasing companies, dealer groups, and other logical end users. These tools 497 will enable customers to run customized analytic reports which may not be available on the consumer facing website, such as statistical analysis toolsets or the like.

As the accuracy and the specificity of pricing information may be a significant advantage of embodiments of a vehicle data system presented herein, it may now be useful to present an overview of embodiments of the analytics which may be employed by a vehicle data system to illustrate how such pricing information is determined. Specifically, in one embodiment the data feeds from information sources may be leveraged to model variables and build multivariable regressions. More particularly, in one embodiment, using one set of historical data a set of dealer cost models may be determined as a formula based on invoice and MSRP data and, using a second set of historical data a price ratio regression model may be determined, such that the vehicle data system may be configured to utilize these determined dealer cost models and the price ratio regression model in the calculation of pricing data corresponding to a user specified vehicle configuration.

When such a specified vehicle configuration is received, the historical transaction data associated with that specified vehicle configuration can be obtained. The transaction prices associated with the historical transaction data can be adjusted for incentives and the dealer cost model and price ratio model applied to determine desired data to present to the user. Specifically, in one embodiment, the user may provide such a specific vehicle configuration to the vehicle data system using an interface provided by the vehicle data system. The user may also select one or more currently available incentives to apply, where the currently available incentives are associated with the specified vehicle configuration. The specified vehicle configuration may define values for a set of attributes of a desired vehicle (for example, including transmission type, MSRP, invoice price, engine displacement, engine cylinders, # doors, body type, geographic location, incentives available, etc.) where the values for these attributes may be specified by the user or obtained by the vehicle data system using the values of attributes specified by the user. Based on the values of these attributes, the specified vehicle's bin may be identified. In one embodiment, a bin for a vehicle can be is defined as the group of vehicles that have the same year, make, model and body type for which there is historical transactions data within a certain time period (for example, the past four weeks or some other time period).

Using the pricing information associated with the historical transactions in the bin corresponding to the specified vehicle, steady state prices may be determined by removing incentives from the prices in the historical transaction data. Once accurate transaction prices are determined, an average price and average cost for the specified vehicle may be computed using the historical transaction data associated with the bin of the specified vehicle. This bin-level determined average price and average cost may, in turn, be used along with the specified vehicle configuration to determine the average price ratio for the specified vehicle by plugging these values into the price ratio regression model and solving. Using this average price ratio and the prices paid (for example, adjusted for incentives) corresponding to the historical transaction data within the specified vehicle's bin, certain price ranges may be computed (for example, based on standard deviations from a price point (for example, the mean)). A Gaussian curve can then be fit parametrically to the actual price distributions corresponding to the historical transaction data of the bin and the result visually displayed to the user along with the computed price points.

Figure 5:
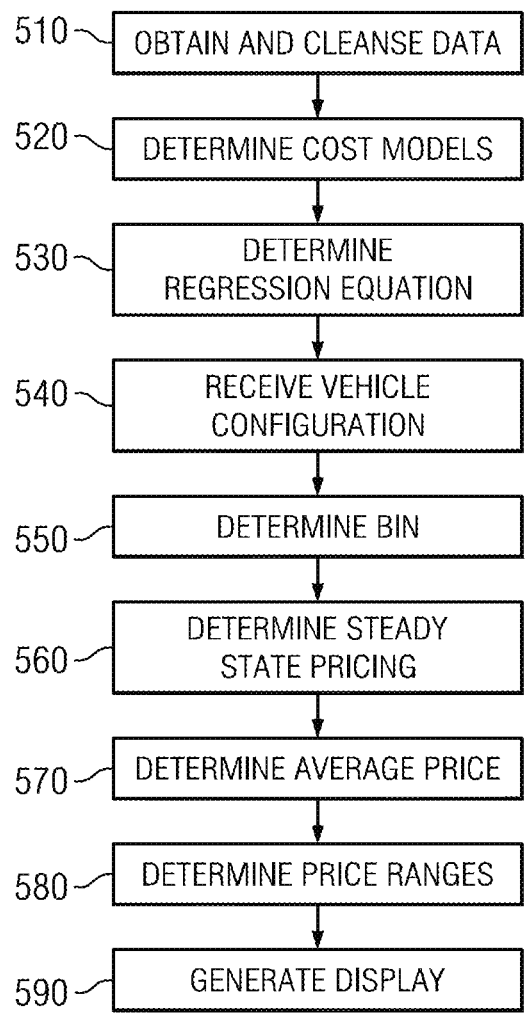
FIG. 5 depicts one embodiment for a method for determining and presenting pricing data.

Turning to FIG. 5, one embodiment for a method of determining accurate and relevant vehicle pricing information is depicted. At step 510 data may be obtained and cleansed as described above. This data includes a set of historical transaction data, where the historical transaction data may comprise data on a set of transactions which have occurred, where data for a particular historical transaction may comprise one or more prices associated with a vehicle actually sold to a consumer, including for example, an invoice price, a dealer cost, an MSRP, a price paid by the consumer (also known as a transaction price), etc. and values for a set of attributes corresponding to the vehicle sold (for example, make, model, transmission type, number of doors, power train, etc.). This historical transaction data may then be cleansed. This cleansing may entail an exclusion of certain historical transactions based on data values (for example a transaction having a sale price of $5,021 may be deemed to be too low, and that sales transaction excluded) or the replacement of certain values associated with a historical transaction.

In certain embodiments, it may be desirable to be able to accurately determine dealer cost associated with historical transactions, as this dealer cost may be important in determining pricing data for a user, as will be discussed. While certain data sources may supply gross profit data in conjunction with provided historical transaction data, and this gross profit field may be used to determine dealer cost, this gross profit data is often times unreliable. In one embodiment, then, when historical transaction data is cleansed, a dealer cost corresponding to each of a set of historical transactions may be determined using the dealer cost models associated with the vehicle data system, and the determined dealer cost associated with the corresponding historical transaction if the historical transaction does not have an associated dealer cost. Additionally, a dealer cost which is associated with a received historical transaction may be evaluated utilizing a determined dealer cost corresponding to that transaction such that the original dealer cost may be replaced with the determined dealer cost if the original dealer cost is determined to deviate from the determined dealer cost by some threshold, or is otherwise determined to be incorrect. Embodiments of methods for the determination of dealer cost for use in this type of cleansing will be described in more detail at a later point with reference to FIG. 19.

Once the historical transaction data is obtained and cleansed, dealer cost models may be determined at step 520. More specifically, in one embodiment, a dealer cost model may be generated for each of a set of manufacturers by analyzing invoice data corresponding to that manufacturer (which may be received from dealers). In particular, the invoice data may be analyzed to determine the equation for deriving holdback in the dealer cost relationship (for example, where dealer cost=invoice−holdback).

The invoice data usually provided with each vehicle invoice contains the following: the holdback price, the invoice price, the freight charges and MSRP, among other data. Thus, taking each vehicle invoice as a separate observation and assuming that each equation for the dealer cost always takes a similar form, the various forms of the equation can be plotted to see which equation holds most consistently across observations. The equation which holds most consistently can be deemed to be the holdback equation (referred to as the dealer cost (DealerCost) model) for that manufacturer.

Figure 6:
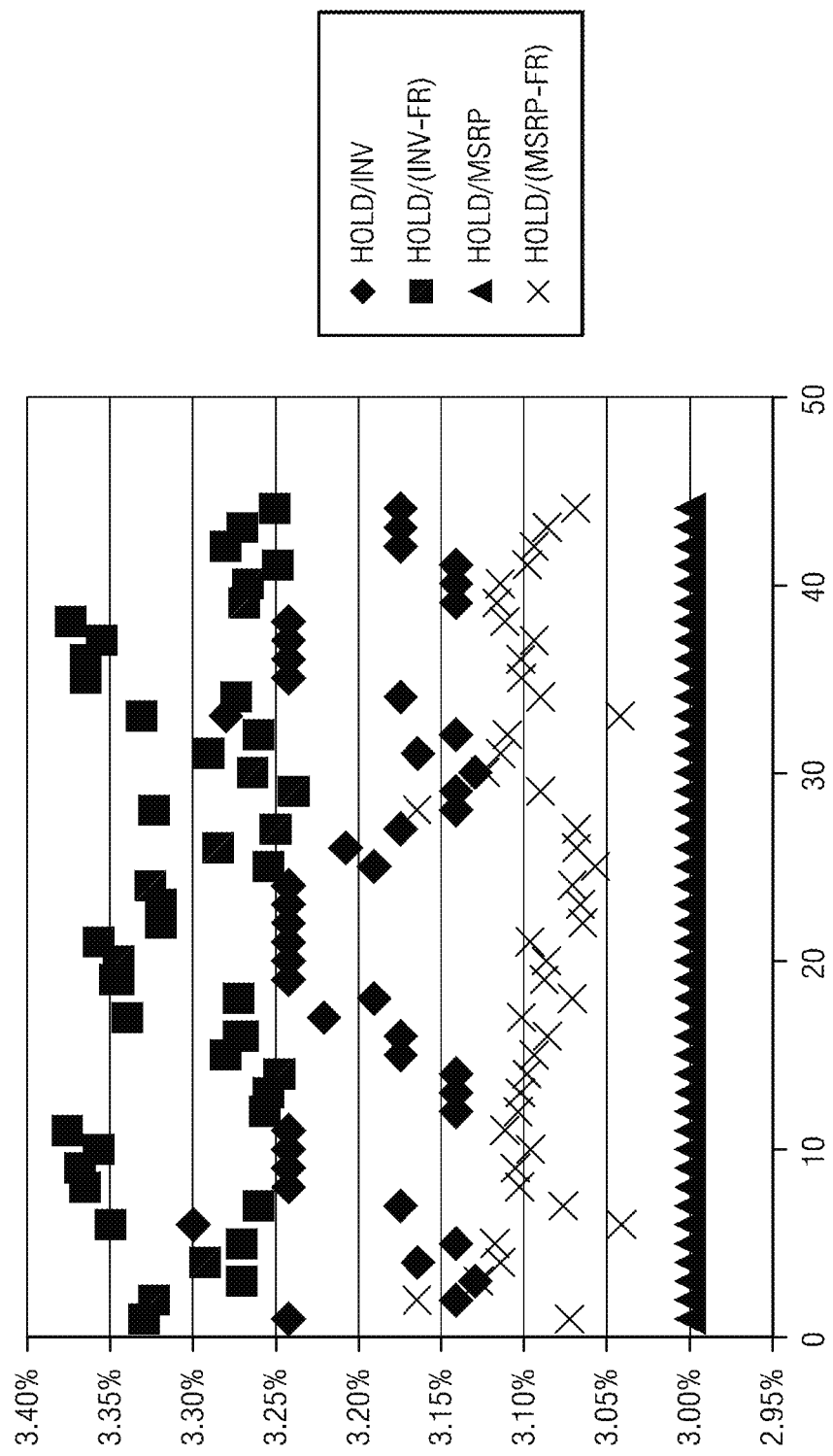
FIG. 6 depicts a distribution associated with the determination of an equation.

Turning briefly to FIG. 6, a graphic depiction of a plot of holdback equations applied to vehicle invoice prices for one particular manufacturer (Ford) is presented. Here, holdback can be determined to be: holdback=0.03*(configured msrp−freight) for this particular manufacturer, as this is the only form that holds constant across invoices associated with Ford. It will be noted that the determination of these dealer cost models may take place at almost any time interval desired, where the time interval may differ from the time interval used to obtain data from any of the data sources, and that these dealer cost models need not be determined anew when new data is obtained. Thus, while the determination of dealer cost models has been described herein with respect to the embodiment depicted in FIG. 5 it will be noted that this step is not a necessary part of the embodiment of the method described and need not occur at all or in the order depicted with respect to his embodiment. For example, dealer cost models may be determined offline and the vehicle data system configured to use these provided dealer cost models.

Returning to FIG. 5, in addition to the dealer cost models, a price ratio regression equation may be determined at step 530 using historical transaction data. Utilizing global multivariable regression, then, one embodiment a price ratio equation may be of the form $$f(x) = \sum_{i=0}^{n} \sum_{k=0}^{m} (\beta_i X_i X_{bk})$$

where $X_i$ signifies global variables, $X_{bk}$ signifies bin-level variables for specific bins b, and $\beta_i$'s are coefficients. In one embodiment, for example, the price ratio (PriceRatio) equation may be PriceRatio=a0+a1*PRbin+a2*PRbin*dealercost+a3*PRbin*cylinders+a4*PRbin*drive+a5*PRbin*daysinmarket+$\Sigma$ ($a_k$*PRbin*state$_k$) where $a_i$=coefficients, PRbin is the 4-week average price ratios for all transactions in a bin associated with a given vehicle, dealercost is a steady-state (incentives adjusted) dealer cost for the given vehicle, cylinders are the number of cylinders the given has, drive is the number of drive wheel in the drivetrain (e.g., 2 or 4 wheel drive), daysinmarket is the number of days the model of the given vehicle has been on the marketplace and state is an array of indicator variables specifying the geographic state of purchase. With this price ratio equation it is possible to compute average price paid for the given vehicle where average price paid (Avg Price Paid) equals PriceRatio (as determined from the price ratio regression equation) multiplied by DealerCost (as determined from the dealer cost model for the manufacturer of the given vehicle) or Avg Price Paid=Price Ratio(DealerCost).

In one embodiment, it may be desirable to model price ratios at a local level. Accordingly, certain embodiments of a price ratio equation may account for this desire by incorporation of zip code level modeling. For example, in the price ratio equation above, in place of an array of indicator variables identifying a state, variables to capture the zipcode may be included. In the context of vehicle pricing data just incorporating a series of indicator variables identifying zipcode may, however, be less effective due to data sparsity issues, while a straight continuous mapping of zipcode may also be less effective than desired due to overconstrained implied numerical relationships amongst zipcodes. Accordingly, an indirect continuous mapping may be utilized in certain embodiments, particularly in cases where intermediary variables can be identified. For instance, continuous variables such as median income and median home price can effectively be leveraged as intermediaries. Given that zipcode is directly related (sometimes referred to as a proxy variable) for these effects, it makes sense to use these types of continuous variables as intermediaries.

To accomplish this, in one embodiment first a model which relates zipcode to median income is developed. This model can be, for example, a lookup table of median incomes by zipcode (which can be for example, acquired from the most recent census data). Then, median income is utilized as a variable $X_i$ in, for example, the price ratio equation above. The price ratio equation might then have a component of a6*est_median_income or a6*PRbin*est_median_income, where est_median_income=f(zipcode) (where f(zipcode) refers to a value in the lookup table corresponding to zipcode.) Thus, a price ratio equation of this type may be PriceRatio=a0+a1*PRbin+a2*PRbin*dealercost+a3*PRbin*cylinders+a4*PRbin*drive+a5*PRbin*daysinmarket+a6*PRbin*est_median_income where $a_i$=coefficients, PRbin is the 4-week average price ratios for all transactions in a bin associated with a given vehicle, dealercost is a steady-state (incentives adjusted) dealer cost for the given vehicle, cylinders is the number of cylinders the given has, drive is the number of drive wheel in the drivetrain (e.g., 2 or 4 wheel drive), daysinmarket is the number of days the model of the given vehicle has been on the marketplace and f(zipcode) refers to a value in a lookup table corresponding to the zipcode. It will be noted that a similar approach can be taken with median home prices or any other such potential intermediary variable which it is desired to utilize in conjunction with any type of local level variable (zip code, neighborhood, area code, etc.).

Again, it will be noted that the determination of the price ratio equation to utilize may take place at almost any time interval desired, where the time interval may differ from the time interval used to obtain data from any of the data sources, and that a price ratio equation need not be determined anew when new data is obtained. Thus, while the determination of a price ratio equation has been described herein with respect to the embodiment depicted in FIG. 5 it will be noted that this step is not a necessary part of the embodiment of the method described. For example, a price ratio equation may be determined offline and the vehicle data system configured to use this provided price ratio equation.

Once the data has been gathered, and the dealer models and price ratio regression equation to utilize have been determined, a specified vehicle configuration may be received and a corresponding bin determined at steps 540 and 550, respectively. A specified vehicle configuration may comprise values for a set of attributes of a vehicle (for example, in one embodiment the attributes of year, make, model and body type may be used). Thus, a bin corresponding to a specified vehicle configuration may comprise historical transaction data from a particular time period (for example, four weeks) associated with the values for the set of attributes corresponding to the specified vehicle.

Using the bin corresponding to the specified vehicle, at step 560, steady state pricing for the historical transaction data in the bin may be determined. Steady state prices may be determined by removing incentives from the transaction prices in the historical data. More specifically, transaction prices can be adjusted for incentives using the equation Price_ss (steady state price)=Price (transaction price)+$I_c$+$\lambda I_d$, where $I_c$=consumer incentives applied to the transaction, $I_d$=dealer incentives available for the transaction, and $\lambda$=dealer incentives passthrough rate. Thus, if a historical transaction price included $500 in consumer incentives and $1000 in available dealer incentives for a dealer that has been determined to have a 20% dealer cash passthrough rate, that price would be adjusted to be $700 higher to account for the incentives provided at that time.

For instance, a price paid (transaction price) of $15,234 corresponding to a historical sales transaction for a Honda Civic might have been artificially low due to incentives. Since the incentives are known at the time that historical transaction took place, it can be determined what incentives were available at that time and how they affect the prices corresponding to a historical transaction (for example, what percentage of these incentives are passed through to the customer). As dealer incentives are unknown to the consumer generally and may or may not be passed through, historical transaction data can be evaluated to determine passthrough percentages for these dealer incentives based on historical averages and adjusted accordingly.

For instance, using the example Honda Civic transaction, a $1500 consumer and a $1000 dealer incentive might have been available. Since consumer incentives are 100% passed through to the consumer, that $1500 may be added to the historical transaction price to adjust the price of the transaction to $16734. For this particular make of vehicle, the manufacturer-to-dealer incentive passthrough rate might have been determined to be 54%. Thus, it may be determined that $540 would be deducted from the price paid by a consumer for this vehicle, on average. Thus, this amount may also be added into the price of the transaction to arrive at a figure of $17274 as the transaction price without incentives for this transaction. Similar calculations may be performed for the other historical transactions in the specified vehicle's bin.

After steady state prices are determined, at step 570 the average dealer cost corresponding to the specified vehicle may be determined using the historical transaction data in the bin (including the adjusted transaction prices corresponding to the historical transactions) and the dealer cost model corresponding to the manufacturer of the specified vehicle. The price ratio corresponding to the specified vehicle may then be determined using the price ratio equation by plugging in values corresponding to the specified vehicle into the bin-level variables of the price ratio equation and solving. Using the determined price ratio, the average price paid (mean) for the specified vehicle may be determined using the equation Avg Price Paid=PriceRatio*DealerCost.

In one embodiment, at this point, if there are currently any incentives available for the specified vehicle the adjusted transaction prices for the historical transactions and the average price paid can be scaled based on these incentives. In particular, utilizing a presented interface a user may have selected on or more consumer incentives offered in conjunction with specified vehicle configuration. These specified consumer incentives may be utilized to adjust the transaction price. More specifically, these transaction prices may be further adjusted based on a process similar to that used in determining steady state pricing, which accounts for current incentives. Thus, the equation may be Price (transaction price)=Price_ss (steady state)$-I_c-\lambda I_d$, where $I_c$=consumer incentives applied to the transaction, $I_d$=dealer incentives available for the transaction, and $\lambda$=dealer incentives passthrough rate or Avg Price Paid$_{final}$=Avg Price Paid$_{computed}-I_c-\lambda I_d$. In this way, as incentives may fluctuate based on geography, it is possible to display prices tailored to the user's local market prices as a way for the user to gauge how much room they have for negotiations, rather than displaying a full range of prices that has been unduly influenced by changes in available incentives. Note that, in some embodiments, it may be also be desirable to adjust the determined average dealer cost downward by the full amount of the consumer and dealer incentives at this time.

Once average price paid is determined for the specified vehicle, at step 580 one or more price ranges may be determined. These price ranges may be determined using the standard deviation determined from the historical transaction data, including the adjusted transaction prices, of the bin. For example, the top end of a "good" price range may be calculated as: Good=Avg Price Paid+0.15*stddev, the top end of a "great" price range can be determined as Great=Avg Price Paid−0.50*stddev, while an "Overpriced" price range may be defined as any price above the "good" transaction price. Alternatively, the "good" price range may extend from the minimum of the median transaction price and the mean transaction price to one-half standard deviation below the mean price as determined based on the historical transaction data of the bin, including the adjusted transaction prices corresponding to the specified vehicle. It will be noted that any other fraction of standard deviation may be used to determine "good," "great," "overpriced" price ranges, or some other method entirely may be used.

A display may then be generated at step 590. In one embodiment, this display may be generated by fitting a Gaussian curve to the distribution of the adjusted transaction prices corresponding to the historical pricing data of the bin associated with the specified vehicle and formatting the results for visual display. In addition, the visual display may have one or more indicators displayed relative to the displayed pricing curve which indicate where one or more pricing ranges or price points are located.

It may be helpful here to illustrate an example in conjunction with a specific vehicle. To continue with the above example, for the manufacturer Ford, suppose that the specified vehicle is a 2009 Ford Econoline Cargo Van, E-150 Commercial with no options. In this case, the dealer cost model for Ford may specify that the dealer cost is calculated off of the base MSRP minus freight charge. From data obtained from a data source it can be determined that MSRP for this vehicle is $26,880 and freight charges are $980. Accordingly, holdback for the specified vehicle is computed as Holdback=$\alpha_0+\alpha_1$ (MSRP−Freight), where $\alpha_0$=0, $\alpha_1$=0.03 (from the above dealer model corresponding to Ford). Thus, holdback=0.03*(26880-980)=777. Base invoice price can be determined to be $23,033 from obtained data, thus Factory Invoice=Base Invoice+Ad fees+Freight=$23,033+ $428+$980=$24,441 and Dealer cost=Factory Invoice− Holdback=$24,441−$777=$23,664

Using prices from historical transaction data corresponding to the 2009 Ford Econoline Cargo Van, E-150 Commercial with no options (the bin) an average price ratio may be determined. As mentioned earlier, these prices may be adjusted for incentives.

Assume now that $$PriceRatio = f(x) = \sum_{i=0}^{n} \sum_{k=0}^{m} (\beta_i X_i X_{bk}) = 1.046$$

for the 2009 Ford Econoline Cargo Van, E-150 Commercial, in this case Average Price Paid=DealerCost*1.046=$24,752. At this point, if there were any currently available incentives available for the 2009 Ford Econoline Cargo Van, E-150 Commercial with no options adjustments can be made. In this example, there may not be. However, if there were, for example, $1,500 in consumer incentives and $500 in dealer incentives, the prices can be rescaled based on these incentives. Thus, in this scenario, average price paid adjusted=$24,752−$1,500−0.30(500)=$23,102, presuming this vehicle has historically had a 30% passthrough rate.

Figure 7A:
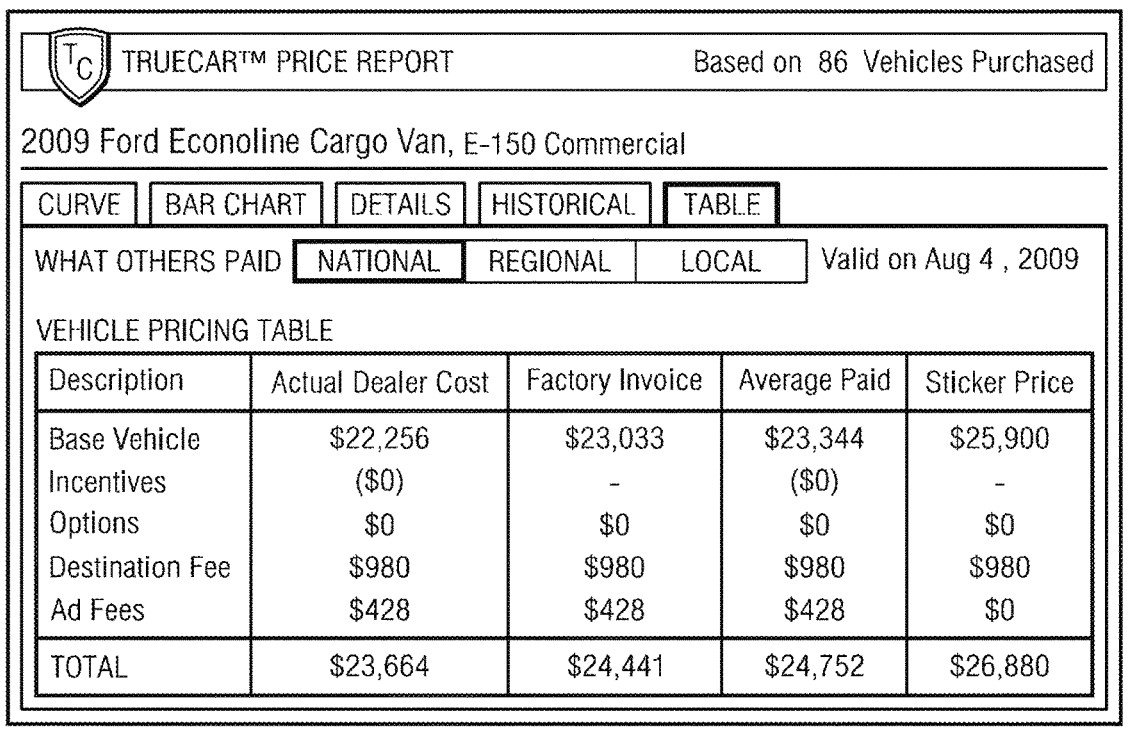
FIGS. 7A and 7B depict embodiments of interfaces for the presentation of pricing data.
Figure 7B:
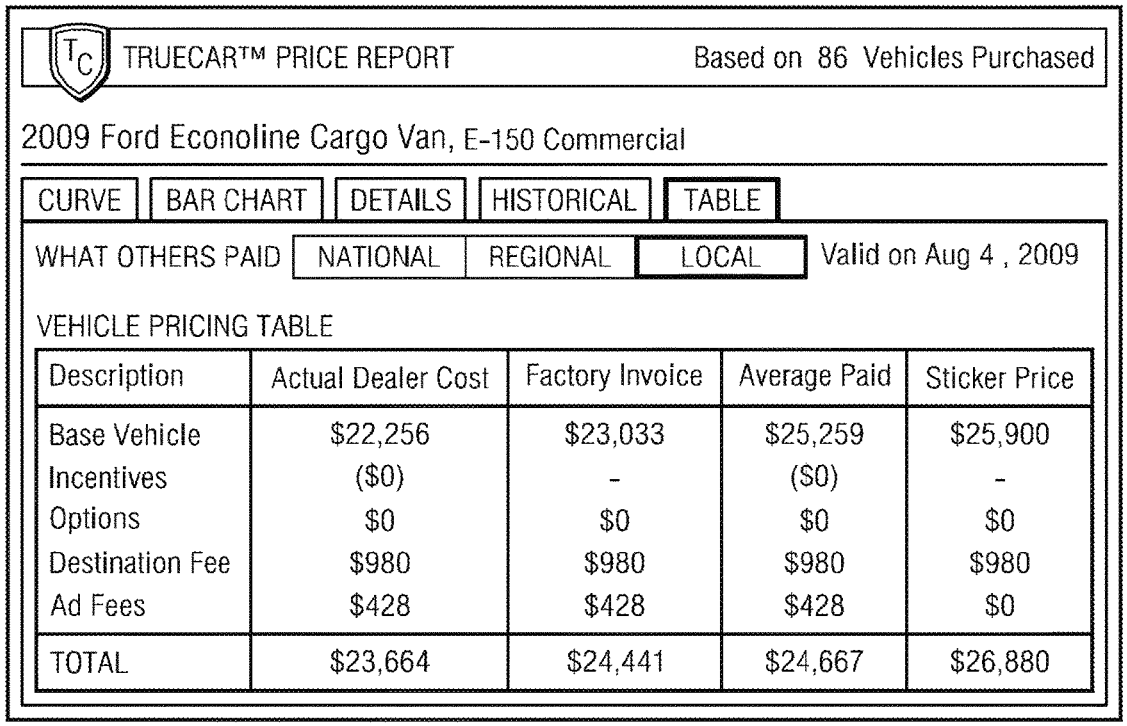

Turning briefly to FIGS. 7A and 7B one example of interfaces which may be used by a vehicle data system to present such pricing information to a user are depicted. In particular, FIG. 7A is an interface presenting the determined Actual Dealer Cost, Factory Invoice, Average Paid (average price paid) and sticker price for a 2009 Ford Econoline Cargo Van, E-150 Commercial on a national level while FIG. 7B is an interface presenting identical data at a local level.

Accordingly, for this particular example, the case of the 2009 Ford Econoline Cargo Van, E-150 Commercial, the breakout of prices is that the top end of the "good" price range can now calculated as: "good" and "great" ranges are computed as follows: "good" extends from the min(median (P), mean(P)) down to one-half standard deviation below the mean price over recent transactions. The "great" price range extends from one-half standard deviation below the mean and lower. So, for the Econoline in this example, with no options: Average price=$24,752 nationally, the upper end of the "good" price range=$24,700 (the median of the data in this example) and the upper end of the "great" price range=24752−0.5*$\sigma_b$=24752−0.5(828)=$24,338.

Figure 8A:
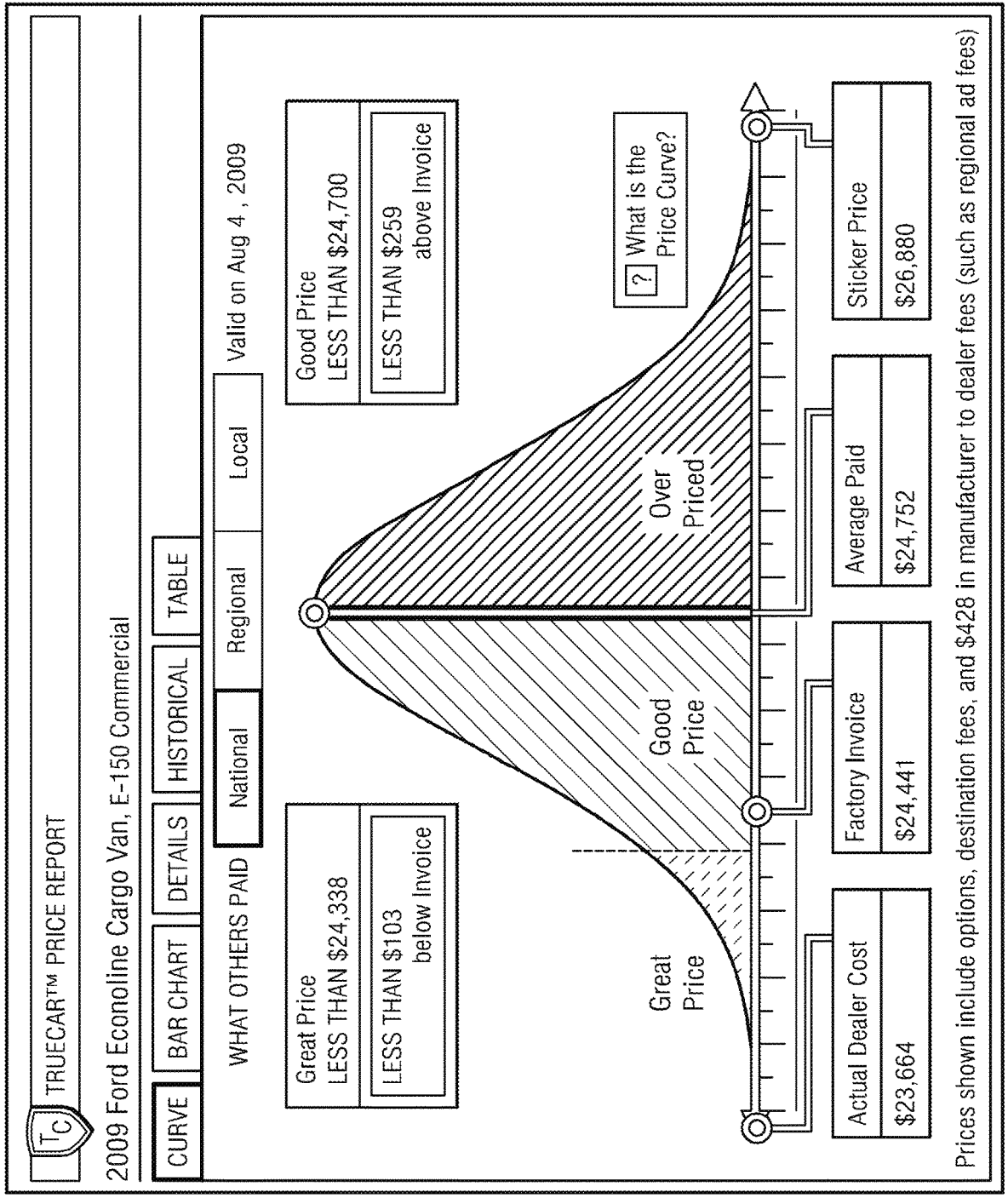
FIGS. 8A and 8B depict embodiments of interfaces for the presentation of pricing data.
Figure 8B:
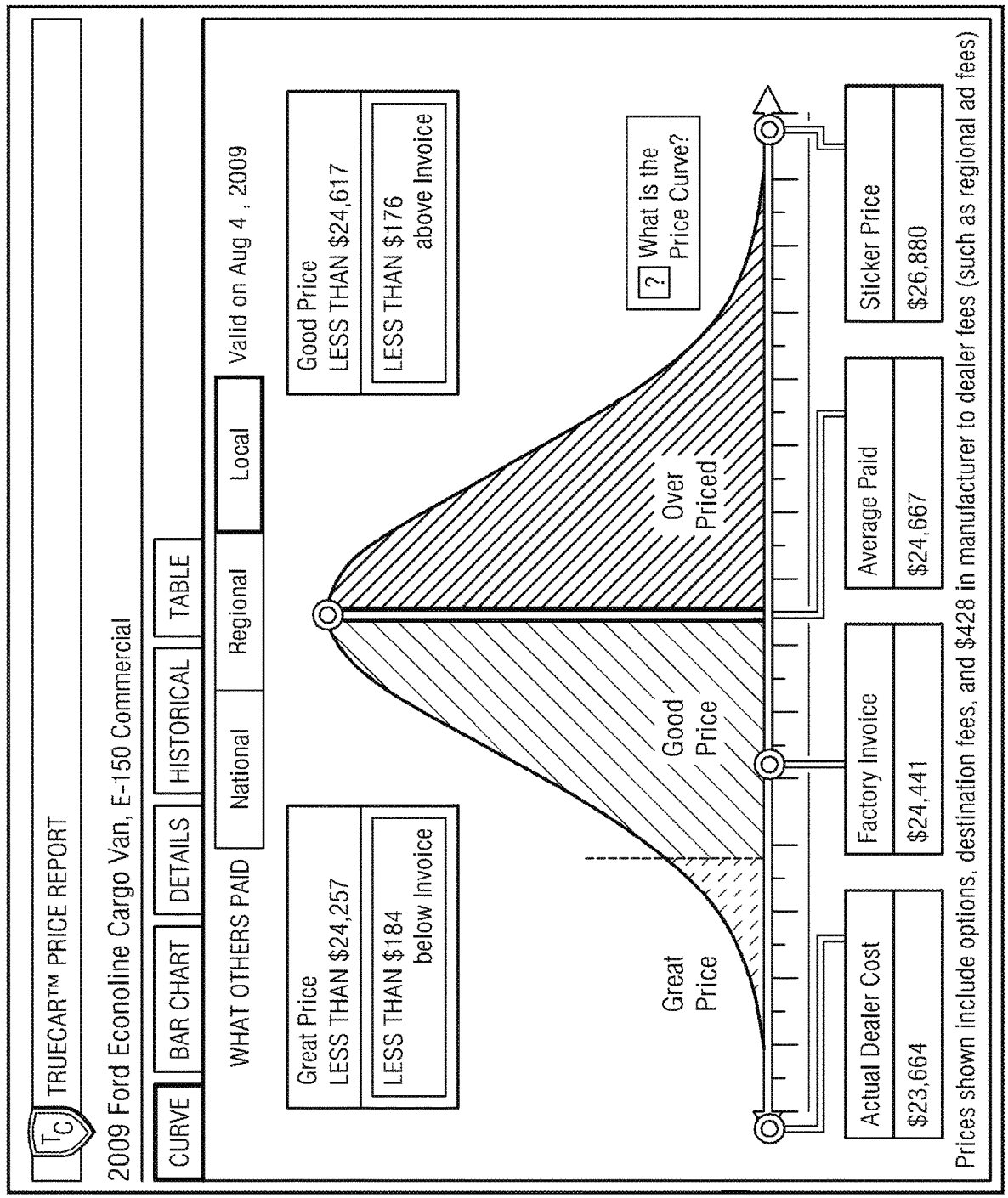

A Gaussian curve can then be fit parametrically to the actual price distributions of the historical transaction data corresponding to the 2009 Ford Econoline Cargo Van, E-150 Commercial to produce embodiments of the visual display depicted in FIGS. 8A and 8B. Here, FIG. 8A is an interface visually presenting the national level price distribution for the 2009 Ford Econoline Cargo Van, E-150 Commercial after the Gaussian curve fitting process where the price points "Actual Dealer Cost", "Factory Invoice", "Average Paid" (average price paid) and "Sticker Price" for a 2009 Ford Econoline Cargo Van, E-150 Commercial are indicated relative to the price curve depicting the pricing distributions for the 2009 Ford Econoline Cargo Van, E-150 Commercial. Additionally, the "good" and "great," and "overpriced" price ranges are indicated in relation to the presented pricing curve. FIG. 8B presents a similar pricing curve related to local level data for the same vehicle.

It may be illustrative of the power and efficacy of embodiments disclosed herein to discuss in more detail embodiments of various interfaces which may be employed in conjunction with embodiments of a vehicle data system. Referring to FIGS. 9A-9D embodiments of interfaces for obtaining vehicle configuration information and the presentation of pricing data. In particular, referring first to FIG. 9A, at this point a user may have selected a 2009 Dodge Charger 4dr Sedan R/T AWD and is presented interface 1500 to allow a user to specify his desired vehicle configuration in more detail through the selection of one or more attributes. Notice that interface 1500 presents the user with both the invoice and sticker prices associated with each of the attribute which the user may select.

Figure 9A:
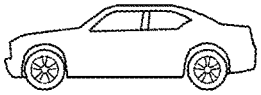
FIGS. 9A-9D depict embodiments of interfaces for obtaining vehicle configuration information and the presentation of pricing data.
Figure 9B:

Once the user has selected any of the desired attributes he may be presented with an embodiment of interface 1510 such as that depicted in FIG. 9B, where the user may be allowed to select one or more currently available incentives associated with selected vehicle configuration (in this case a 2009 Dodge Charger 4dr Sedan R/T AWD). In certain embodiment, the vehicle data system may access any currently available incentives corresponding to the user's specified vehicle configuration and present interface 1510 utilizing the obtained currently available incentives to allow a user to select zero or more of the available incentives. Notice here that one of the presented incentives comprises a $4500 cash amount. Suppose for purposes of the remainder of this example that the user selects this $4500 incentive.

Figure 9C:
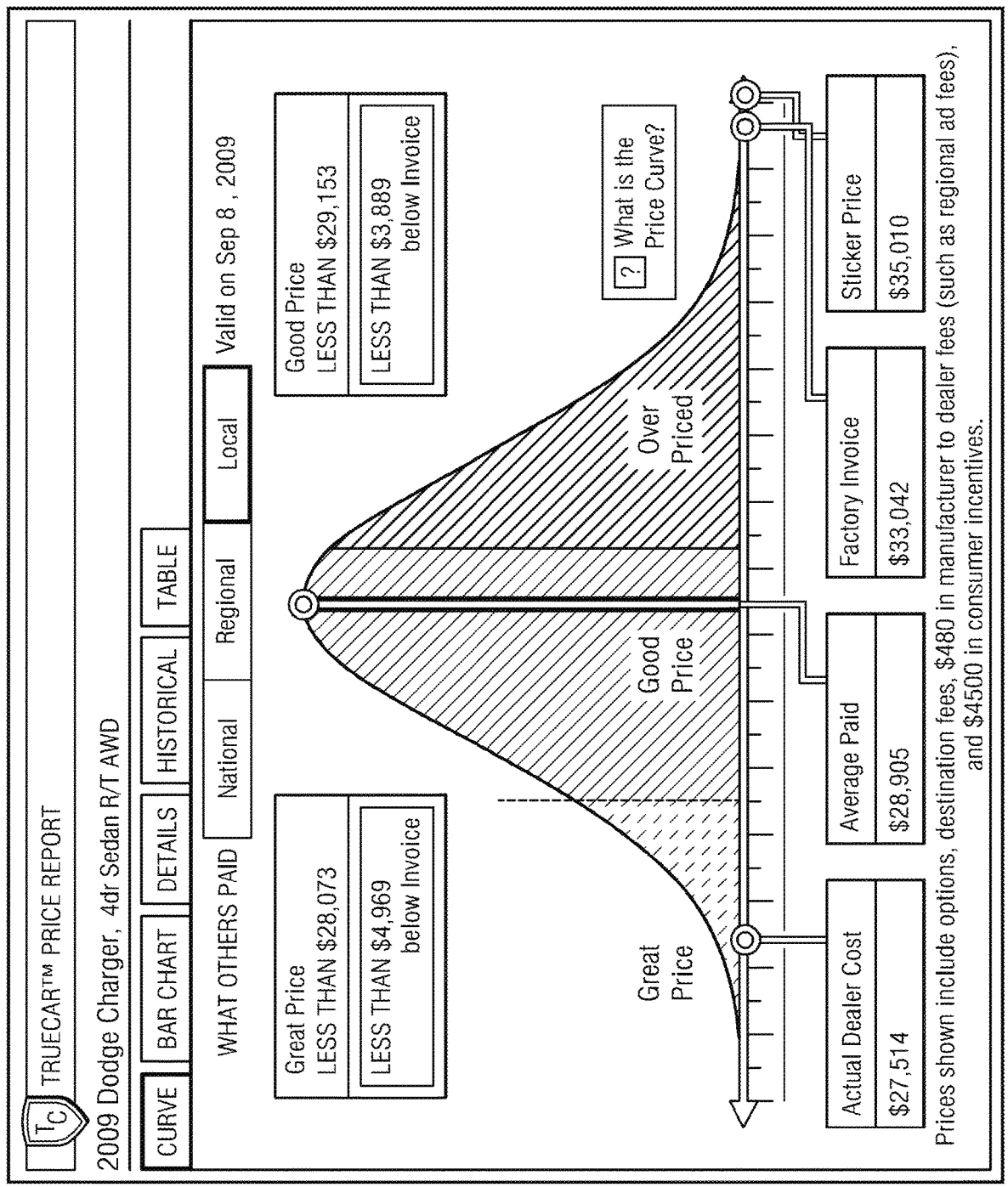

Moving now to FIG. 9C, an embodiment of an interface presenting pricing information associated with selected vehicle configuration (in this case a 2009 Dodge Charger 4dr Sedan R/T AWD) is depicted. Notice here that the interface specifically notes that the prices shown include the $4500 in consumer incentives selected by the user with respect to interface 1510 in this example.

Figure 9D:
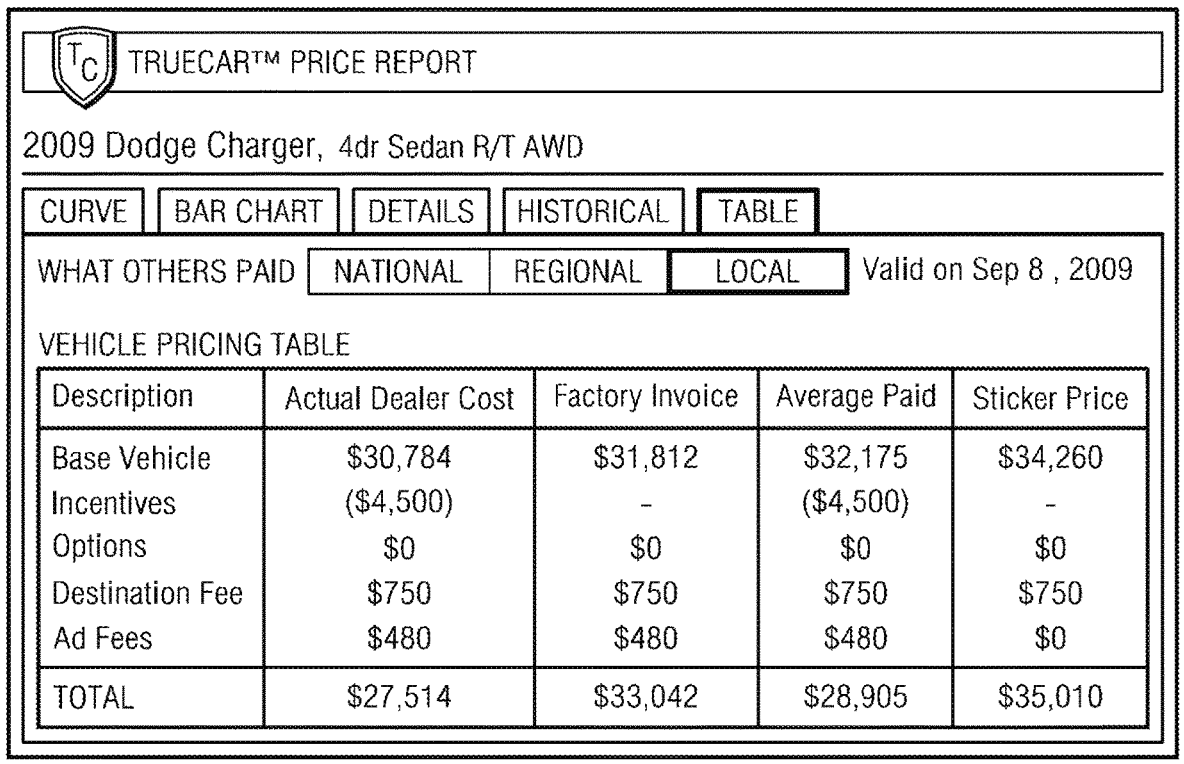

Notice now, with respect to FIG. 9D one embodiment of an interface presenting the determined Actual Dealer Cost, Factory Invoice, Average Paid (average price paid) and sticker price for a 2009 Dodge Charger 4dr Sedan R/T AWD on a local level is presented. Notice here with respect to this interface, that the user is presented not only with specific pricing points, but in addition, data on how these pricing points were determined, including how the $4500 consumer incentive selected by the user was applied to determine the dealer cost and the average price paid. By understanding incentive information and how such incentive information and other data may be pertain to the dealer cost and the average price paid by others, a user may better be able understand and evaluate prices and pricing data with respect to their desired vehicle configuration.

It may be additionally useful here to present a graphical depiction of the creation data which may be presented through such interfaces. As discussed above, a bin for a specific vehicle configuration may comprise a set of historical transaction data. From this historical transaction data, a histogram of dealer margin (transaction price−dealer cost), as well as other relevant statistics such as mean and standard deviation may be calculated. For example, FIG. 10A graphically depicts a national-level histogram for a Honda Accord corresponding to a bin with a large sample set of 6003 transactions and 18 buckets (the first bucket comprising any transaction less than 2 standard deviations from the mean, 16 buckets of 0.25 standard deviations, and the last bucket comprising any transactions greater than 2 standard deviations from the mean). FIG. 10B graphically depicts another example of a histogram for a Honda Accord.

Figure 10A:
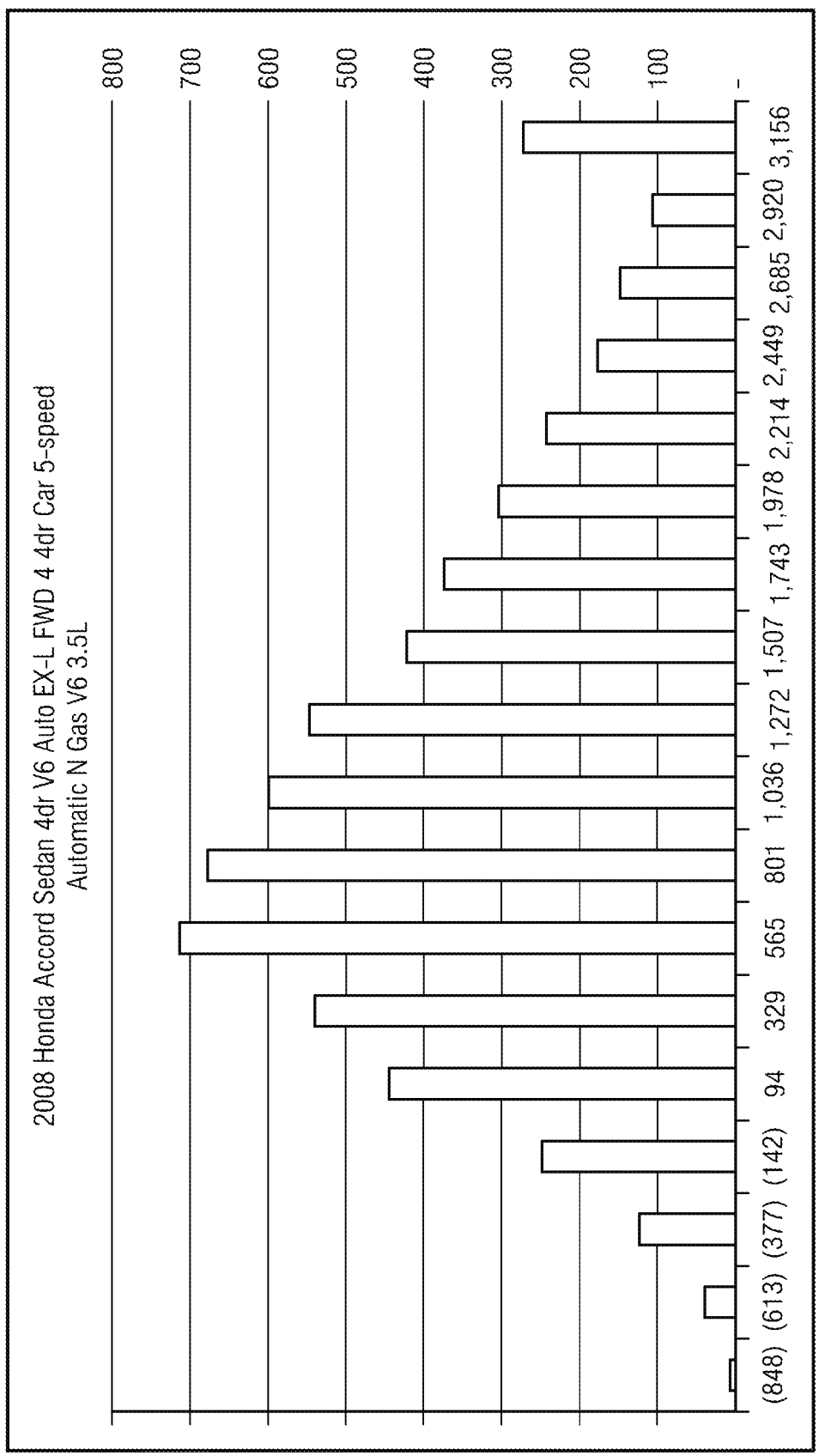
FIGS. 10A-14 graphically depict the creation of pricing data.
Figure 10B:
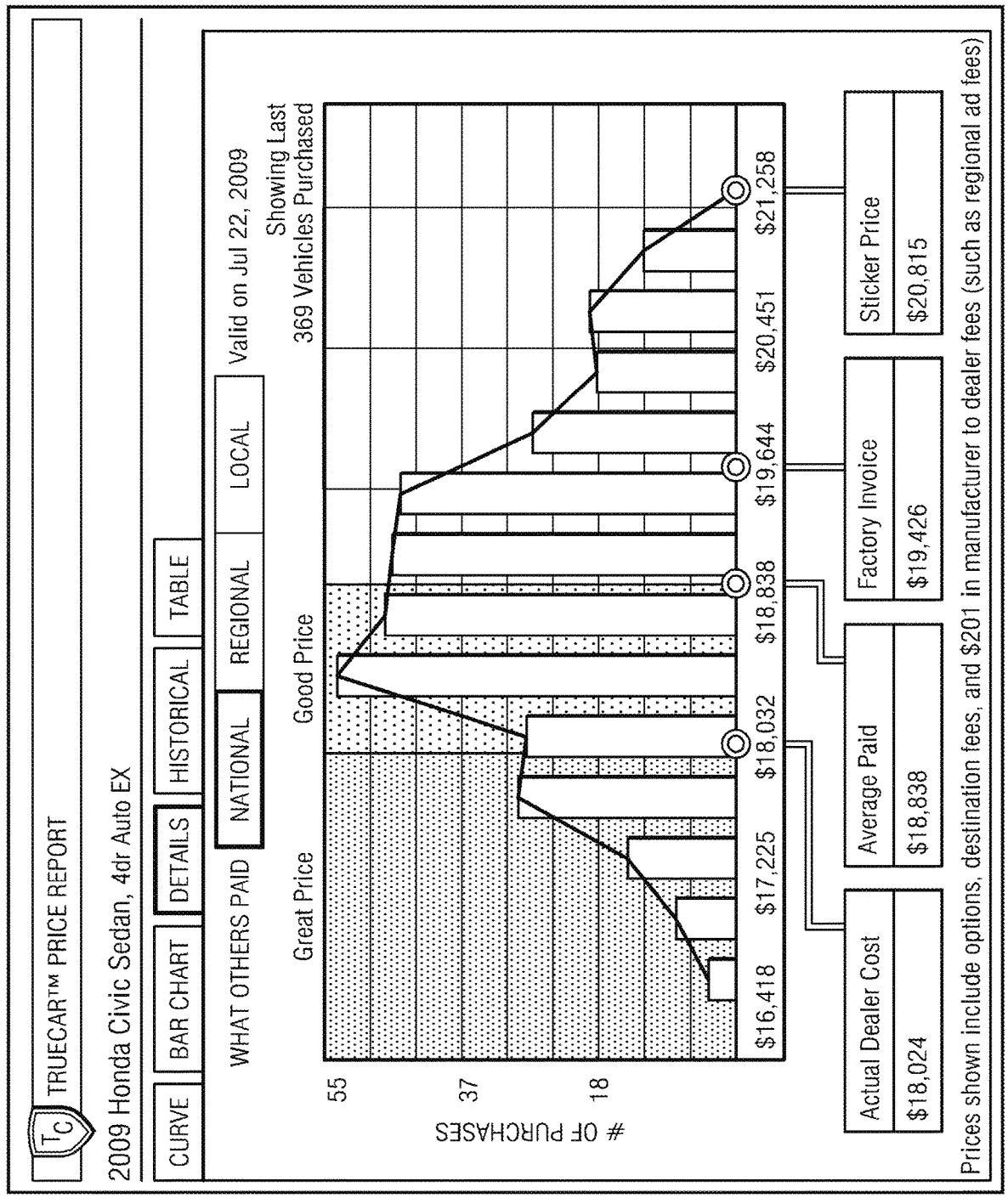
Figure 11:
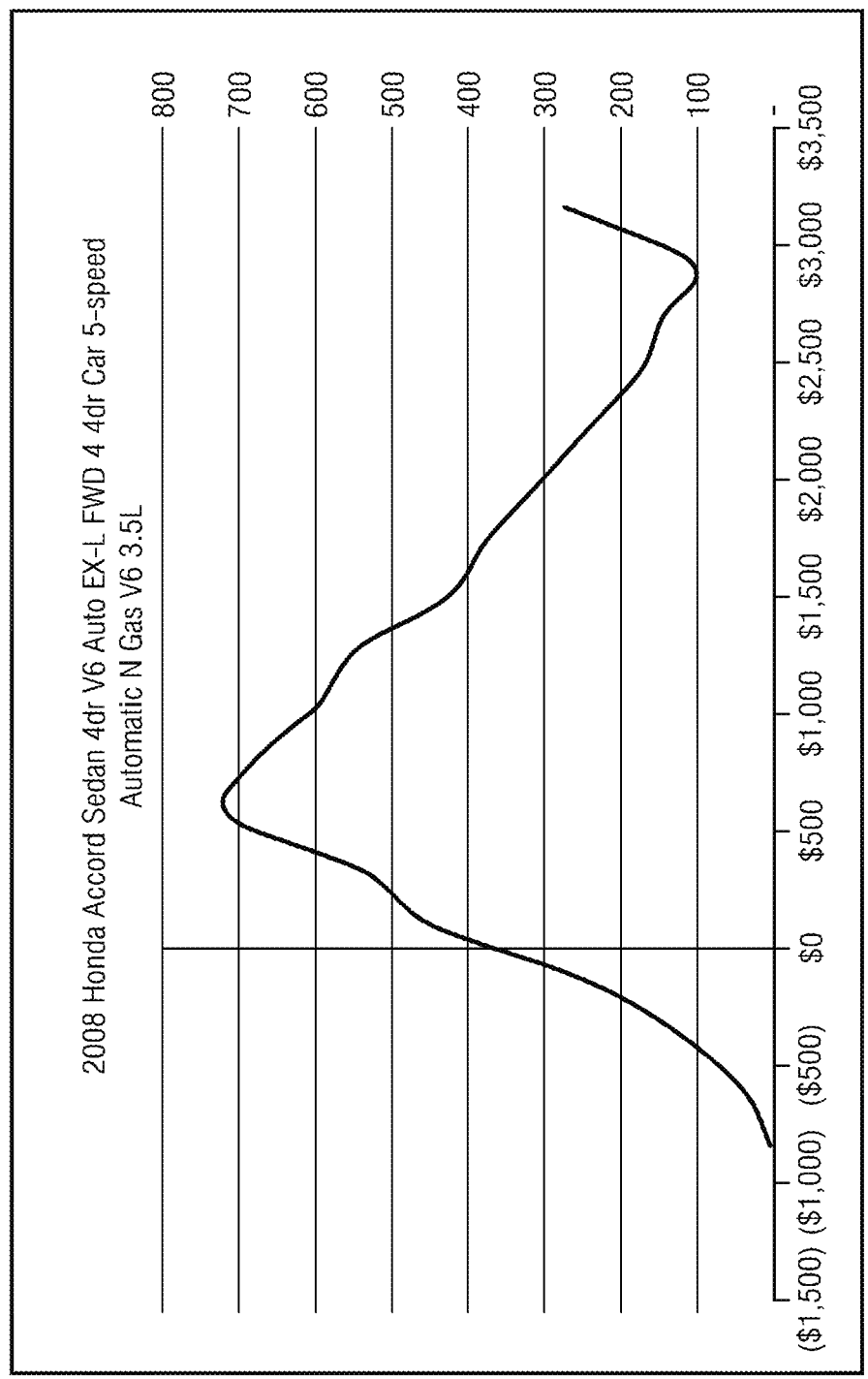
Figure 12:
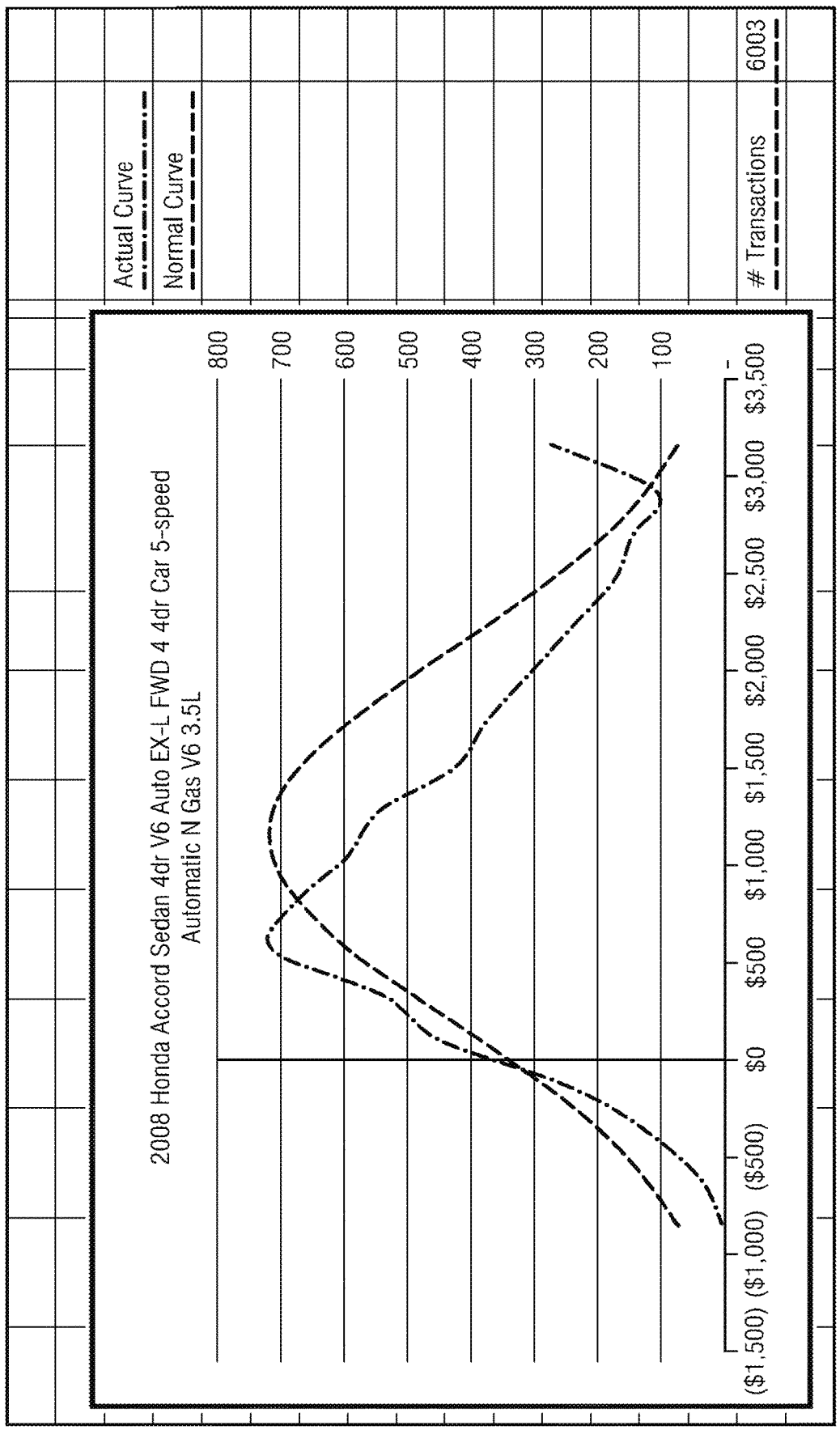

FIG. 11 depicts a conversion of the histogram of FIG. 10A into a graph. FIG. 12 graphically depicts the overlaying of the histogram curve as depicted in FIG. 11 with a normalized curve by aligning the means of the histogram and the normal curve and the values for the X-axis. Once the real curve is abstracted from a simplified normal distribution, recommended pricing ranges can then be overlaid on top of the normal curve to capture some of the complexity of the actual curve.

Figure 13:
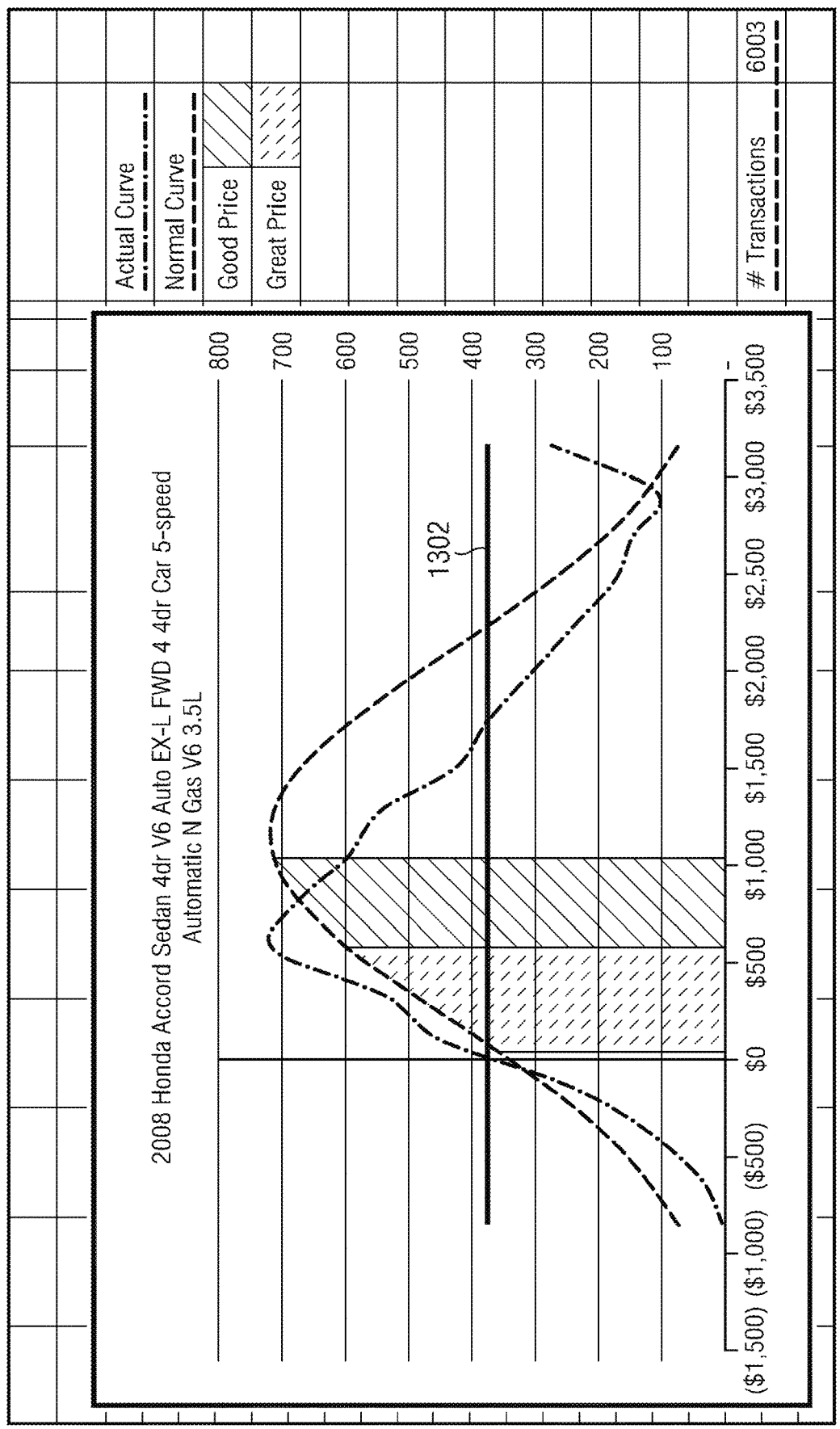

FIG. 13 graphically depicts determined "good" and "great" price ranges based on margin ranges determined based on the percentile of people that purchased the car at below that price. One algorithm could be: that the top of the range of a side of the "good" price range=MIN (50th percentile transaction margin, average margin); the lower end of the "good" range/upper end of the "great" range would be 30th percentile transaction point if less than 20% of the transactions are negative margin or 32.5th percentile transaction point if greater than 20% of the transaction are negative margin; and the lower end of "great" price range would be the 10th percentile transaction point if less than 20% of the transactions are below Dealer Cost (have a negative margin) or the 15th percentile transaction point if less than 20% of the transaction are negative margin. The entire data range could be utilized for displayed, or the range of the data may be clipped at some point of the actual data to simplify the curve. In the example depicted in FIG. 13, the data set has been clipped at the bottom of the "great" range 1302.

Figure 14:
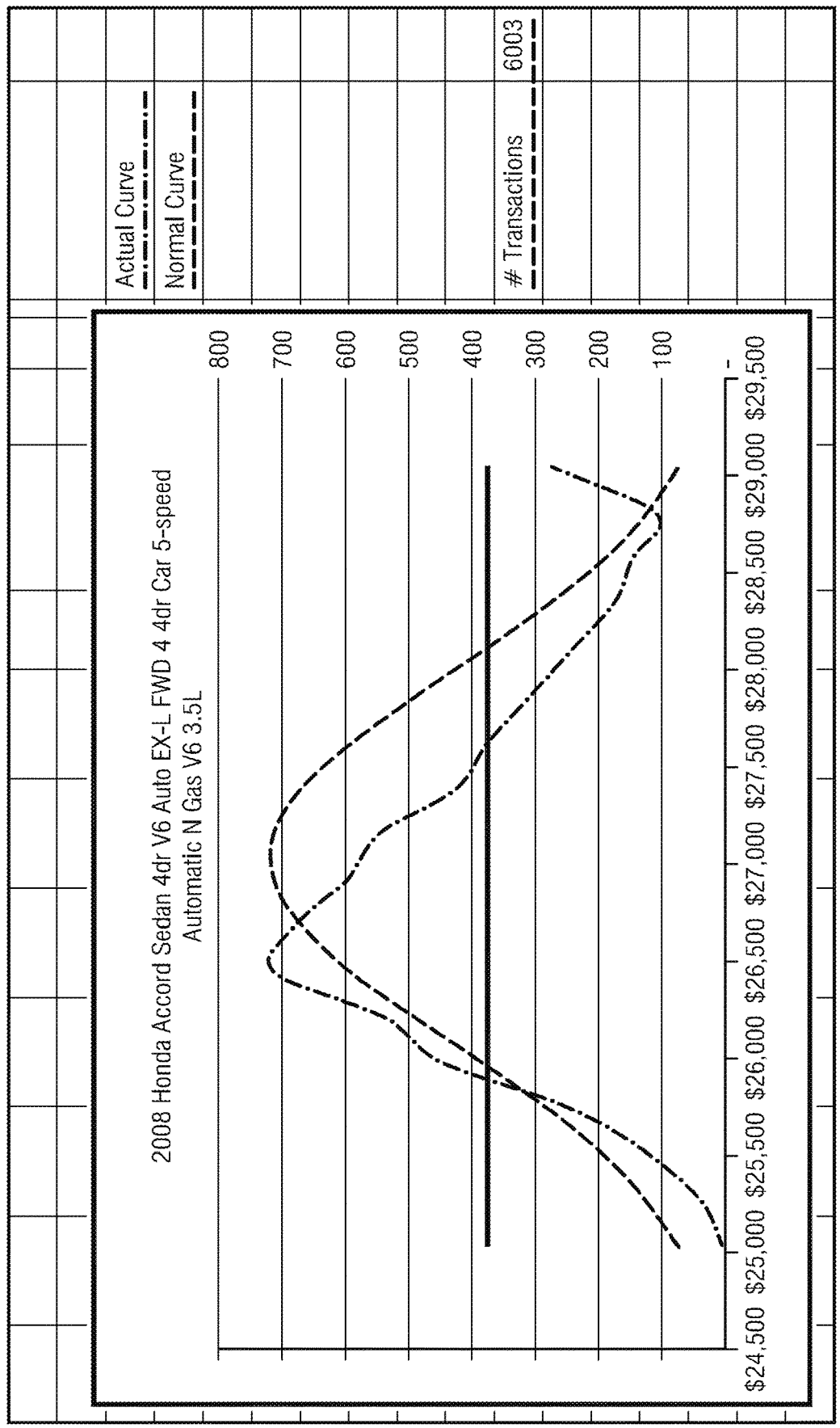
Figure 15:
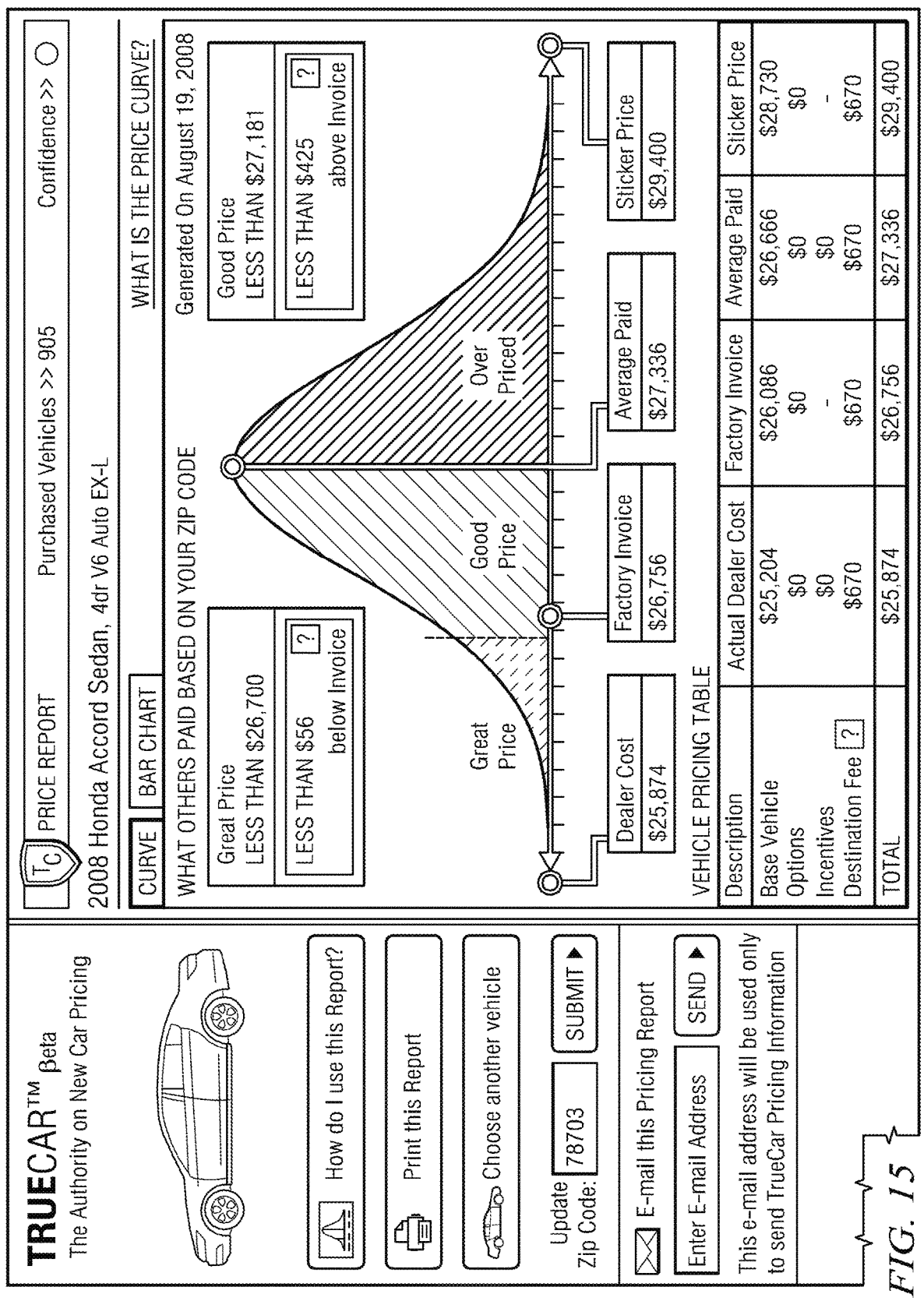
FIGS. 15-18 depict embodiments of interfaces for the presentation of pricing data.
Figure 16:
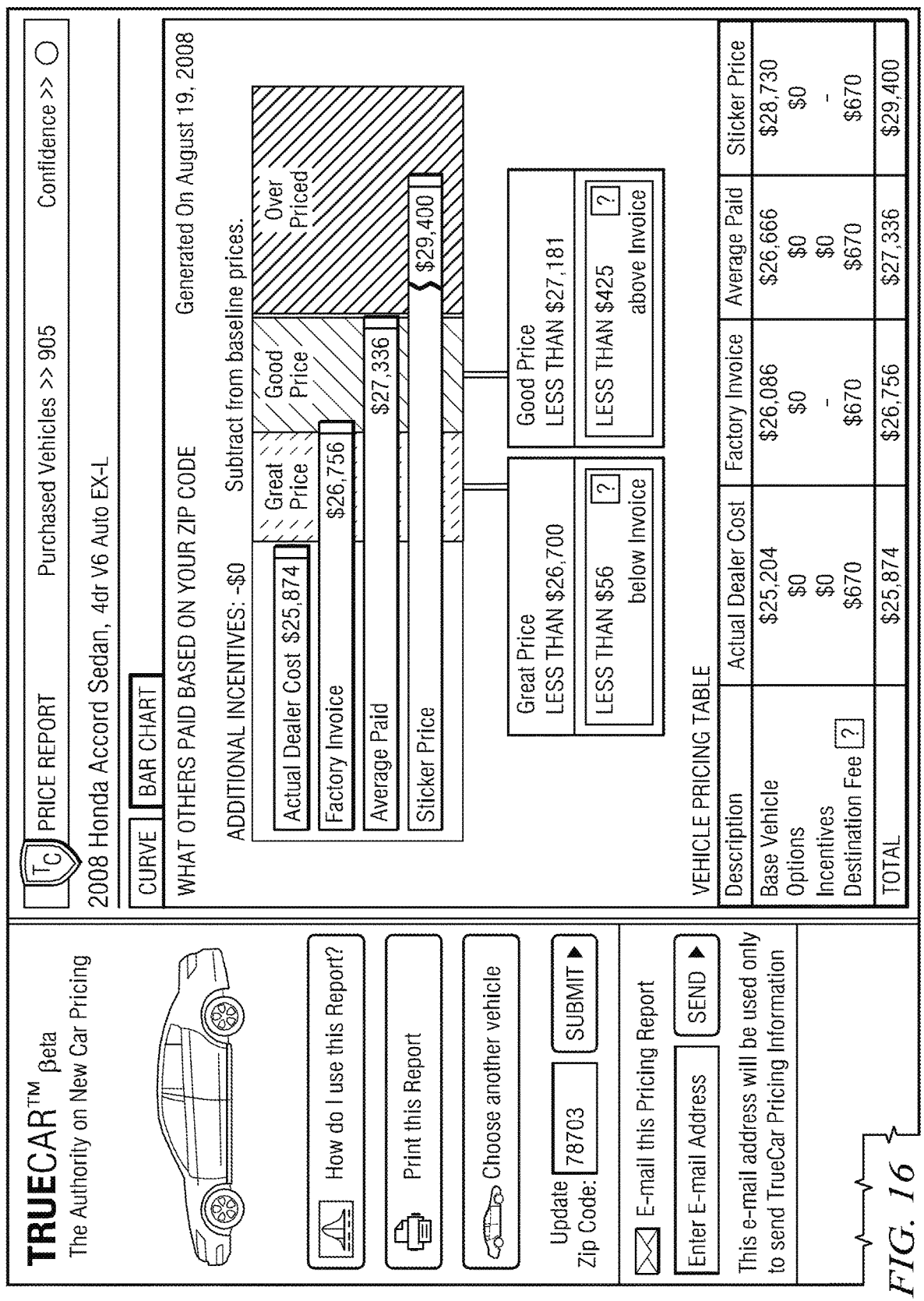
Figure 17:
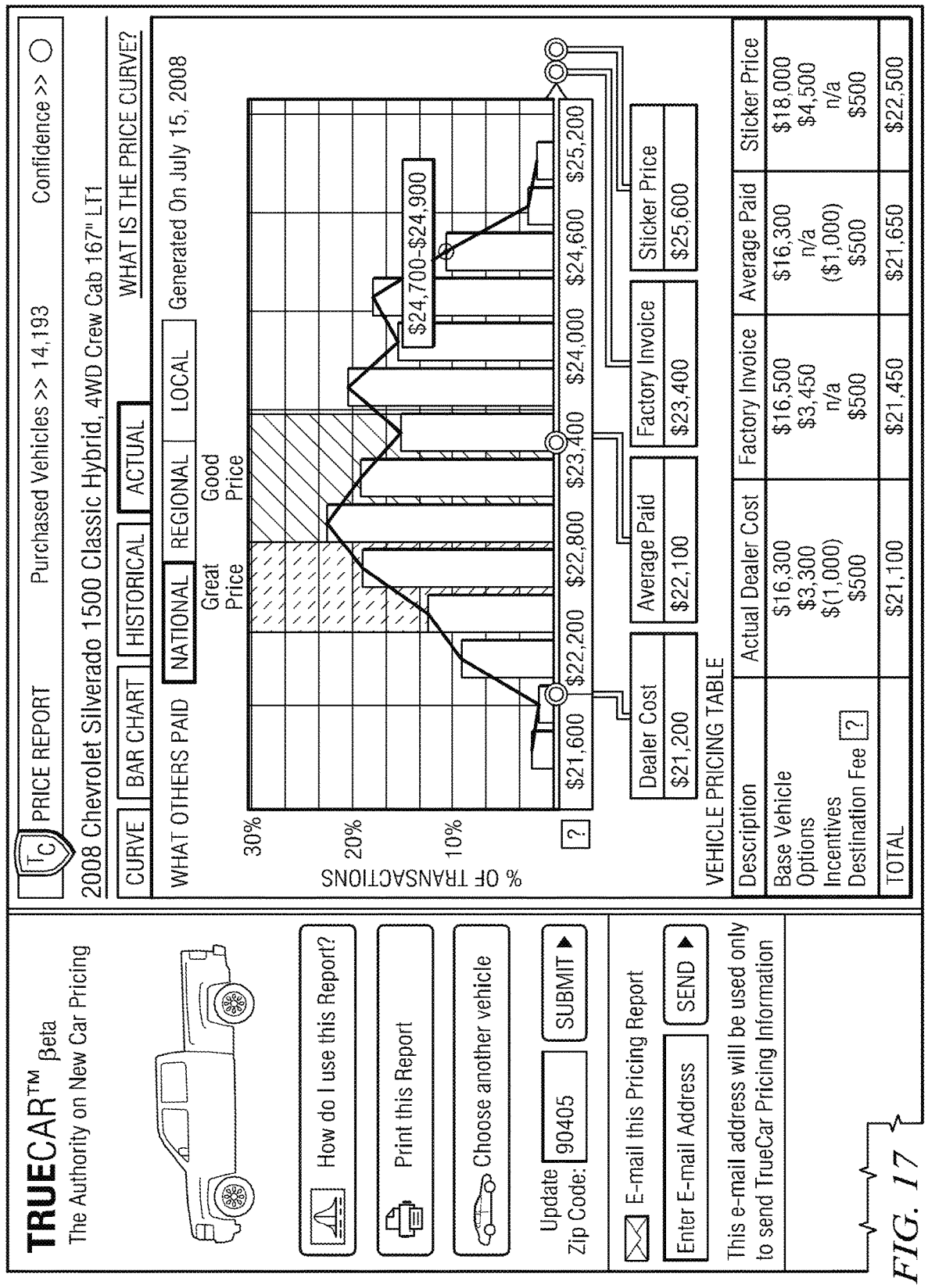
Figure 18:
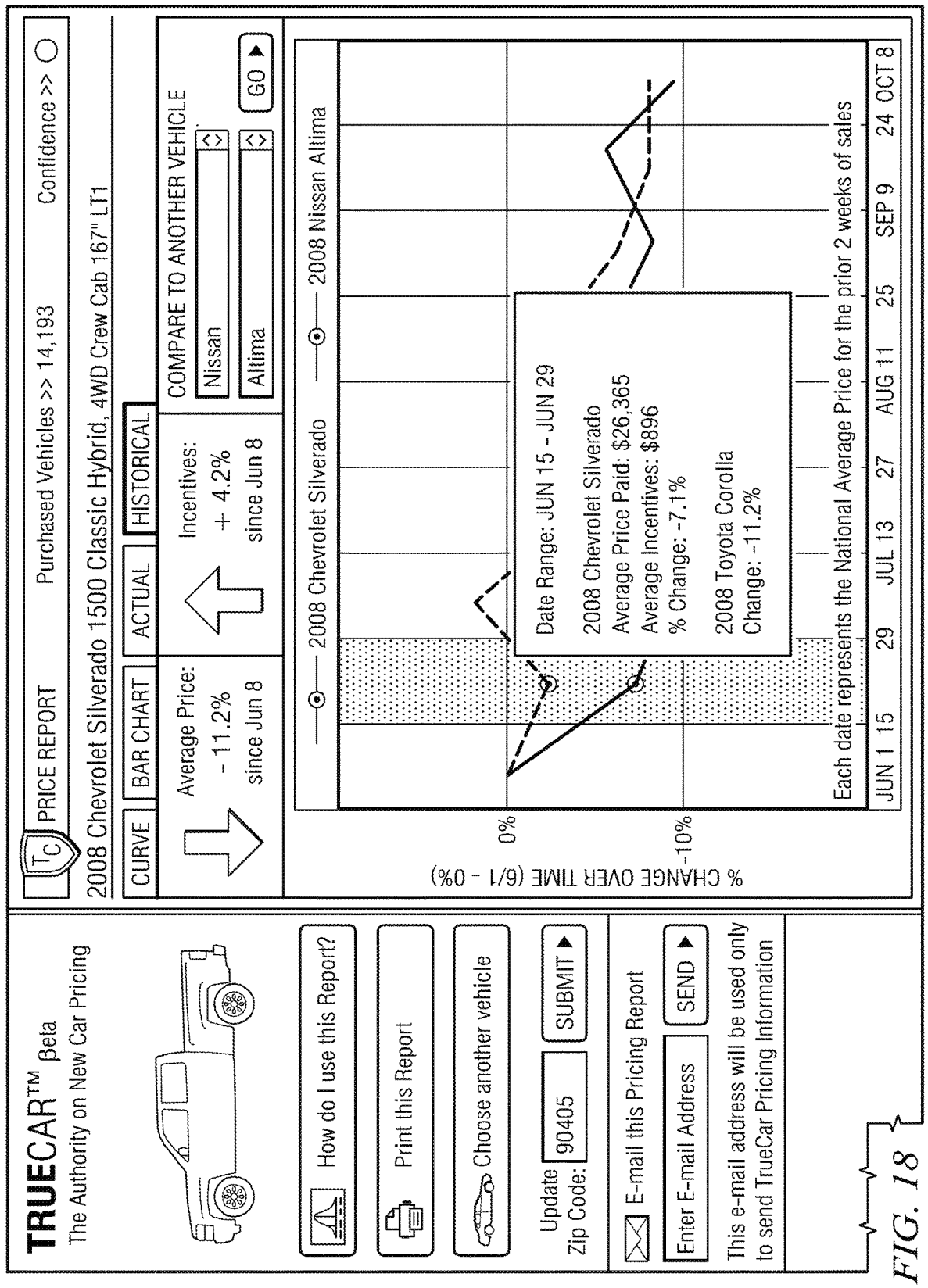

Once a dealer cost has been established for the specified vehicle, the dealer cost is added to each bucket along the X-axis of the margin histogram for this location and vehicle specification, translating the margin curve into a price curve as graphically depicted in FIG. 14. The price histogram is then overlaid with the determined "good"/"great" price ranges (which may also scaled by adding the dealer cost) as well as other pricing points of interest such as Dealer Cost, Factory Invoice, and MSRP. This enhanced histogram may be presented to user in a variety of formats, for example, the histogram may be displayed as a simplified curve as depicted in FIG. 15; as a bar chart as depicted in FIG. 16; as actual data as depicted in FIG. 17; or as historical trend data as in depicted in FIG. 18.

As mentioned above, to determine accurate pricing information for a specified vehicle, it is important to have accurate cost information associated with the historical transaction data associated with that vehicle. Thus, in many cases when obtaining historical transaction data from a data source it may be desired to check a dealer cost provided in conjunction with a historical transaction or to determine a dealer cost to associate with the historical transaction. As dealer cost models have been constructed for each manufacturer (see step 520) it may be possible to leverage these dealer cost models to accurately construct dealer cost for one or more historical transactions and check a provided dealer cost or associate the determine dealer cost with a historical transaction.

Figure 19:
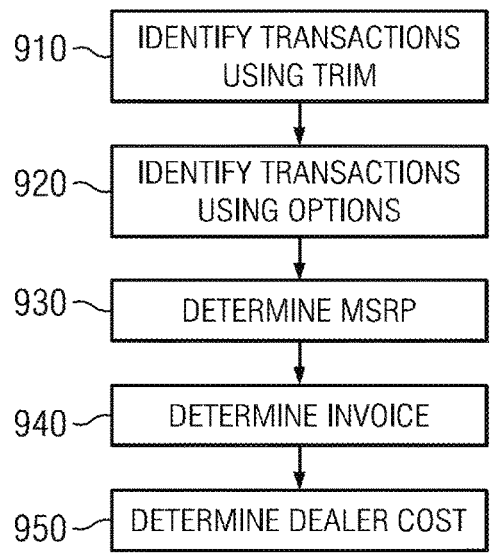
FIG. 19 depicts one embodiment of a method for determining dealer cost.

FIG. 19 depicts one embodiment of a method for determining an accurate dealer cost for historical transactions. Initially, at step 910 historical transactions of obtained historical data which have accurate trim mapping may be identified. In most cases, the vehicle associated with a historical transactions may be mapped to a particular trim based on the vehicle identification number (VIN) associated with the historical transaction. However, often a 1 to 1 VIN mapping cannot be completed as all information necessary to perform the mapping might not be included in the VIN. In other words, a particular VIN may correspond to many trim levels for a vehicle. In these cases data providers may provide a one-to-many mapping and provide multiple trims associated with a single historical transaction. This presents a problem, as an actual sales transaction may then have multiple historical transactions in the historical transaction data, each historical transaction associated with a different trim, only one of which is actually correct. Given that there is often no way of identifying which of these historical transactions is correct, an appropriate modeling approach is to either weight these transactions differently or exclude these potential mismapped transactions from the model-building dataset. Thus, in one embodiment, after identifying these potential mismapped transactions by for example, determining if there are multiple historical transactions associated with a single VIN, the identified historical transactions may be excluded from the historical data set (for purposes of this method).

Within the remaining historical transactions, then, those historical transactions with accurate information may be identified at step 920. As discussed before, the invoice and dealer cost fields of historical transaction data may be inaccurate. As one objective of the determination of dealer cost is accuracy it is important that dealer cost be determined only for those historical transactions where it can be determined with relative accuracy. As the presence of accurate trim information or option information may be leveraged to determine dealer cost, it may be desired to further refine the historical transaction to determine those historical transactions with accurate trim mapping or identifiable options information.

Now that a set of historical transactions with accurate trim mapping and identifiable option information has been obtained, an MSRP may be determined for each of these historical transactions at step 930. Again, given that the data associated with a historical transaction may be unreliable and that alignment with configuration data (for example, dealer cost models or price ratio equation) is important, it may be desirable to determine certain data associated with the historical transaction data utilizing known data. Thus, even if an MSRP was provided or otherwise obtained, an MSRP for the historical transaction may be determined. First, a base MSRP may be determined. Specifically, with year, make, model, and trim identified specifically from the VIN, a base MSRP may be determined based on data provided by a data source. Then, using additional options identified by the historical transaction data the manufacturer suggested retail pricing for these options can be added to the base MSRP to form the transaction MSRP. More specifically, with each historical transaction there may be a field that includes a set of options codes indicating which options were factory-installed on the particular vehicle corresponding to that historical transaction. Parsing this information, the options codes can be used in conjunction with option pricing information obtained from a data source to identify a MSRP for each factory-installed option. Summing each of the manufacturer prices for the options the Total Options MSRP can be generated and added to the base MSRP to generate the transaction MSRP for that particular historical transaction (Transaction MSRP=Base MSRP+Total Options MSRP).

After the transaction MSRP is determined for the historical transactions, invoice pricing for each of the historical transactions may be determined at step 940. The transaction invoice may be generated similarly to the transaction MSRP. First, a base Invoice price may be determined. Specifically, with year, make, model, and trim identified specifically from the VIN, a base Invoice price may be determined based on data provided by a data source. Then, using additional options identified by the historical transaction data, pricing for these options can be added to the base Invoice price to form the transaction Invoice price. More specifically, with each historical transaction there may be a field that includes a set of options codes indicating which options were factory-installed on the particular vehicle corresponding to that historical transaction. Parsing this information, the options codes can be used in conjunction with option pricing information to assign an options Invoice price for each factory-installed option. Summing each of the option Invoice prices for the options the Total Options Invoice price can be generated and added to the base Invoice price to generate the transaction Invoice price for that particular historical transaction (Transaction Invoice=Base Invoice+Total Options Invoice).

Using the determined MSRPs and Invoice prices, a dealer cost for each historical transaction may be determined at step 950. This dealer cost may be determined by algorithmically determined utilizing the dealer cost model associated with the manufacturer of the vehicle associated with a historical transaction. More specifically, each make of vehicle (manufacturer) has an associated holdback equation as discussed above. For a particular historical transaction, using the holdback equation corresponding to the make of the vehicle to which the historical transaction pertains, the base invoice price, base MSRP, transaction invoice price and transaction MSRP determined for that historical transaction, and freight fees (which may be determined based on information obtained from a data source similarly to the determination of base invoice and base MSRP), the holdback equation can be applied to determine dealer cost (dealercost=invoice−holdback).

Figure 20:
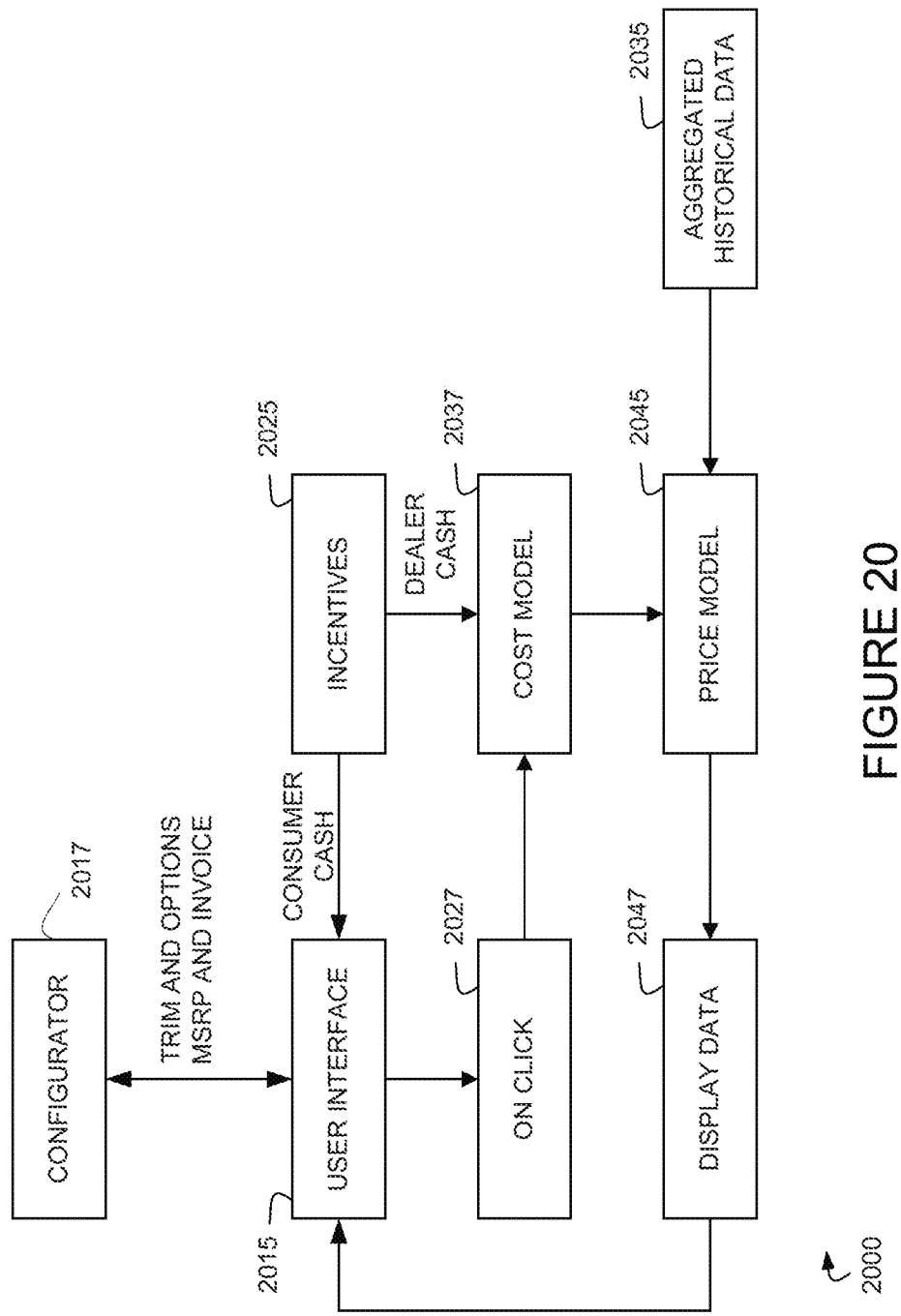
FIG. 20 depicts one embodiment of a method for determining and presenting pricing data.

While more details of embodiments of a vehicle data system have been discussed above, it may be useful here to go over at a high level how embodiments of such a vehicle data system may be utilized. Accordingly, FIG. 20 depicts a flow diagram 2000 for one embodiment of the use of an embodiment of a vehicle data system.

At step 2015 an interface may be presented to a user, where the interface comprises a configurator 2017 that enables a user to specify a vehicle configuration. The configuration may allow a user to select one or more consumer incentives 2025 that are offered for the specified vehicle configuration. Using the presented interface a user may indicate that he wishes to obtain pricing data for the specified vehicle configuration (for example through interacting with the interface with a "click" 2027 of the mouse).

Based on the values of these attributes of the specified vehicle configuration, the specified vehicle's bin may be identified. In one embodiment, a bin for a vehicle can be defined as historical data associated with at least one of a group of vehicles that have the same year, make, model and body type for which there is historical transactions data within a certain time period (for example, the past four weeks or some other time period).

Using the pricing information associated with the historical transactions in the bin 2035 corresponding to the specified vehicle, an average price and average cost for the specified vehicle may be computed using the historical transaction data associated with the bin of the specified vehicle and the dealer cost model 2037 corresponding to the manufacturer of the specified vehicle. The price ratio corresponding to the specified vehicle may then be determined using the price ratio model 2045 by plugging in values corresponding to the specified vehicle into the bin-level variables of the price ratio model and solving. Using the determined price ratio, the average price paid for the specified vehicle may be determined along with one or more price ranges. A display may then be generated at step 2047 to display determined pricing data to a user via user interface 2015. The display may present such information as pricing distributions, price ranges, certain price points, etc.

Thus, using the historical transactions in the bin for the specified vehicle, desired pricing information may be obtained. In many cases, however, there may be fewer historical transactions in a bin for a specified vehicle than is desired to generate reliable or accurate predictions (for example, in the cases of a model which is relatively new to the market or is an exotic of which few models are sold). In these instances, then, to increase the accuracy of determined pricing data, it may be useful to apply different or additional price ratio models that leverage incremental data.

Embodiments may therefore determine a set of price models to utilize in various conditions and utilize appropriate models in the cases where such conditions are extant. In particular, in one embodiment, one or more price models may be generated for use in the case where fewer than a desired number of historical transactions are present in the bin of a specified vehicle (for example, fewer than around 20 historical transactions, etc.). Even more specifically, of these price models, one or more price models may be generated for cases where there are fewer than a certain number of list prices for the specified vehicle available (for example, 3 or fewer, etc.) and cases where there are a certain number of list prices (or more) available. Certain of these price models may also pertain to new models (for example, less than 12 weeks on the market), where certain of these price models may be determined for cases where there is historical transaction data for a similar make and model from a past year and other price models determined for new models in cases where there is no such historical transaction data.

Accordingly, in one embodiment, certain price models may be determined and included in models 128 for use by a vehicle data system to determine pricing data to present to a user. Models 128 may therefore include, in addition to a general price model discussed above, the following price models:

a price model for instances in which there are less than a threshold number of historical transactions available and for which there is less than a threshold number of list prices available (referred to as No_Info model);

a price model for instances in which there are less than a threshold number of list prices available and for which there is historical data available (referred to as New_Trim_Prior_No_List model);

a price model for instances in which the specified vehicle is not a new model, there is less than a threshold number of historical transactions available and for which there is a threshold number of list prices available (referred to as Low-Volume model);

a price model for instances in which the specified vehicle is not a new model and there is historical transaction data available for a comparable make or model from a previous year (referred to as New_Trim_Prior model); and a price model for instances in which the specified vehicle is a new model and there is no historical transaction data for a comparable make or model for a previous year available (referred to as New_Trim_No_Prior model).

Each of these price models may be generated utilizing global multivariable regression and historical transaction data. It may be useful here to go into more details about how each of these price models, also referred to as data scarcity models, is created. Referring to FIG. 21, an embodiment of method 2100 for the creation of a New_Trim_Prior price model is depicted. At step 2110, initial historical data to utilize in the creation of the price model may be obtained. This initial historical transaction data may comprise historical transaction data pertaining to transactions which occurred in the last year for vehicle models or trims which were new at the time of the transaction (in one embodiment, if the model had been on the market for less than 12 weeks). As an example, new trim, listing prices, and prior bin pricing information may be available.

Using this initial historical transaction data, at step 2120, new trim binning may be determined. Specifically, bin_prior bins can be determined for the vehicles corresponding to each of the initial historical transactions. These bin_prior bins may include historical transactions which correspond to a vehicle of the same make, model and body type (e.g., coupe, sedan, hatchback, convertible, etc.), of the previous year, which was sold the same number of weeks after its release data (referred to as Weeks_Since). For instance, if one or more initial historical transactions correspond to a 2010 Kia Rio Coupe in its 6th week in market, a bin_prior comprising historical transactions for a 2009 Kia Rio Coupe in its 6th week on the market from the prior year may be determined. It will be noted that though both vehicles may be in their 6th week on the market, the actual dates may be dissimilar to a greater or lesser degree as the actual release data for vehicles may vary from year to year.

At step 2130, using each bin_prior an average 4-week price ratio may be generated.

Next, at step 2140, bin_priortrim bins may be determined. A bin_priortrim is similar to a bin_prior bin except that it is generated using a trim level instead of a body type. These bin_priortrim bins may include historical transactions which correspond to a vehicle of the same make, model and trim (e.g., LX, DX, same values for a set of vehicle attributes, etc.) of the previous year, which was sold the same number of weeks after its release data (referred to as Weeks_Since).

At step 2150, an invoice price ratio for each of the vehicles (a ratio of the invoice prices of these vehicles year over year) can be determined utilizing the bin_priortrim for the vehicle. Invoice prices of these vehicles are compared year over year.

At step 2160, the most recent listing price data for each vehicle year, make, model and trim for which a bin_priortrim was generated is utilized to produce an average listing price for this trim. Listing price information may be information from dealers that list prices on their websites or in print as their no-haggle price that they are willing to sell the vehicle for. The up-front pricing may be determined from one or more data sources.

At step 2170 a New_Trim_Prior model is then constructed utilizing the data determined at steps 2110-2160. This New_Trim_Prior model may be of the form:

$$\text{Price Ratio} = f(x) = \sum_{i=0}^{n} \sum_{k=0}^{m} (\beta_i X_i),$$

where $X_i$'s are variables, and $\beta_i$'s are coefficients.

Specifically, one embodiment of this equation might be the following: PriceRatio=a0+a1*PRlisting+a2*optionsmsrp_ratio+a3*invoicetrimyoy+a4*priordiff4+a5*f(daysinmarket)+a6*basemsrp, where ai=coefficients, PRlisting is the most up-to-date listing price ratio for this particular trim, optionsmsrp_ratio is the ratio of the optioned up vehicle msrp to the base msrp, Invoicetrimyoy is the ratio of year-over-year invoice prices for this trim, priordiff4 is the difference in the prior year price ratio and the current listing price ratio, f(daysinmarket) is any suitable transformation of the # of days the model has been on the marketplace and basemsrp is the base model msrp for the vehicle. In this case, a straight linear construction of the variable is performed. New_Trim_Prior model is further described below with reference to FIG. 25.

In one embodiment, a New_Trim_Prior_No_List model may be constructed in a similar manner as described above with the exception of step 2160. In this case, prior year data, and not the most recent listing price data, is used to determine the average listing price for the new trim. This is possible because, while vehicle prices may change quite a bit from year to year, pricing variance for a given trim is relatively stable.

Turning now to FIG. 22, an embodiment of method 2200 for the creation of a New_Trim_No_Prior model price model is depicted. At step 2210, initial historical data to utilize in the creation of the price model may be obtained. This initial historical transaction data may comprise historical transaction data pertaining to transactions which occurred in the last year for vehicle models or trims which were new at the time of the transaction (in one embodiment, if the model had been on the market for less than 12 weeks).

At step 2220, the most recent listing price data for each vehicle year, make, model and trim for which an initial historical transaction exists may be obtained to produce an average listing price for this trim. At step 2230, a New_Trim_No_Prior price model is then determined utilizing the data determined at steps 2210 and 2220 in the same manner as discussed above with respect to step 2170.

Figure 23:
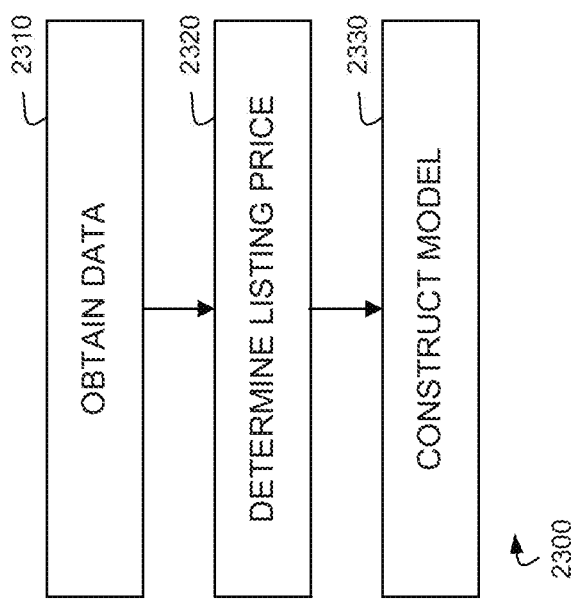
FIG. 23 depicts one embodiment of determining a price model.

Moving on, FIG. 23 depicts an embodiment of method 2300 for the creation of a No_Info price model. At step 2310 initial historical data to utilize in the creation of the price model may be obtained. This initial historical transaction data may comprise all historical transaction data pertaining to transactions which occurred in the last year.

At step 2320, the most recent listing price data for each vehicle year, make, model and trim for which an initial historical transaction exists may be obtained to produce an average listing price for this trim. At step 2330, a No_Info price model is then determined utilizing the data determined at steps 2310 and 2320 in the same manner as discussed above with respect to step 170.

Figure 24:
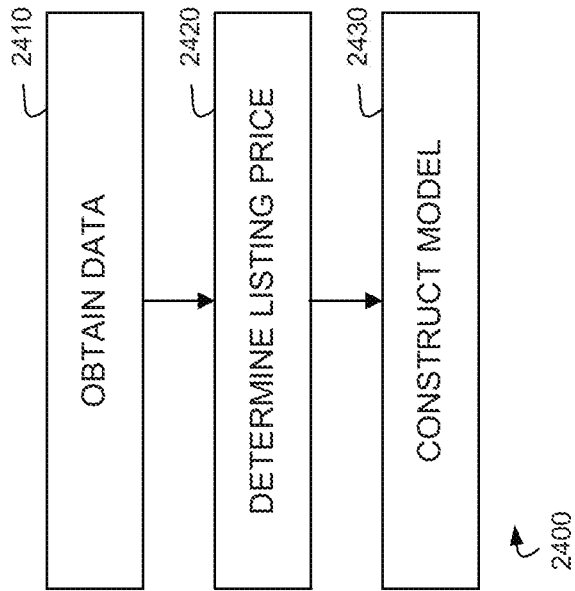
FIG. 24 depicts one embodiment of determining a price model.

FIG. 24 depicts an embodiment of method 2400 for the creation of a Low-Volume price model. At step 2410 initial historical data to utilize in the creation of the price model may obtained. This initial historical transaction data may comprise all historical transaction data pertaining to transactions which occurred in the last year.

At step 2420, the most recent listing price data for each vehicle year, make, model and trim for which an initial historical transaction exists may be obtained to produce an average listing price for this trim. At step 2430, a Low-Volume price model is then determined utilizing the data determined at steps 2410 and 2420 in the same manner as discussed above with respect to step 2170.

Figure 25:
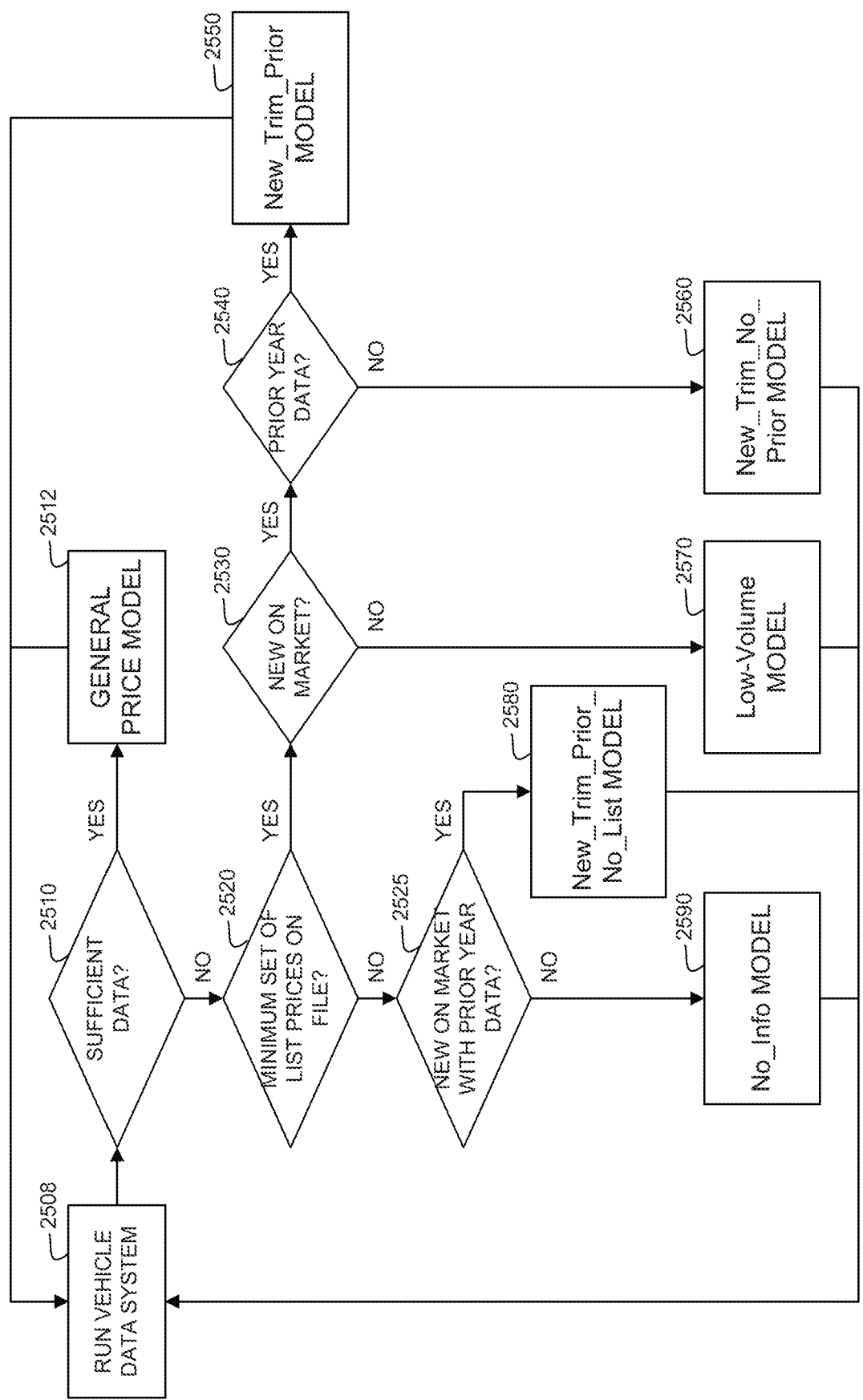
FIG. 25 depicts one embodiment for a method of operating a vehicle data system which employs multiple price models.

Once these price models are generated, vehicle data system 120 may utilize these price models to more accurately determine pricing data associated with specific vehicle configurations. FIG. 25 depicts one embodiment of method 2500 for the operation of an embodiment of a vehicle data system which employs embodiments of the models discussed above.

At step 2508, a vehicle data system may operate as described above. Once a specified vehicle configuration is received from a user through an interface of the vehicle data system, it may be determined at step 2510 if sufficient historical transaction data for the specified vehicle configuration exists. More particularly, a bin of historical transaction data associated with the specified vehicle configuration for a particular time period (for example 4 weeks) may be obtained and the general price model applied to this historical transaction data. If there are sufficient number of historical transactions (in one embodiment, 20 or more transactions) associated with the specified vehicle configuration, at step 2512 the general price ratio model may be utilized as described above and pricing data for the specified vehicle configuration may be determined using only the general price ratio model, including, for example, an average price paid at a national level.

If, however, less than the threshold number of historical transactions exists, other price models may be utilized in addition to the general price model. In this case, it may be determined at step 2520 if there are a threshold (in one embodiment, three) number of list prices (which may in one embodiment be obtained from a list price provider such as ZAG or the like, other sources are possible as well). If there is less than the threshold number of list prices, it may be determined at step 2525 whether the specified vehicle configuration (for example a particular model) is new (in one embodiment, about 12 weeks or less) on the market but has prior year data is available. If so, a New_Trim_Prior_No_List model as described above may be utilized at step 2590. Otherwise, a No_Info model as described above may be utilized at step 2580.

In one embodiment, to utilize a No_Info model, historical transaction data corresponding to the year, make, model and trim of the specified vehicle configuration may be obtained. This will be used to construct the general price model. Additionally, a separate No_Info model equation may be constructed on the full set of all transactions data as a function of incentives information, options data or other vehicle configuration information. The No_Info price model utilized by the vehicle data system may then be applied using this data to generate an average price for the specified vehicle. A weighting factor can then be applied to combine the results from the two models (the general price model and the No_Info price model) to generate an average price paid.

Utilizing the determined average price, a pricing distribution may be generated. Here, a variance may be estimated: $\sigma = \sigma_{tot\_avg}$ where $\sigma_{tot\_avg}$=avg standard deviation on the data utilized and a is the predicted standard deviation of price ratios for specified vehicle configuration at the trim level. From this data, "Good" and "Great" price ranges can be determined.

Returning to step 2520, if at least a threshold number of list prices exist, it can be determined at step 2530 if the specified vehicle configuration is a new model (where, in one embodiment, a new model may be any model that has been on the market for about twelve weeks or less). If it is not a new model then, at step 2570, in addition to the general price ratio model a Low-Volume model may be utilized.

In one embodiment, to utilize a Low-Volume model, historical transaction data corresponding to the year, make, model and trim of the specified vehicle configuration may be obtained along with the most recent listing price data for the specified vehicle configuration. From the listing price data an average listing price may be determined for the specified vehicle configuration at a trim level. The Low-Volume price model utilized by the vehicle data system may then be applied using this data to generate an average price for the specified vehicle. A weighting factor can then be applied to combine the results from the two models (the general price model and the Low-Volume price model) to generate an average price paid.

Utilizing the determined average price, a pricing distribution may be generated. Here, historical transaction data for the year, make, model and trim level of the specified vehicle configuration and the most recent listing price data for the specified vehicle configuration may be utilized to produce an average standard deviation of listing price offsets for this trim. Next, construct $\sigma = \alpha_0 + \alpha_1 * (\sigma_{listing}/P_{invoice})$ where $\sigma_{listing}$=standard deviation of listing prices for the historical transaction data for the year, make, model and trim level of the specified vehicle configuration. Here, $\sigma$ is the predicted standard deviation of price ratios for this specified vehicle configuration at the trim level. From this data, "Good" and "Great" price ranges can be determined.

Returning to step 2530, if the specified vehicle configuration is a new model, it can be determined at step 2540 if there is historical transaction data for the same make and model as the specified vehicle configuration from a prior year. If there is such historical transaction data, a New_Trim_Prior model may be utilized at step 2550 in addition to the general price ratio model. Specifically, historical transaction data corresponding to the specified vehicle configuration may be obtained. Then, a first average price may be determined by applying the general price model to the obtained historical transaction data, as discussed above.

Next, a second average price may be determined for the specified vehicle configuration using the New_Trim_Prior model. In particular, a bin_prior bin can be determined for the specified vehicle configuration. This bin_prior bin may include historical transactions which correspond to a vehicle of the same make, model and body type of the previous year, which was sold the same number of weeks after its release data (referred to as Weeks_Since). Using this bin_prior an average 4-week price ratio may be generated.

A bin_priortrim bin may then be determined for the specified vehicle configuration. This bin_priortrim bin may include historical transactions which correspond to a vehicle of the same make, model and trim of the previous year, which was sold the same number of weeks after its release data. Using the bin_priortrim a year over year invoice price ratio for the specific vehicle configuration can be determined. Next the most recent listing price data for the specified vehicle configuration may be obtained. The New_Trim_Prior price model utilized by the vehicle data system may then be applied to determined data to generate the second average price.

A weighting factor can then be applied to combine the results from the two models (the general price model and this New_Trim_Prior model) to generate an average price paid. This weighting factor may be, for example, as simple as a straight linear average: taking weighted average of the result of general price model+result from the New_Trim_Prior model. For example, if n=# transactions in bin for existing model, then let m=20−n. Here, W1=m/20. W2=n/20. MR_model_score=W1*MR_newtrim prior model result+W2*general price model result. It will be apparent that the weighting factor could any desired less or more complicated function for combining the results of the New_Trim_Prior and the results of the general pricing model or to combine the results of the general pricing model with any other model as discussed herein.

Utilizing the determined average price, a pricing distribution may be generated. Presuming the historical transaction prices are normally distributed, a Gaussian distribution may be parameterized by computing the 2nd moment. Using this sample variance, the Gaussian assumption, and the sample mean (as computed above), the Gaussian curve and each desired price range ("Good," "Great," etc.) can be determined. Prior statistical research has determined that while prices can change quite a bit year over year, pricing variance for a given trim is relatively stable. Thus, in one embodiment a 4-week bin_prior bin can be determined for the specified vehicle configuration. This bin_prior bin may include historical transactions which correspond to a vehicle of the same make, model and body type (e.g., coupe, sedan, hatchback, convertible, etc.), of the previous year, which was sold the equivalent number of days after its release date as the specified vehicle configuration (or up to 28 days prior).

Next, $\sigma = \sigma_{4wk,priorbin}$ can be determined where $\sigma_{4wk,priorbin}$=standard deviation of the 4 week bin_prior's price ratios from weeks_since=n−3 to n, with n=the number of weeks since that vehicle was introduced to the market and a is the predicted standard deviation of price ratios for this new trim. Utilizing this data, "Good" and "Great" price ranges can be determined.

Returning to step 2540, if there is no historical transaction data for the same make and model as the specified vehicle configuration from a prior year a New_Trim_No_Prior model may be utilized. In one embodiment, to utilize a New_Trim_No_Prior model, historical transaction data corresponding to the year, make, model and trim of the specified vehicle configuration may be obtained along with the most recent listing price data for the specified vehicle configuration. From the listing price data, an average listing price may be determined for the specified vehicle configuration at a trim level. The New_Trim_No_Prior price model utilized by the vehicle data system may then be applied using this data to generate an average price for the specified vehicle.

A weighting factor can then be applied to combine the results from the two models (the general price model and the low-volume price model) to generate an average price paid. Utilizing the determined average price, a pricing distribution may be generated. Here, historical transaction data for the year, make, model and trim level of the specified vehicle configuration and the most recent listing price data for the specified vehicle configuration may be utilized to produce an average standard deviation of listing price offsets for this trim.

Next, construct $\sigma = \alpha_0 + \alpha_1 * (\sigma_{listing}/P_{invoice})$ where $\sigma_{listing}$=standard deviation of listing prices for the historical transaction data for the year, make, model and trim level of the specified vehicle configuration and a is the predicted standard deviation of price ratios for this specified vehicle configuration at the trim level. From this data, "Good" and "Great" price ranges can be determined.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method, comprising:
obtaining or receiving, by a vehicle data system executing on a processor, historical transaction data from disparate data sources communicatively connected to the vehicle data system, the historical transaction data comprising historical transactions of a set of vehicles;
determining, by the vehicle data system utilizing at least the historical transaction data, a set of data scarcity models including:
  a first price model for instances in which there are less than a threshold number of historical transactions about a vehicle configuration that are available in historical transaction data accessible by the vehicle data system and for which there is less than a threshold number of list prices for the vehicle configuration that are available to the vehicle data system;
  a second price model for instances in which there are less than a threshold number of list prices for the vehicle configuration that are available to the vehicle data system and for which there is historical data about the vehicle configuration that are available to the vehicle data system;
  a third price model for instances in which the vehicle configuration is not a new model, in which there is less than a threshold number of historical transactions about the vehicle configuration that are available in the historical transaction data accessible by the vehicle data system, and for which there is a threshold number of list prices for the vehicle configuration that are available to the vehicle data system;
  a fourth price model for instances in which the vehicle configuration is not a new model and there is historical transaction data available for a vehicle make or model that is comparable to the vehicle configuration from a previous year; and
  a fifth price model for instances in which the vehicle configuration is a new model and there is no historical transaction data for a vehicle make or model that is comparable to the vehicle configuration from a previous year;
receiving, by the vehicle data system through a user device, a user-specified vehicle configuration;
determining, by the vehicle data system from the set of data scarcity models, a data scarcity model for the user-specified vehicle configuration;
determining, by the vehicle data system, pricing data for the user-specified vehicle configuration utilizing the data scarcity model determined by the vehicle data system for the user-specified vehicle configuration; and
returning, by the vehicle data system to the user device, the pricing data for the user-specified vehicle configuration.

2. The method according to claim 1, further comprising:
prior to the determining the data scarcity model for the user-specified vehicle configuration, determining whether the threshold number of historical transactions exists in the historical transaction data for the specified vehicle configuration during a time period; and
responsive to the threshold number of historical transactions existing in the historical transaction data for the specified vehicle configuration during the time period, applying a price ratio model or a dealer cost model.

3. The method according to claim 2, wherein the time period comprises four weeks or one month.

4. The method according to claim 1, further comprising:
obtaining initial historical transaction data comprising transactions occurred in a prior year for vehicle models or trims which were new at time of the transactions or on market for less than 12 weeks after a respective release date.

5. The method according to claim 4, further comprising:
determining, using the initial historical transaction data, new trim bins for the vehicle models or trims corresponding to each of the transactions in the initial historical transaction data.

6. The method according to claim 1, further comprising:
obtaining or receiving updated historical transaction data from the disparate data sources, the updated historical transaction data comprising historical transactions of additional vehicles; and
updating, utilizing at least the updated historical transaction data, the set of data scarcity models.

7. The method according to claim 1, wherein the user-specified vehicle configuration is received through an interface of the vehicle data system or an application communicatively connected to the vehicle data system.

8. A vehicle data system, comprising:
a processor;
a non-transitory computer-readable medium; and
stored instructions translatable by the processor for:
obtaining or receiving historical transaction data from disparate data sources communicatively connected to the vehicle data system, the historical transaction data comprising historical transactions of a set of vehicles;
determining, utilizing at least the historical transaction data, a set of data scarcity models including:
a first price model for instances in which there are less than a threshold number of historical transactions about a vehicle configuration that are available in historical transaction data accessible by the vehicle data system and for which there is less than a threshold number of list prices for the vehicle configuration that are available to the vehicle data system;
a second price model for instances in which there are less than a threshold number of list prices for the vehicle configuration that are available to the vehicle data system and for which there is historical data about the vehicle configuration that are available to the vehicle data system;
a third price model for instances in which the vehicle configuration is not a new model, in which there is less than a threshold number of historical transactions about the vehicle configuration that are available in the historical transaction data accessible by the vehicle data system, and for which there is a threshold number of list prices for the vehicle configuration that are available to the vehicle data system;
a fourth price model for instances in which the vehicle configuration is not a new model and there is historical transaction data available for a vehicle make or model that is comparable to the vehicle configuration from a previous year; and
a fifth price model for instances in which the vehicle configuration is a new model and there is no historical transaction data for a vehicle make or model that is comparable to the vehicle configuration from a previous year;
receiving, through a user device, a user-specified vehicle configuration;
determining, from the set of data scarcity models, a data scarcity model for the user-specified vehicle configuration;
determining pricing data for the user-specified vehicle configuration utilizing the data scarcity model determined for the user-specified vehicle configuration; and
returning, to the user device, the pricing data for the user-specified vehicle configuration.

9. The vehicle data system of claim 8, wherein the stored instructions are further translatable by the processor for:
prior to the determining the data scarcity model for the user-specified vehicle configuration, determining whether the threshold number of historical transactions exists in the historical transaction data for the specified vehicle configuration during a time period; and
responsive to the threshold number of historical transactions existing in the historical transaction data for the specified vehicle configuration during the time period, applying a price ratio model or a dealer cost model.

10. The vehicle data system of claim 9, wherein the time period comprises four weeks or one month.

11. The vehicle data system of claim 8, wherein the stored instructions are further translatable by the processor for:
obtaining initial historical transaction data comprising transactions occurred in a prior year for vehicle models or trims which were new at time of the transactions or on market for less than 12 weeks after a respective release date.

12. The vehicle data system of claim 11, wherein the stored instructions are further translatable by the processor for:
determining, using the initial historical transaction data, new trim bins for the vehicle models or trims corresponding to each of the transactions in the initial historical transaction data.

13. The vehicle data system of claim 8, wherein the stored instructions are further translatable by the processor for:
obtaining or receiving updated historical transaction data from the disparate data sources, the updated historical transaction data comprising historical transactions of additional vehicles; and
updating, utilizing at least the updated historical transaction data, the set of data scarcity models.

14. The vehicle data system of claim 8, wherein the user-specified vehicle configuration is received through an interface of the vehicle data system or an application communicatively connected to the vehicle data system.

15. A computer program product comprising a non-transitory computer-readable medium storing instructions translatable by a processor of a vehicle data system for:
obtaining or receiving historical transaction data from disparate data sources communicatively connected to the vehicle data system, the historical transaction data comprising historical transactions of a set of vehicles;
determining, utilizing at least the historical transaction data, a set of data scarcity models including:
a first price model for instances in which there are less than a threshold number of historical transactions about a vehicle configuration that are available in historical transaction data accessible by the vehicle data system and for which there is less than a threshold number of list prices for the vehicle configuration that are available to the vehicle data system;
a second price model for instances in which there are less than a threshold number of list prices for the vehicle configuration that are available to the vehicle data system and for which there is historical data about the vehicle configuration that are available to the vehicle data system;
a third price model for instances in which the vehicle configuration is not a new model, in which there is less than a threshold number of historical transactions about the vehicle configuration that are available in the historical transaction data accessible by the vehicle data system, and for which there is a threshold number of list prices for the vehicle configuration that are available to the vehicle data system;

a fourth price model for instances in which the vehicle configuration is not a new model and there is historical transaction data available for a vehicle make or model that is comparable to the vehicle configuration from a previous year; and a fifth price model for instances in which the vehicle configuration is a new model and there is no historical transaction data for a vehicle make or model that is comparable to the vehicle configuration from a previous year;

receiving, through a user device, a user-specified vehicle configuration;

determining, from the set of data scarcity models, a data scarcity model for the user-specified vehicle configuration;

determining pricing data for the user-specified vehicle configuration utilizing the data scarcity model determined for the user-specified vehicle configuration; and returning, to the user device, the pricing data for the user-specified vehicle configuration.

16. The computer program product of claim 15, wherein the instructions are further translatable by the processor for:
prior to the determining the data scarcity model for the user-specified vehicle configuration, determining whether the threshold number of historical transactions exists in the historical transaction data for the specified vehicle configuration during a time period; and responsive to the threshold number of historical transactions existing in the historical transaction data for the specified vehicle configuration during the time period, applying a price ratio model or a dealer cost model.

17. The computer program product of claim 16, wherein the time period comprises four weeks or one month.

18. The computer program product of claim 15, wherein the instructions are further translatable by the processor for:
obtaining initial historical transaction data comprising transactions occurred in a prior year for vehicle models or trims which were new at time of the transactions or on market for less than 12 weeks after a respective release date.

19. The computer program product of claim 18, wherein the instructions are further translatable by the processor for:
determining, using the initial historical transaction data, new trim bins for the vehicle models or trims corresponding to each of the transactions in the initial historical transaction data.

20. The computer program product of claim 15, wherein the instructions are further translatable by the processor for:
obtaining or receiving updated historical transaction data from the disparate data sources, the updated historical transaction data comprising historical transactions of additional vehicles; and updating, utilizing at least the updated historical transaction data, the set of data scarcity models.

* * * * *